(12) United States Patent
Wachi

(10) Patent No.: US 8,070,870 B2
(45) Date of Patent: Dec. 6, 2011

(54) INKJET RECORDING YELLOW INK, INKJET RECORDING INK SET AND INKJET RECORDING METHOD

(75) Inventor: Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 168 days.

(21) Appl. No.: 12/549,391

(22) Filed: Aug. 28, 2009

(65) Prior Publication Data

US 2010/0071588 A1    Mar. 25, 2010

(30) Foreign Application Priority Data

Sep. 24, 2008    (JP) ................... 2008-245023

(51) Int. Cl.
*C09D 11/02*    (2006.01)
(52) U.S. Cl. .................. 106/31.5; 106/31.46; 106/31.58
(58) Field of Classification Search ........... 106/31.5, 106/31.46, 31.48; 427/256; 347/100
See application file for complete search history.

(56) References Cited

U.S. PATENT DOCUMENTS

| | | | |
|---|---|---|---|
| 7,125,446 B2 * | 10/2006 | Potenza et al. ............ | 106/31.5 |
| 2006/0016368 A1 * | 1/2006 | Ozawa et al. ............ | 106/31.48 |
| 2009/0148602 A1 * | 6/2009 | Tojo ........................ | 427/256 |
| 2009/0246378 A1 * | 10/2009 | Saito et al. ............... | 106/31.5 |
| 2009/0246379 A1 * | 10/2009 | Wachi et al. .............. | 427/256 |
| 2010/0075041 A1 * | 3/2010 | Wachi et al. .............. | 106/31.5 |

FOREIGN PATENT DOCUMENTS

JP    2007-197491 A    8/2007

* cited by examiner

*Primary Examiner* — Helene Klemanski
(74) *Attorney, Agent, or Firm* — SOLARIS Intellectual Property Group, PLLC

(57) ABSTRACT

Disclosed is an inkjet recording yellow ink containing a water-soluble azo dye ($y^{n1}$) selected from the group consisting of a compound represented by the following Formula (Y) in which n is 1, and a salt thereof, and a water-soluble azo dye ($y^{n2}$) selected from the group consisting of a compound represented by the following Formula (Y) in which n is 2, and a salt thereof:

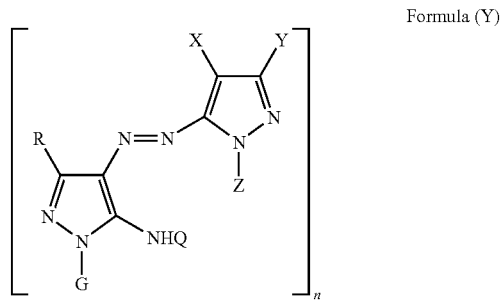

Formula (Y)

wherein, in Formula (Y), G represents a heterocyclic group; R, X, Y, Z, and Q each independently represent a monovalent or divalent group; n represents 1 or 2; when n is 1, R, X, Y, Z, Q and G each independently represent a monovalent group; and when n is 2, R, X, Y, Z, Q and G each independently represent a monovalent or divalent group, and at least one of R, X, Y, Z, Q and G represents a divalent substituent.

14 Claims, No Drawings

INKJET RECORDING YELLOW INK, INKJET RECORDING INK SET AND INKJET RECORDING METHOD

CROSS-REFERENCE TO RELATED APPLICATION

This application is based on and claims priority under 35 USC 119 from Japanese Patent Application No. 2008-245023 filed on Sep. 24, 2008, the disclosure of which is incorporated herein by reference in its entirety.

BACKGROUND OF THE INVENTION

1. Field of the Invention

The present invention relates to an inkjet recording yellow ink suitable for recording an image by ejecting an ink according to an inkjet recording method. Further, it relates to an inkjet recording ink set and an inkjet recording method each using the same.

2. Description of the Related Art

As an inkjet recording ink, a water-based ink, an oil-based ink, or a solid (fusion type) ink is used.

A dye used in the inkjet recording inkjet is typically required to have the following properties: good solubility with respect to a solvent such as water; good hue; fastness with respect to light, heat and active gas in the atmosphere (for example, oxidizing gas such as NOx or ozone, as well as SOx and so on); excellent resistance to water or chemicals; good fixing property with respect to an image-receiving material, and resultantly less bleeding; excellent storage stability in an ink; and high color purity.

It is especially important that the dye has fastness with respect to light, moisture, and heat. In consideration of properties of the material for recording, for example, it is desired that when an image is recorded on an image-receiving material having an ink-receiving layer containing white inorganic porous particles, the recorded image has fastness with respect to oxidizing gas such as ozone in the atmosphere.

Generally, when a color image is recorded using colors such as yellow, magenta and cyan, an image with an excellent coloration is obtained by regulating a color balance at the time of recording. However, if the degrees of fading of the respective colors are different from each other under the same environmental conditions over time after recording, imbalance in color gradually arises over time, which leads to a seriously deteriorated color tone of an entire image.

With respect to fastness of the color, as an ink that allows recording of an image having fastness, an ink composition having fastness with respect to light, heat, moisture and active gas in the atmosphere has been disclosed (see, for example, JP-A-No. 2007-197491).

However, in the aforementioned previous ink compositions, because the yellow dye is especially excellent in fastness compared to cyan dye or magenta dye, sometimes color imbalance in the image tends to occur over time after recording, and the color tone of the image at the time of recording cannot be stably maintained for the long term.

SUMMARY OF THE INVENTION

The invention has been made in view of the above circumstances.

The present inventors have found that among pyrazole azo-series yellow dyes, a mono form thereof is inferior in fastness to a bis form thereof, and when a mono form and a bis form having a similar hue to each other are used together, adjustment of the fading balance of an image over time is possible while maintaining a desired yellow color tone. The invention has been completed on the basis of these findings.

A first aspect of the present invention provides the following inkjet recording yellow ink.

<1> An inkjet recording yellow ink comprising at least one water-soluble azo dye ($y^{n1}$) selected from the group consisting of a compound represented by the following Formula (Y) in which n is 1, and a salt thereof, and at least one water-soluble azo dye ($y^{n2}$) selected from the group consisting of a compound represented by the following Formula (Y) in which n is 2, and a salt thereof:

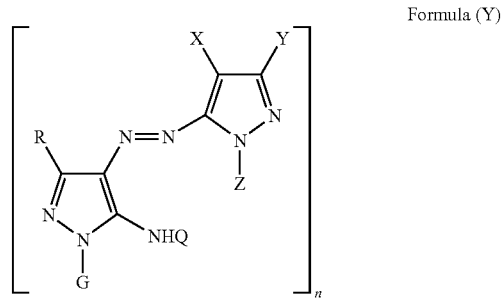

Formula (Y)

wherein, in Formula (Y), G represents a heterocyclic group; R, X, Y Z, and Q each independently represent a monovalent, or divalent group; n represents 1 or 2; when n is 1, R, X, Y, Z, Q and G each independently represent a monovalent group; and when n is 2, R, X, Y, Z, Q and G each independently represent a monovalent or divalent group, and at least one of R, X, Y, Z, Q and G represents a divalent substituent.

DETAILED DESCRIPTION OF THE INVENTION

According to a second aspect to a thirteenth aspect of the present invention, the following inkjet recording yellow ink, an inkjet recording ink set, and an inkjet recording method using the yellow ink or the ink set of the invention are provided.

<2> The inkjet recording yellow ink described in the preceding <1>, wherein a ratio [$y^{n1}$ : $y^{n2}$] of the water-soluble azo dye ($y^{n1}$) to the water-soluble azo dye ($y^{n2}$) is in the range of 1:20 to 1:1.

<3> The inkjet recording yellow ink described in the preceding <1> or <2>, wherein a total amount of the water-soluble azo dye ($y^{n1}$) and the water-soluble azo dye ($y^{n2}$) is 80% by mass or more with respect to the total content of the yellow dye.

<4> The inkjet recording yellow ink described in any one of the preceding <1> to <3>, wherein the water-soluble azo dye ($y^{n2}$) is at least one compound selected from the group consisting of a compound represented by the following Formula (Y-1), a compound represented by the following Formula (Y-2), a compound represented by the following Formula (Y-3), a compound represented by the following Formula (Y-4), or a compound represented by the following Formula (Y-5), and a salt of any one of these compounds.

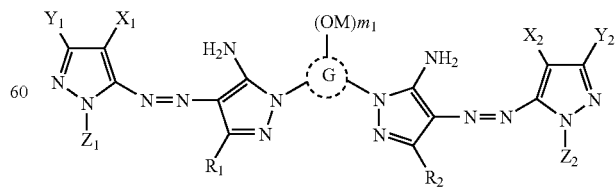

Formula (Y-1)

In Formula (Y-1), $R_1$, $R_2$, $X_1$, $X_2$, $Y_1$, $Y_2$, $Z_1$, and $Z_2$ each independently represent a monovalent group. G represents an atomic group necessary to form a 5- to 8-membered nitrogen-containing hetero ring. M represents a hydrogen atom or a cation. $m_1$ represents an integer of 0 to 3.

Formula (Y-2)

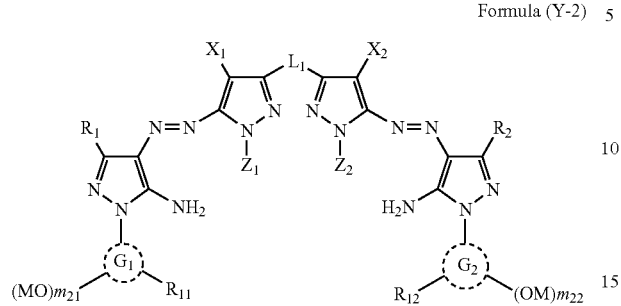

In Formula (Y-2), $R_1$, $R_2$, $R_{11}$, $R_{12}$, $X_1$, $X_2$, $Z_1$ and $Z_2$ each independently represent a monovalent group. $L_1$ represents a divalent connecting group. $G_1$ and $G_2$ each independently represent an atomic group necessary to form a 5- to 8-membered nitrogen-containing hetero ring. M represents a hydrogen atom or a cation. $m_{21}$ and $m_{22}$ each independently represent an integer of 0 to 3.

Formula (Y-3)

In Formula (Y-3), $R_1$, $R_2$, $R_{11}$, $R_{12}$, $X_1$, $X_2$, $Y_1$, and $Y_2$ each independently represent a monovalent group. $L_2$ represents a divalent connecting group. $G_1$ and $G_2$ each independently represent an atomic group necessary to form a 5- to 8-membered nitrogen-containing hetero ring. M represents a hydrogen atom or a cation. $m_{31}$ and $m_{32}$ each independently represent an integer of 0 to 3.

Formula (Y-4)

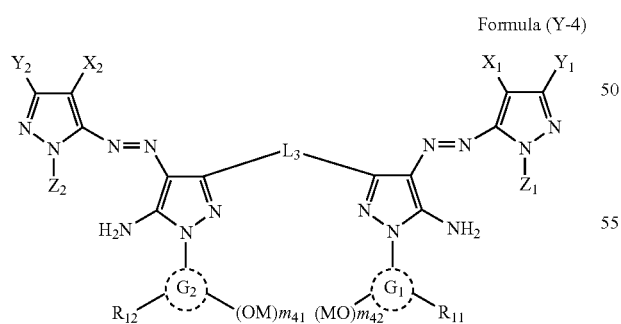

In Formula (Y-4), $R_{11}$, $R_{12}$, $X_1$, $X_2$, $Y_1$, $Y_2$, $Z_1$, and $Z_2$ each independently represent a monovalent group. $L_3$ represents a divalent connecting group. $G_1$ and $G_2$ each independently represent an atomic group necessary to form a 5- to 8-membered nitrogen-containing hetero ring. M represents a hydrogen atom or a cation. $M_{41}$ and $M_{42}$ each independently represent an integer of 0 to 3.

Formula (Y-5)

In Formula (Y-5), $R_1$, $R_2$, $R_{11}$, $R_{12}$, $Y_1$, $Y_2$, $Z_1$, and $Z_2$ each independently represent monovalent group. $L_4$ represents a divalent connecting group. $G_1$ and $G_2$ each independently represent an atomic group necessary to form a 5- to 8-membered nitrogen-containing hetero ring. M represents a hydrogen atom or a cation. $m_{51}$ and $m_{52}$ each independently represent an integer of 0 to 3.

<5> The inkjet recording yellow ink described in any one of the preceding <1> to <4>, further containing a yellow dye in an total amount in the range of 3% by mass to 7% by mass.

<6> The inkjet recording yellow ink described in any one of the preceding <1> to <5>, further containing a nonionic surfactant.

<7> The inkjet recording yellow ink described in the preceding <6>, wherein the nonionic surfactant is an acetylene-diol surfactant.

<8> An inkjet recording ink set containing the inkjet recording yellow ink described in any one of the preceding <1> to <7>, a magenta ink containing a magenta dye, and a cyan ink containing a cyan dye.

<9> The inkjet recording ink set described in the preceding <8>, wherein the cyan dye is a water-soluble phthalocyanine dye selected from the group consisting of a compound represented by the following Formula (C-1) and a salt thereof.

Formula (C-1)

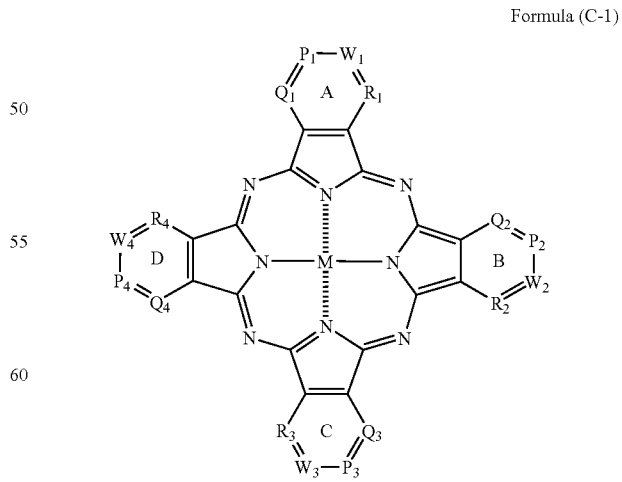

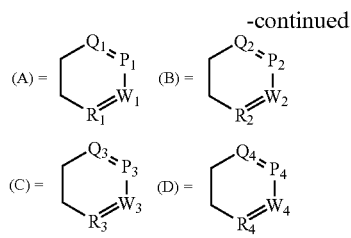

In Formula (C-1), $Q_1$ to $Q_4$, $P_1$ to $P_4$, $W_1$ to $W_4$, and $R_1$ to $R_4$ each independently represent (=C($J_1$)- or —N=), (=C($J_2$)- or —N=), (=C($J_3$)- or —N=) or (=C($J_4$)- or —N=). $J_1$ to $J_4$ each independently represent a hydrogen atom or a substituent. Four rings, namely ring A containing $Q_1$, $P_1$, $W_1$ and $R_1$, ring B containing $Q_2$, $P_2$, $W_2$ and $R_2$, ring C containing $Q_3$, $P_3$, $W_3$ and $R_3$, and ring D containing $Q_4$, $P_4$, $W_4$ and $R_4$ each independently represent an aromatic hydrocarbon ring or a hetero ring. M represents a hydrogen atom, a metal element, a metal oxide, a metal hydroxide or a metal halide.

<10> The inkjet recording ink set described in the preceding <8> or <9>, wherein the magenta ink contains a water-soluble azo dye represented by the following Formula (M-1).

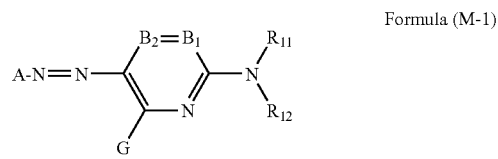

Formula (M-1)

In Formula (M-1), A represents a residue of a 5-membered hetero ring diazo component A-NH$_2$. $B_1$ and $B_2$ each independently represent —C$R_{13}$= or —C$R_{14}$=, or alternatively one of $B_1$ and $B_2$ is a nitrogen atom, and the other is —C$R_{13}$=, or —C$R_{14}$=. $R_{11}$ and $R_{12}$ each independently represent a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group. Further, each of these groups may have a substituent. G, $R_{13}$, and $R_{14}$ each independently represent a hydrogen atom, a halogen atom, an alkyl group, an alkenyl group, an alkynyl group, aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, a ureido group, a sulfamoylamino group, an alkoxycarbonylamino group, an aryloxycarbonylamino group, an alkyl or arylsulfonylamino group, a nitro group, an alkyl or arylthio group, an alkyl or arylsulfonyl group, an alkyl or arylsulfinyl group, a sulfamoyl group, a heterocyclic thio group, or an ionic hydrophilic group. Further, each of the above groups may have a substituent. $R_{13}$ and $R_{11}$, or $R_{11}$ and $R_{12}$ may bond with each other to form a 5- or 6-membered ring. Herein, Formula (M-1) must have at least one ionic hydrophilic group.

<11> The inkjet recording ink set described in any one of the preceding <8> to <10>, further containing a black ink.

<12> The inkjet recording ink set described in the preceding <11>, wherein the black ink contains a water-soluble azo dye represented by the following Formula (B-1).

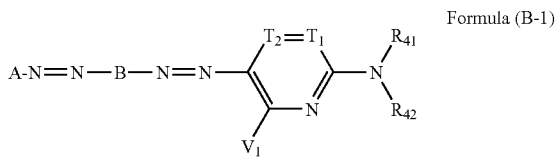

Formula (B-1)

In Formula (B-1), A represents a monovalent aromatic group or heterocyclic group. B represents a divalent aromatic group or heterocyclic group. $T_1$ and $T_2$ each independently represent =C$R_{43}$— or —C$R_{44}$=. Alternatively, one of $T_1$ and $T_2$ is a nitrogen atom, and the other is =C$R_{43}$— or —C$R_{44}$=. $V_1$, $R_{43}$ and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group which may include an alkylamino group, an arylamino group, and a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group. Further, each of the above groups may have a substituent. $R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, with the proviso that both $R_{41}$ and $R_{42}$ are not a hydrogen atom at the same time. Further, each of the above groups may have a substituent. $R_{43}$ and $R_{41}$, or $R_{41}$ and $R_{42}$ may bond with each other to form a 5- or 6-membered ring.

<13> An inkjet recording method for recording an image on an inkjet recording medium having an ink-receiving layer containing inorganic particles on a support, the method comprising: using the inkjet recording yellow ink described in any one of the preceding <1> to <7>, or the inkjet recording ink set described in any one of the preceding <8> to <12>.

According to the invention, it is possible to provide an inkjet recording yellow ink and an inkjet recording ink set, each of which is capable of keeping a color balance of the image stably over the long term, thereby being capable of recording an image with an excellent storage stability, and an inkjet recording method using the yellow ink or the ink set.

The inkjet recording yellow ink, an inkjet recording ink set, and an inkjet recording method using the yellow ink or the ink set of the invention are explained in detail below.

<Inkjet Recording Yellow Ink>

The inkjet recording yellow ink (hereinafter also referred to simply as "yellow ink") of the invention contains at least two water-soluble azo dyes selected from the group consisting of a compound represented by the following Formula (Y) and a salt thereof, wherein the at least two water-soluble azo dyes contain at least a water-soluble azo dye ($y^{n1}$) where n is 1 in Formula (Y), and a water-soluble azo dye ($y^{n2}$) where n is 2 in Formula (Y).

The yellow ink of the invention generally contains a water-soluble organic solvent and/or water, and preferably contains a nonionic surfactant. If necessary, the yellow ink of the invention may further include other components.

In the invention, a pyrazole azo-series yellow dye is not contained simply as a yellow coloring dye, but both a mono form and a bis form of the pyrazole azo-series yellow dye are contained together in the ink. Utilizing the fact that the mono form is inferior in fastness to the bis form and that the mono form and the bis form are similar to each other with respect to hue, adjustment of the color balance of a multi-color image during fading is possible while maintaining a desired yellow color tone. According to the invention, it is possible to obtain an image having a good color balance and excellent storage stability for the long term.

[Water-Soluble Azo Dye (Yellow Series)]

The yellow ink of the invention contains as dyes, from water-soluble azo dyes selected from the group consisting of a compound represented by the following Formula (Y) and a salt thereof, at least one mono form of the water-soluble azo dye ($y^{n1}$) where n is 1 in Formula (Y), and at least one bis form of the water-soluble azo dye ($y^{n2}$) where n is 2 in Formula (Y). The water-soluble azo dyes are excellent in color reproduction as well as fastness with respect to light, heat, moisture and active gas in the atmosphere. As a result of a composition in which a mono form is combined with a bis form that has higher fastness than the mono form, the fading balance at the time of color image formation can be maintained. Consequently, it is possible to obtain an image having a color tone that is stably excellent for the long term.

Herein, the term "water-soluble" means that 1 g or more of a substance dissolves in 100 g of water (25° C.).

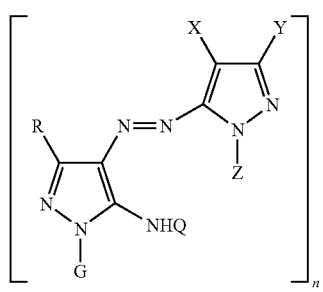

Formula (Y)

wherein, in Formula (Y), G represents a heterocyclic group; R, X, Y, Z, and Q each independently represent a monovalent or divalent group; n represents 1 or 2; when n is 1, R, X, Y, Z, Q and G each independently represent a monovalent group; when n is 2, R, X, Y, Z, Q and G each independently represent a monovalent or divalent group, and at least one of R, X, Y, Z, Q and G represents a divalent substituent.

In the inkjet recording yellow ink of the invention, the ratio of the water-soluble azo dye ($y^{n1}$) to the water-soluble azo dye ($y^{n2}$) that are used in combination is not particularly limited, and may be appropriately selected in accordance with the situation in terms of, for example, the ink composition and the relationship with other color inks that are used at the time of image recording. However, a ratio [$y^{n1}$ : $y^{n2}$] of the water-soluble azo dyes $y^{n1}$ to $y^{n2}$ is preferably in the range of 1:20 to 1:1. The above-described ratio of $y^{n1}$:$y^{n2}$ is advantageous in that if the ratio of the water-soluble azo dye $y^{n1}$ to the water-soluble azo dye $y^{n2}$ is not too small but in the range of 1/20 or more, deterioration of color balance is suppressed, whereby it is possible to obtain an image that is excellent in storage stability for the long term and, on the other hand, if the ratio of the water-soluble azo dye $y^{n1}$ to the water-soluble azo dye $y^{n2}$ is in the range of 1/1 or less, a yellow image having excellent storage stability is obtained.

For this reason, the ratio ofynl $y^{n2}$ is more preferably in the range of 1:15 to 1:2, and further preferably from 1:10 to 1:3.

Formula (Y) is explained in detail below.

In Formula (Y), G is preferably a 5- to 8-membered heterocyclic group. Among these rings, 5- or 6-membered substituted, or unsubstituted aromatic or non-aromatic heterocyclic groups, which may be condensed, are preferable. Further, 5- or 6-membered aromatic heterocyclic groups having 3 to 30 carbon atoms are more preferable.

Examples of the heterocyclic group represented by the G are described below without specifying a substitution cite of the ring:

pyridine, pyrazine, pyridazine, pyrimidine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isooxazole, benzoisooxazole, pyrrolidine, piperidine, piperazine, imidazolidine, thiazoline, and sulfolane.

If the heterocyclic group is able to have a substituent, further the heterocyclic group may have the following substituent.

Examples of the substituent include a straight chain or branched chain alkyl group having 1 to 12 carbon atoms, a straight chain or branched chain aralkyl group having 7 to 18 carbon atoms, a straight chain or branched chain alkenyl group having 2 to 12 carbon atoms, a straight chain or branched chain alkynyl group having 2 to 12 carbon atoms, a straight chain or branched chain cycloalkyl group having 3 to 12 carbon atoms, a straight chain or branched chain cycloalkenyl group having 3 to 12 carbon atoms (among the aforementioned groups, each of the groups having a branched chain is preferable from a reason of improvement in both solubility of dye and storage stability of ink. Groups having an asymmetric carbon atom are especially preferable. For example, methyl, ethyl, isopropy, sec-butyl, t-butyl, 2-ethylhexyl, 2-methylsulfonylethyl, 3-phenoxypropyl, trifluoromethyl, and cyclopentyl groups are exemplified.), a halogen atom (for example, chlorine, bromine), an aryl group (for example, phenyl, 4-t-butylphenyl, 2, 4-di-t-amylphenyl), a heterocyclic group (for example, imidazolyl, pyrazolyl, triazolyl, 2-furyl, 2-thienyl, 2-pyrimidinyl, 2-benzothizolyl), a cyano group, a hydroxyl group, a nitro group, a carboxyl group, an amino group, an alkyloxy group (for example, methoxy, ethoxy, 2-methoxyethoxy, 2-methylsulfonylethoxy), an aryloxy group (for example, phenoxy, 2-methylphenoxy, 4-t-butylphenoxy, 3-nitrophenoxy, 3-t-butyloxycarbonylphenoxy, 3-methoxycarbonylphenoxy), an acylamino group (for example, acetoamido, benzoamido, 4-(3-t-butyl-4-hydroxyphenoxy)butane amido), an alkylamino group (for example, methylamino, butylamino, diethylamino, methylbutylamino), an arylamino group (for example, phenylamino, 2-chloroanilino), an ureido group (for example, phenylureido, methylureido, N,N-dibutylureido), a sulfamoylamino group (for example, N,N-dipropylsulfamoylamino), an alkylthio group (for example, methylthio, octylthio, 2-phenoxyethylthio), an arylthio group (for example, phenylthio, 2-butoxy-5-t-octyl phenylthio, 2-carboxylphenylthio), an alkyloxycarbonylamino group (for example, methoxycarbonylamino), an alkylsulfonylamino group and an arylsulfonylamino group (for example, methylsulfonylamino, phenylsulfonylamino, p-toluenesulfonylamino), a carbamoyl group (for example, N-ethylcarbamoyl, N,N-dibutylcarbamoyl), a sulfamoyl group (for example, N-ethylsulfamoyl, N,N-dipropylsulfamoyl, N-phenylsulfamoyl), a sulfonyl group (for example, methylsulfonyl, octylsulfonyl, phenylsulfonyl, p-toluenesulfonyl), an alkyloxycarbonyl group (for example, methoxycarbonyl, butoxycarbonyl), a heterocyclic oxy group (for example, 1-phenyltetrazole-5-oxy, 2-tetrahydropyranyloxy), an azo group (for example, phenylazo, 4-methoxyphenylazo, 4-pivaroylaminophenylazo, 2-hydroxy-4-propanoylphenylazo), an acyloxy group (for example, acetoxy), a carbamoyloxy group (for example, N-methylcarbamoyloxy, N-phenylcarbamoyloxy), a silyloxy group (for example, trimethylsilyloxy, dibutylmethylsilyloxy), an aryloxycarbonylamino group (for example, phnoxycarbonylamino), an imido group (for example, N-succinimido, N-phthalimido), a heterocyclic thio group (for example, 2-benzothiazolylthio, 2,4-diphenoxy-1,3,5-triazole-6-thio, 2-pyridylthio), a sulfinyl group (for example, 3-phenoxypropylsulfinyl), a phosphonyl group (for example, phenoxyphosphonyl, octyloxyphosphonyl, phenylphosphonyl), an aryloxycarbonyl group (for example, phenoxycarbonyl), an acyl group (for example, acetyl, 3-phenylpropanoyl, benzoyl), or ionic hydrophilic group (for example, carboxyl, sulfo, phosphono, quaterary ammonium).

In the above-described Formula (Y), preferable examples of Q, R, X, Y and Z are explained in detail below.

When Q, R, X, Y, and Z represent a monovalent group, the monovalent group represents a hydrogen atom, or a monovalent substituent. The monovalent substituent is detailed below. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group; an amino group which may be an alkylamino group, or an aryamino group; an acylamino group (amidogroup), an aminocarbonylamino group (ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinylamino group, a silyl group, an azo group, or an imido group. Further, each of the above groups may have a substituent.

Among these monovalent groups, a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, or an alkoxycarbonyl group is preferable in consideration of a good storage stability with respect to moisture, oxidizing gas, light, and the like of the recorded image as well as an excellent hue. Further, a hydrogen atom, a halogen atom, an alkyl group, an aryl group, a cyano group, an alkylsulfonyl group, an arylsulfonyl group, or a heterocyclic group is more preferable. Among these groups, a hydrogen atom, an alkyl group, an aryl group, a cyano group, or an alkylsulfonyl group is further preferable.

The above-described Q, R, X, Y, and Z are explained in more detail below.

The halogen atom represented by Q, R, X, Y, and Z represents a chlorine atom, a bromine atom, or an iodine atom. Among these atoms, a chlorine atom, or a bromine atom is preferable. A chlorine atom is more preferable.

The alkyl group represented by Q, R, X, Y, and Z encompasses a substituted alkyl group and an unsubstituted alkyl group. The substituted alkyl group or unsubstituted alkyl group preferably has from 1 to 30 carbon atoms. Examples of the substituent include the same examples of the substituent as recited in the case where the aforementioned G optionally has a substituent. Among these examples, a hydroxyl group, an alkoxy group, a cyano group, a halogen atom, a sulfo group or a salt thereof, or a carboxyl group or a salt thereof is preferable. Specific examples of the alkyl group include a methyl group, an ethyl group, a butyl group, a t-butyl group, n-octyl group, an eicosyl group, a 2-chloroethyl group, a hydroxyethyl group, a cyanoethyl group, and a 4-sulfobutyl group.

The cycloalkyl group represented by Q, R, X, Y, and Z encompasses a substituted or unsubstituted cycloalkyl group. The substituted or unsubstituted cycloalkyl group preferably has from 5 to 30 carbon atoms. Examples of the substituent include the same examples of the substituent as recited in the case where the aforementioned G optionally has a substituent. Specific examples of the cycloalkyl group include a cyclohexyl group, a cyclopentyl group, and a 4-n-dodecylcyclohexyl group.

The aralkyl group represented by Q, R, X, Y, and Z encompasses a substituted or unsubstituted aralkyl group. The substituted or unsubstituted aralkyl group preferably has from 7 to 30 carbon atoms. Examples of the substituent include the same examples of the substituent as recited in the case where the aforementioned G optionally has a substituent. Specific examples of the aralkyl group include a benzyl group, and a 2-phenetyl group.

The alkenyl group represented by Q, R, X, Y and Z represents a substituted or unsubstituted straight chain, branched, or cyclic alkenyl group. The alkenyl group is a substituted or unsubstituted alkenyl group preferably having 2 to 30 carbon atoms. Specific examples of the alkenyl group include a vinyl group, an allyl group, a prenyl group, a geranyl group, an oleyl group, a 2-cyclopentene-1-yl group, and a 2-cyclohexene-1-yl group.

The alkynyl group represented by Q, R, X, Y, and Z is a substituted or unsubstituted alkynyl group preferably having 2 to 30 carbon atoms. Specific examples of the alkynyl group include an ethynyl group and a propargyl group.

The aryl group represented by Q, R, X, Y, and Z is a substituted or unsubstituted aryl group preferably having 6 to 30 carbon atoms. Specific examples of the aryl group include a phenyl group, a p-toryl group, a naphthyl group, a m-chlorophenyl group, and a o-hexadecanoylaminophenyl group. Examples of the substituent include the same examples of the substituent as recited in the case where the aforementioned G optionally has a substituent.

The heterocyclic group represented by Q, R, X, Y, and Z is preferably a monovalent group derived from a substituted or unsubstituted 5- or 6-membered atomatic or nonaromatic hetero ring compound from which one hydrogen atom is removed. Further, the hetero ring may be condensed. The heterocyclic group is more preferably a 5- or 6-membered atomatic heterocyclic group having 3 to 30 carbon atoms.

Examples of the substituent include the same examples of the substituent as recited in the case where the aforementioned G optionally has a substituent. Specific examples of the heterocyclic group are recited below without specifying the substitution site of the hetero ring:

pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isoxazole, benzisoxazole, pyrrolidine, piperidine, piperazine, imidazolidine, and thiazoline.

The alkoxy group represented by Q, R, X, Y, and Z encompasses a substituted or unsubstituted alkoxy group. The substituted or unsubstituted alkoxy group preferably has from 1 to 30 carbon atoms. Examples of the substituent include the same examples of the substituent as recited in the case where the aforementioned G optionally has a substituent. Specific examples of the alkoxy group include a methoxy group, an ethoxy group, a isopropoxy group, a n-octyloxy group, a methoxyethoxy group, a hydroxyethoxy group, and a 3-carboxypropoxy group.

The aryloxy group represented by Q, R, X, Y, and Z is preferably a substituted or unsubstituted aryloxy group having from 6 to 30 carbon atoms. Examples of the substituent include the same examples of the substituent as recited in the case where the aforementioned G optionally has a substituent. Specific examples of the aryloxy group include a phenoxy group, a 2-methylphenoxy group, a 4-t-butylphenoxy group, a 3-nitrophenoxy group, and a 2-tetradecanoylaminophenoxy group.

The silyloxy group represented by Q, R, X, Y, and Z is preferably a silyloxy group having from 3 to 20 carbon atoms. Specific examples of the silyloxy group include a trimethylsilyloxy group, and a t-butyldimethylsilyloxy group.

The heterocyclic oxy group represented by Q, R, X, Y, and Z is preferably a substituted or unsubstituted heterocyclic oxy group having from 2 to 30 carbon atoms. Examples of the substituent include the same examples of the substituent as recited in the case where the aforementioned G optionally has a substituent. Specific examples of the heterocyclic oxy group include a 1-phenyltetrazole-5-oxy, and 2-tetrahydropyranyloxy group.

The acyloxy group represented by Q, R, X, Y, and Z is preferably a formyloxy group, a substituted or unsubstituted alkyl carbonyloxy group having from 2 to 30 carbon atoms, or a substituted or unsubstituted aryl carbonyloxy group having from 6 to 30 carbon atoms. Examples of the substituent include the same examples of the substituent as recited in the case where the aforementioned G optionally has a substituent. Specific examples of the acyloxy group include an a formyloxy group, an acetyloxy group, a pivaloyloxy group, a stearoyloxy group, a benzoyloxy group, and a p-methoxyphenylcabonyloxy group.

The carbamoyloxy group represented by Q, R, X, Y, and Z is preferably a substituted or unsubstituted carbamoyloxy group having from 1 to 30 carbon atoms. Examples of the substituent include the same examples of the substituent as recited in the case where the aforementioned G optionally has a substituent. Specific examples of the carbamoyloxy group include an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group.

The alkoxycarbonyloxy group represented by Q, R, X, Y, and Z is preferably a substituted or unsubstituted alkoxycarbonyloxy group having from 2 to 30 carbon atoms. Examples of the substituent include the same examples of the substituent as recited in the case where the aforementioned G optionally has a substituent. Specific examples of the alkoxycarbonyloxy group include a methoxycarbonyloxy group, an ethoxycarbonyloxy group, a t-butoxycarbonyloxy group, and an n-octylcarbonyloxy group.

The aryloxycarbonyloxy group represented by Q, R, X, Y, and Z is preferably a substituted or unsubstituted aryloxycarbonyloxy group having from 7 to 30 carbon atoms. Examples of the substituent include the same examples of the substituent as recited in the case where the aforementioned G optionally has a substituent. Specific examples of the aryloxycarbonyloxy group include a phenoxycarbonyloxy group, a p-methoxy phenoxycarbonyloxy group, and a p-n-hexadecyloxyphenoxycarbonyloxy group.

The amino group represented by Q, R, X, Y, and Z is preferably a substituted or unsubstituted alkylamino group having from 1 to 30 carbon atoms, and a substituted or unsubstituted arylamino group having from 6 to 30 carbon atoms. Examples of the substituent include the same examples of the substituent as recited in the case where the aforementioned G optionally has a substituent. Specific examples of the amino group include an amino group, a methylamino group, a dimethylamino group, an anilino group, an N-methylanilino group, a diphenylamino group, a hydroxyethylamino group, a carboxyethylamino group, a sulfoethylamino group, and a 3,5-dicarboxyanilino group.

The acylamino group represented by Q, R, X, Y, and Z is preferably a formylamino group, a substituted or unsubstituted alkylcarbonylamino group having from 1 to 30 carbon atoms, and a substituted or unsubstituted arylcarbonylamino group having from 6 to 30 carbon atoms. Examples of the substituent include the same examples of the substituent as recited in the case where the aforementioned G optionally has a substituent. Specific examples of the acylamino group include a formylamino group, an acetylamino group, a pivaloylamino group, a lauroylamino group, a benzoylamino group, and a 3,4,5-tri-n-octyloxyphenylcarbonylamino group.

The aminocarbonylamino group represented by Q, R, X, Y, and Z is preferably a substituted or unsubstituted aminocarbonylamino group having from 1 to 30 carbon atoms. Examples of the substituent include the same examples of the substituent as recited in the case where the aforementioned G optionally has a substituent. Specific examples of the aminocarbonylamino group include a carbamoylamino group, an N,N-dimethylamino carbonylamino group, an N,N-diethylamino carbonylamino group, and a morpholinocarbonylamino group.

The alkoxycarbonylamino group represented by Q, R, X, Y, and Z is preferably a substituted or unsubstituted alkoxycarbonylamino group having from 2 to 30 carbon atoms. Examples of the substituent include the same examples of the substituent as recited in the case where the aforementioned G optionally has a substituent. Specific examples of the alkoxycarbonylamino group include a methoxycarbonylamino group, an ethoxycarbonylamino group, a t-butoxycarbonylamino group, an n-octadecyloxycarbonylamino group, and a N-methyl-methoxycarbonylamino group.

The aryloxycarbonylamino group represented by Q, R, X, Y, and Z is preferably a substituted or unsubstituted aryloxycarbonylamino group having from 7 to 30 carbon atoms. Examples of the substituent include the same examples of the substituent as recited in the case where the aforementioned G optionally has a substituent. Specific examples of the aryloxycarbonylamino group include a phenoxycarbonylamino group, a p-chlorophenoxy carbonylamino group, and a m-n-octyloxyphenoxycarbonylamino group.

The sulfamoylamino group represented by Q, R, X, Y, and Z is preferably a substituted or unsubstituted sulfamoylamino group having from 0 to 30 carbon atoms. Examples of the substituent include the same examples of the substituent as recited in the case where the aforementioned G optionally has a substituent. Specific examples of the sulfamoylamino group include a sulfamoylamino group, an N,N-dimethylaminosulfonyl amino group, and an N-n-octylaminosulfonylamino group.

The alkyl or aryl sulfonylamino group represented by Q, R, X, Y, and Z is preferably a substituted or unsubstituted alkylsulfonylamino group having from 1 to 30 carbon atoms and a substituted or unsubstituted arylsulfonylamino group having from 6 to 30 carbon atoms. Examples of the substituent include the same examples of the substituent as recited in the case where the aforementioned G optionally has a substituent. Specific examples of the alkylsulfonylamino groupor and the arylsulfonylamino group include a methylsulfonylamino group, a butylsulfonylamino group, a phenylsulfonylamino group, a 2,3,5-trichlorophenylsulfonylamino group, and a p-methyl phenylsulfonylamino group.

The alkylthio group represented by Q, R, X, Y, and Z is preferably a substituted or unsubstituted alkylthio group having from 1 to 30 carbon atoms. Examples of the substituent include the same examples of the substituent as recited in the case where the aforementioned G optionally has a substituent. Specific examples of the alkylthio group include a methylthio group, an ethylthio group, and a n-hexadecylthio group.

The arylthio group represented by Q, R, X, Y, and Z is preferably a substituted or unsubstituted arylthio group having from 6 to 30 carbon atoms. Examples of the substituent include the same examples of the substituent as recited in the case where the aforementioned G optionally has a substituent. Specific examples of the arylthio group include a phenylthio group, a p-chlorophenylthio group, and an m-methoxyphenylthio group.

The heterocyclic thio group represented by Q, R, X, Y, and Z is preferably a substituted or unsubstituted heterocyclic thio group having from 2 to 30 carbon atoms. Examples of the substituent include the same examples of the substituent as recited in the case where the aforementioned G optionally has a substituent. Specific examples of the heterocyclic thio group include a 2-benzothiazolylthio group, and a 1-phenyltetrazole-5-ylthio group.

The sulfamoyl group represented by Q, R, X, Y, and Z is preferably a substituted or unsubstituted sulfamoyl group having from 0 to 30 carbon atoms. Examples of the substituent include the same examples of the substituent as recited in the case where the aforementioned G optionally has a substituent. Specific examples of the sulfamoyl group include an N-ethylsulfamoyl group, an N-(3-dodecyloxypropyl) sulfamoyl group, a N,N-dimethyl sulfamoyl and an N-acetylsulfamoyl group, a N-benzoylsulfamoyl group, and a N-(N'-phenylcarbamoyl) sulfamoyl group.

The alkyl or aryl sulfinyl group represented by Q, R, X, Y, and Z is preferably a substituted or unsubstituted alkylsulfinyl group having from 1 to 30 carbon atoms, or a substituted or unsubstituted arylsulfinyl group having from 6 to 30 carbon atoms. Examples of the substituent include the same examples of the substituent as recited in the case where the aforementioned G optionally has a substituent. Specific examples of the alkyl or aryl sulfinyl group include a methylsulfinyl group, an ethylsulfinyl group, a phenylsulfinyl group, and a p-methlphenylsulfinyl group.

The alkyl or aryl sulfonyl group represented by Q, R, X, Y, and Z is preferably a substituted or unsubstituted alkylsulfonyl group having from 1 to 30 carbon atoms, or a substituted or unsubstituted arylsulfonyl group having from 6 to 30 carbon atoms. Examples of the substituent include the same examples of the substituent as recited in the case where the aforementioned G optionally has a substituent. Specific examples of the alkyl or aryl sulfonyl group include a methylsulfonyl group, an ethylsulfonyl group, a phenylsulfonyl group, and a p-toluene sulfonyl group.

The acyl group represented by Q, R, X, Y, and Z is preferably a formyl group, a substituted or unsubstituted alkylcarbonyl group having from 2 to 30 carbon atoms, a substituted or unsubstituted arylcarbonyl group having from 7 to 30 carbon atoms, or a substituted or unsubstituted heterocyclic carbonyl group having from 4 to 30 carbon atoms wherein the carbonyl group bonds to a carbon atom of the hetero ring. Examples of the substituent include the same examples of the substituent as recited in the case where the aforementioned G optionally has a substituent. Specific examples of the acyl group include an acetyl group, a pivaloyl group, a 2-chloroacetyl group, a stearoyl group, a benzoyl group, a p-n-octyloxyphenylcarbonyl group, a 2-pyridyl carbonyl group, and a 2-furylcarbonyl group.

The aryloxycarbonyl group represented by Q, R, X, Y, and Z is preferably a substituted or unsubstituted aryloxycarbonyl group having from 7 to 30 carbon atoms. Examples of the substituent include the same examples of the substituent as recited in the case where the aforementioned G optionally has a substituent. Specific examples of the aryloxycarbonyl group include a phenoxycarbonyl group, an o-chlorophenoxy carbonyl group, a m-nitrophenoxycarbonyl group, and a p-t-butylphenoxycarbonyl group.

The alkoxycarbonyl group represented by Q, R, X, Y, and Z is preferably a substituted or unsubstituted alkoxycarbonyl group having from 2 to 30 carbon atoms. Examples of the substituent include the same examples of the substituent as recited in the case where the aforementioned G optionally has a substituent. Specific examples of the alkoxycarbonyl group include a methoxycarbonyl group, an ethoxycarbonyl group, a t-butoxycarbonyl group, and an n-octadecyloxycarbonyl group.

The carbamoyl group represented by Q, R, X, Y, and Z is preferably a substituted or unsubstituted carbamoyl group having from 1 to 30 carbon atoms. Examples of the substituent include the same examples of the substituent as recited in the case where the aforementioned G optionally has a substituent. Specific examples of the carbamoyl group include a carbamoyl group, an N-methylcarbamoyl group, an N,N-dimethylcarbamoyl group, an N,N-di-n-octylcarbamoy group, and an N-(methylsulfonyl) carbamoyl group.

The phosphino group represented by Q, R, X, Y, and Z is preferably a substituted or unsubstituted phosphino group having from 2 to 30 carbon atoms. Examples of the substituent include the same examples of the substituent as recited in the case where the aforementioned G optionally has a substituent. Specific examples of the phosphino group include a dimethylphosphino group, a diphenylphosphino group, and a methylphenoxyphosphino group.

The phosphinyl group represented by Q, R, X, Y, and Z is preferably a substituted or unsubstituted phosphinyl group having from 2 to 30 carbon atoms. Examples of the substituent include the same examples of the substituent as recited in the case where the aforementioned G optionally has a substituent. Specific examples of the phosphinyl group include a phosphinyl group, a dioctyloxyphosphinyl group, and a diethoxyphosphinyl group.

The phosphinyloxy group represented by Q, R, X, Y, and Z is preferably a substituted or unsubstituted phosphinyloxy group having from 2 to 30 carbon atoms. Examples of the substituent include the same examples of the substituent as recited in the case where the aforementioned G optionally has a substituent. Specific examples of the phosphinyloxy group include a diphenoxyphosphinyloxy group, and a dioctyloxyphosphinyloxy group.

The phosphinylamino group represented by Q, R, X, Y, and Z is preferably a substituted or unsubstituted phosphinylamino group having from 2 to 30 carbon atoms. Examples of the substituent include the same examples of the substituent as recited in the case where the aforementioned G optionally has a substituent. Specific examples of the phosphinylamino group include a dimethoxyphosphinylamino group, and a dimethylamino phosphinylamino group.

The silyl group represented by Q, R, X, Y, and Z is preferably a substituted or unsubstituted silyl group having from 3 to 30 carbon atoms. Examples of the substituent include the same examples of the substituent as recited in the case where the aforementioned G optionally has a substituent. Specific examples of the silyl group include a trimethylsilyl group, a t-butyldimethylsilyl group, and a phenyldimethylsilyl group.

Examples of the azo group represented by Q, R, X, Y, and Z include a phenylazo group, a 4-methoxyphenylazo group, a 4-pivaloylaminophenylazo group, and a 2-hydroxy-4-propanoylphenylazo group.

Examples of the imino group represented by Q, R, X, Y, and Z include a N-succinimido group, and a N-phthalimido group.

When Q, R, X, Y and Z represent a divalent group, it is preferable that the divalent group is an alkylene group (for example, methylene, ethylene, propylene, butylene, pentylene), an alkenylene group (for example, ethenylene, propenylene), an alkynylene group (for example, ethynylene, propynylene), an arylene group (for example, phenylene, naphthylene), a divalent heterocyclic group (for example, 6-chloro-1,3,5-triazine-2,4-diyl, pyrimidine-2,4-diyl, pyrimidine-4,6-diyl, quinoxaline-2,3-diyl, pyridazine-3,6-diyl), —O—, —CO—, —NR'— wherein R' represents a hydrogen atom, an alkyl group, or an aryl group, —S—, —SO$_2$—, —SO—, or a combination thereof (for example, —NHCH$_2$CH$_2$NH—, —NHCONH—).

Each of the alkylene group, an alkenylene group, the alkynylene group, the arylene group, the divalent heterocyclic group, and the alkyl group, or aryl group of R may have a substituent. Examples of the substituent include the same as those recited in the aforementioned G.

The alkyl group and the aryl group of R' each have the same meanings as those recited in the aforementioned G.

As the divalent group, an alkylene group having 10 or less carbon atoms, an alkenylene group having 10 or less carbon atoms, an alkynylene group having 10 or less carbon atoms, an arylene group having 6 to 10 carbon atoms, a divalent heterocyclic group, —S—, —SO—, —SO$_2$—, or a combination thereof (for example, —SCH$_2$CH$_2$S—, —SCH$_2$CH$_2$CH$_2$S—) are more preferable.

A total carbon atom number of the divalent connecting group is preferably from 0 to 50, more preferably from 0 to 30, and further preferably from 0 to 10.

When Q, R, X, Y, and Z represent a trivalent group, it is preferable that the trivalent group is a trivalent hydrocarbon group, a trivalent heterocyclic group, >N—, or a combination with a divalent group (for example, >NCH$_2$CH$_2$NH—, >NCONH—).

A total carbon atom number of the trivalent connecting group is preferably from 0 to 50, more preferably from 0 to 30, and further preferably from 0 to 10.

In formula (Y), n is preferably 1 or 2, and more preferably 2.

In formula (Y), a preferable example of the substituent represented by X is an electron withdrawing group, especially having a Hammett substituent constant σp of 0.20 or more, and more preferably 0.30 or more. The upper limit of the σp value of the electron withdrawing group is preferably 1.0.

Specific examples of X, especially the electron withdrawing group having the σp value of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with other electron withdrawing group(s) having the σp value of 0.20 or more, a heterocyclic group, a halogen atom, an azo group, and a selenocyanate group.

Preferable examples of X include an acyl group having 2 to 12 carbon atoms, an acyloxy group having 2 to 12 carbon atoms, a carbamoyl group having 1 to 12 carbon atoms, an alkyloxycarbonyl group having 2 to 12 carbon atoms, an aryloxycarbonyl group having 7 to 18 carbon atoms, a cyano group, a nitro group, an alkylsulfinyl group having 1 to 12 carbon atoms, an arylsulfinyl group having 6 to 18 carbon atoms, an alkylsulfonyl group having 1 to 12 carbon atoms, an arylsulfonyl group having 6 to 18 carbon atoms, a sulfamoyl group having 0 to 12 carbon atoms, a halogenated alkyl group having 1 to 12 carbon atoms, a halogenated alkoxy group having 1 to 12 carbon atoms, a halogenated alkylthio group having 1 to 12 carbon atoms, a halogenated aryloxy group having 7 to 18 carbon atoms, an aryl group having 7 to 18 carbon atoms and substituted with at least two other electron withdrawing groups having the σp value of 0.20 or more, and a N, O, or S-containing 5- to 8-membered heterocyclic group having 1 to 18 carbon atoms.

X is more preferably a cyano group, an alkylsulfonyl group having 1 to 12 carbon atoms, an arylsulfonyl group having 6 to 18 carbon atoms, or a sulfamoyl group having 0 to 12 carbon atoms.

X is further preferably a cyano group, an alkylsulfonyl group having 1 to 12 carbon atoms, or a sulfamoyl group having 0 to 12 carbon atoms. Still further preferable X is a cyano group, or an alkylsulfonyl group having 1 to 12 carbon atoms.

In Formula (Y), preferable examples of Z include a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group.

The details of the group represented by Z are the same as those exemplified as the substituent on the heterocyclic group represented by G, and preferable examples of Z are also the same as those of the substituent on the heterocyclic group.

Z is especially preferably a substituted aryl group, and a substituted heterocyclic group, and furthermore preferably a substituted aryl group.

In Formula (Y), Q is preferably a hydrogen atom, a substituted or unsubstituted alkyl group, a substituted or unsubstituted acyl group, a substituted or unsubstituted alkylsulfonyl group, or a substituted or unsubstituted arylsulfonyl group, more preferably a hydrogen atom, a substituted or unsubstituted alkyl group, or a substituted or unsubstituted acyl group, and furthermore preferably a hydrogen atom.

In Formula (Y), R is preferably a substituted or unsubstituted alkyl group having total carbon atoms of 1 to 12, a substituted or unsubstituted aryl group having total carbon atoms of 6 to 18, or a substituted or unsubstituted heterocyclic group having total carbon atoms of 4 to 12, more preferably a straight chain or branched alkyl group having total carbon atoms of 1 to 8, furthermore preferably a secondary or tertiary alkyl group, and still further preferably a t-butyl group.

In Formula (Y), Y is preferably a hydrogen atom, a substituted or unsubstituted alkyl group having total carbon atoms of 1 to 12, a substituted or unsubstituted aryl group having total carbon atoms of 6 to 18, or a substituted or unsubstituted heterocyclic group having total carbon atoms of 4 to 12, more preferably a hydrogen atom, or a straight chain or branched alkyl group having total carbon atoms of 1 to 8, further preferably a hydrogen atom, or an alkyl group having total carbon atoms of 1 to 8, and still further preferably a hydrogen atom.

As a preferable combination of G, R, X, Y, Z and Q in the dye represented by Formula (Y), compounds in which at least one of G, R, X, Y, Z and Q is an aforementioned preferable group are preferable, and compounds in which two or more of G, R, X, Y, Z and Q are each an aforementioned preferable group are more preferable. Compounds in which all of G, R, X, Y, Z and Q are aforementioned preferable groups are most preferable.

Especially preferable combinations of G, R, X, Y, Z and Q in the dye represented by Formula (Y) include the following exemplary embodiments of (i) to (vii):

(i) G is preferably a 5- to 8-membered nitrogen-containing hetero ring, more preferably an S-triazine, pyrimidine, pyridazine, pyrazine, pyridine, imidazole, pyrazole, or pyrrol ring, further preferably an S-triazine, pyrimidine, pyridazine, pyrazole, or pyrazine ring, and still further preferably an S-triazine ring.

(ii) R is preferably a substituted or unsubstituted alkyl group having total carbon atoms 1 of 1 to 12, a substituted or unsubstituted aryl group having total carbon atoms of 6 to 18, or a substituted or unsubstituted heterocyclic group having total carbon atoms of 4 to 12, more preferably a straight chain or branched alkyl group having total carbon atoms of 1 to 8, further preferably a secondary or tertiary alkyl group, and still further preferably a t-butyl group.

(iii) X is especially preferably a cyano group, an alkylsulfonyl group having total carbon atoms of 1 to 12, an arylsulfonyl group having total carbon atoms of 6 to 18, or a sulfamoyl group having total carbon atoms of 0 to 12, further preferably a cyano group, or an alkylsulfonyl group having total carbon atoms of 1 to 12, and still further preferably a cyano group.

(iv) Y is preferably a hydrogen atom, a substituted or unsubstituted alkyl group having total carbon atoms of 1 to 12, a substituted or unsubstituted aryl group having total carbon atoms of 6 to 18, or a substituted or unsubstituted heterocyclic group having total carbon atoms of 4 to 12, more preferably a hydrogen atom, a straight chain or branched alkyl group having total carbon atoms of 1 to 8, further preferably a hydrogen atom, or an alkyl group having total carbon atoms of 1 to 8, and still further preferably a hydrogen atom.

(v) Z is preferably a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, and a substituted or unsubstituted heterocyclic group, further preferably a substituted aryl group, or a substituted heterocyclic group, and still further preferably a substituted aryl group.

(vi) Q is preferably a hydrogen atom, a substituted or unsubstituted alkyl group, a substituted or unsubstituted acyl group, a substituted or unsubstituted alkylsulfonyl group, or a substituted or unsubstituted arylsulfonyl group, more preferably a hydrogen atom, a substituted or unsubstituted alkyl group, or a substituted or unsubstituted acyl group, and further preferably a hydrogen atom.

(vii) n represents 1 or 2, and more preferably 2.

Among the compounds represented by Formula (Y), as the bis form (n=2), compounds represented by any one of the below-described Formulae (Y-1), (Y-2), (Y-3), (Y-4), and (Y-5) are preferable. Further, as the mono form (n=1), a compound having a one-sided structure represented by Formula (Y-1) in which G is omitted, a compound having a one-sided structure represented by Formula (Y-2) in which $L^1$ is omitted, a compound having a one-sided structure represented by Formula (Y-3) in which $L^2$ is omitted, a compound having a one-sided structure represented by Formula (Y-4) in which $L^3$ is omitted, and a compound having a one-sided structure represented by Formula (Y-5) in which $L^4$ is omitted, are preferable. In each of these compounds, a monovalent group bonds to each of the bonding sites of G, $L^1$, $L^2$, $L^3$, and $L^4$. The monovalent group here refers to the same monovalent group represented by R, X, Y, Z and Q in Formula (Y), and preferable embodiments thereof are also the same as those of R, X, Y, Z and Q. As the monovalent group, a hydrogen atom is preferable.

The details and preferable embodiments of Formulae (Y-1), (Y-2), (Y-3), (Y-4), and (Y-5) are explained below. The mono form is the same as the bis form, except for G, $L^1$, $L^2$, $L^3$, and $L^4$. Therefore, the bis form and the mono form are explained together.

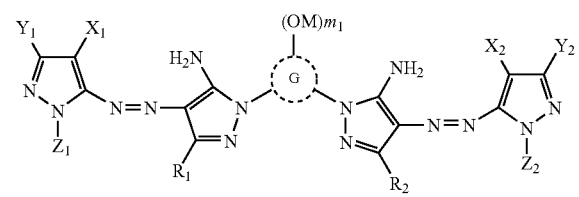

Formula (Y-1)

In Formula (Y-1), $R_1$, $R_2$, $X_1$, $X_2$, $Y_1$, $Y_2$, $Z_1$, and $Z_2$ each independently represent a monovalent group. G represents an atomic group necessary to form a 5- to 8-membered nitrogen-containing hetero ring. M represents a hydrogen atom or a cation. $m_1$ represents an integer of 0 to 3.

Examples of G include the same as those recited in G of the aforementioned Formula (Y). Examples of the monovalent group represented by $R_1$, $R_2$, $X_1$, $X_2$, $Y_1$, $Y_2$, $Z_1$ and $Z_2$ include the same as those recited in Q, R, X, Y and Z of Formula (Y).

Formula (Y-2)

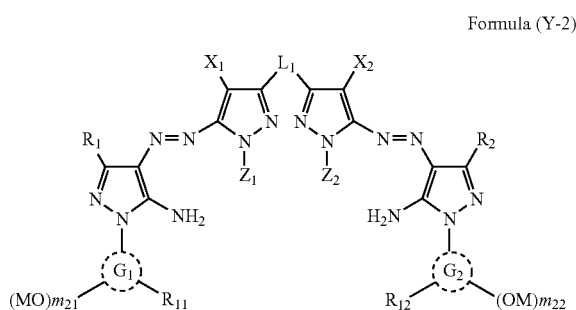

Formula (Y-4)

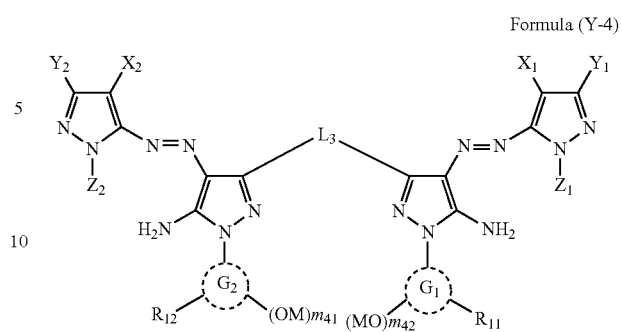

In Formula (Y-2), $R_1$, $R_2$, $R_{11}$, $R_{12}$, $X_1$, $X_2$, $Z_1$ and $Z_2$ each independently represent a monovalent group. $L_1$ represents a divalent connecting group. $G_1$ and $G_2$ each independently represent an atomic group necessary to form a 5- to 8-membered nitrogen-containing hetero ring. M represents a hydrogen atom or a cation. $m_{21}$ and $m_{22}$ each independently represent an integer of 0 to 3.

Examples of Gland $G_2$ include the same as those recited in G of Formula (Y). Examples of the monovalent group represented by $R_1$, $R_2$, $R_{11}$, $R_{12}$, $X_1$, $X_2$, $Z_1$ and $Z_2$ include the same as those recited in Q, R, X, Y and Z of Formula (Y). Examples of the divalent group represented by $L_1$ include the same as those recited when Q, R, X, Y and Z of Formula (Y) represent a divalent group.

In Formula (Y-4), $R_{11}$, $R_{12}$, $X_1$, $X_2$, $Y_1$, $Y_2$, $Z_1$, and $Z_2$ each independently represent a monovalent group. $L_3$ represents a divalent connecting group. $G_1$ and $G_2$ each independently represent an atomic group necessary to form a 5- to 8-membered nitrogen-containing hetero ring. M represents a hydrogen atom or a cation. $m_{41}$ and $m_{42}$ each independently represent an integer of 0 to 3.

Examples of $G_1$ and $G_2$ include the same as those recited in G of Formula (Y). Examples of the monovalent group represented by $R_{11}$, $R_{12}$, $X_1$, $X_2$, $Y_1$, $Y_2$, $Z_1$, and $Z_2$ include the same as those recited in Q, R, X, Y and Z of Formula (Y). Examples of the divalent group represented by $L_3$ include the same as those recited when Q, R, X, Y and Z of Formula (Y) represent a divalent group.

Formula (Y-3)

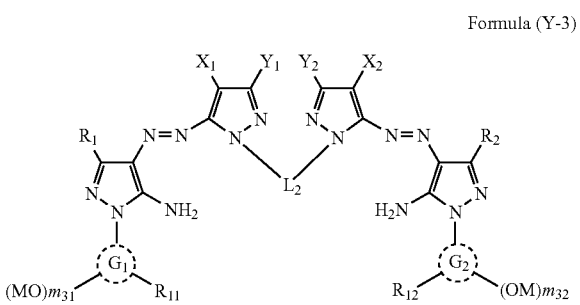

Formula (Y-5)

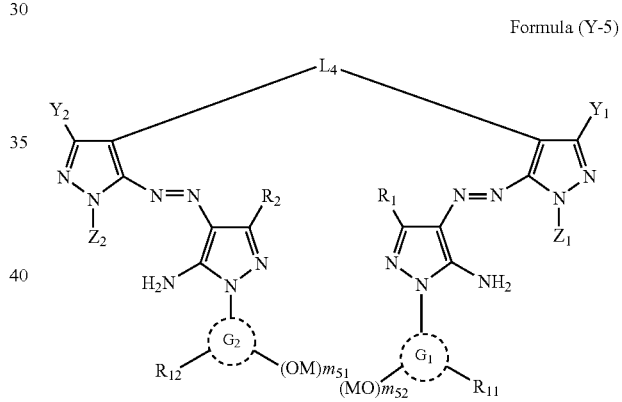

In Formula (Y-3), $R_1$, $R_2$, $R_{11}$, $R_{12}$, $X_1$, $X_2$, $Y_1$, and $Y_2$ each independently represent a monovalent group. $L_2$ represents a divalent connecting group. $G_1$ and $G_2$ each independently represent an atomic group necessary to form a 5- to 8-membered nitrogen-containing hetero ring. M represents a hydrogen atom or a cation. $m_{31}$ and $m_{32}$ each independently represent an integer of 0 to 3.

Examples of $G_1$ and $G_2$ include the same as those recited in G of Formula (Y). Examples of the monovalent group represented by $R_1$, $R_2$, $R_{11}$, $R_{12}$, $X_1$, $X_2$, $Y_1$, and $Y_2$ include the same as those recited in Q, R, X, Y and Z of Formula (Y). Examples of the divalent group represented by $L_2$ include the same as those recited when Q, R, X, Y and Z of Formula (Y) represent a divalent group.

In Formula (Y-5), $R_1$, $R_2$, $R_{11}$, $R_{12}$, $Y_1$, $Y_2$, $Z_1$, and $Z_2$ each independently represent a monovalent group. $L_4$ represents a divalent connecting group. $G_1$ and $G_2$ each independently represent an atomic group necessary to form a 5- to 8-membered nitrogen-containing hetero ring. M represents a hydrogen atom or a cation. $m_{51}$ and $m_{52}$ each independently represent an integer of 0 to 3.

Examples of $G_1$ and $G_2$ include the same as those recited in G of Formula (Y). Examples of the monovalent group represented by $R_1$, $R_2$, $R_{11}$, $R_{12}$, $Y_1$, $Y_2$, $Z_1$, and $Z_2$ include the same as those recited in Q, R, X, Y and Z of Formula (Y). Examples of the divalent group represented by $L_4$ include the same as those recited when Q, R, X, Y and Z of Formula (Y) represent a divalent group.

Among the compounds represented by Formula (Y), a compound having an S-triazine ring as the nitrogen-containing hetero ring that is formed by G, $G_1$, or $G_2$ in Formulae (Y-1), (Y-2), (Y-3), (Y-4), and (Y-5) is more preferable in terms of hue and storage stability.

Exemplified dyes DYE-1 to DYE-26 are shown below as specific examples of the compound represented by Formula (Y). However, the dyes used in the present invention are not limited to these compounds. Further, even though the chemical structures of the following compounds are described in the form of free acids, they may be used as salts thereof. Herein, preferable examples of the counter cation include alkali metals (for example, lithium, sodium or potassium), ammonium, and organic cations (for example, pyridinium, tetramethyl ammonium or guanidium).

Further, compounds that are the same as the following specific examples of the bis forms, except that the connection portions corresponding to G, $L^1$, $L^2$, $L^3$, and $L^4$ in Formulae (Y-1), (Y-2), (Y-3), (Y-4), and (Y-5) are omitted and substituted with monovalent groups, are also added as specific examples of the mono forms of the compounds represented by Formula (Y). Herein, a monovalent group has the same meaning as the monovalent groups represented by R, X, Y, Z and Q in Formula (Y), and preferable embodiments are also the same as those of R, X, Y, Z and Q, As the monovalent group, a hydrogen atom is preferable.

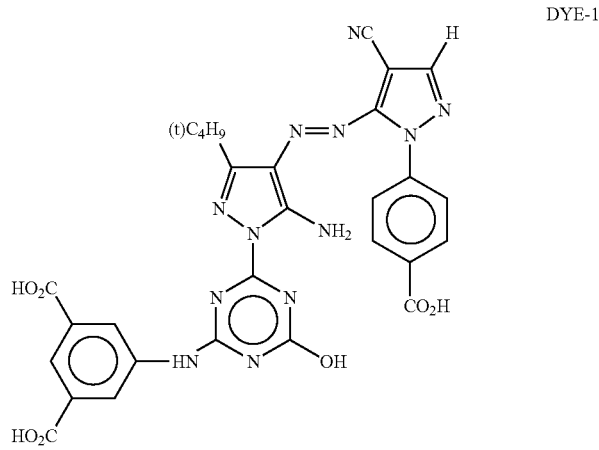

DYE-1

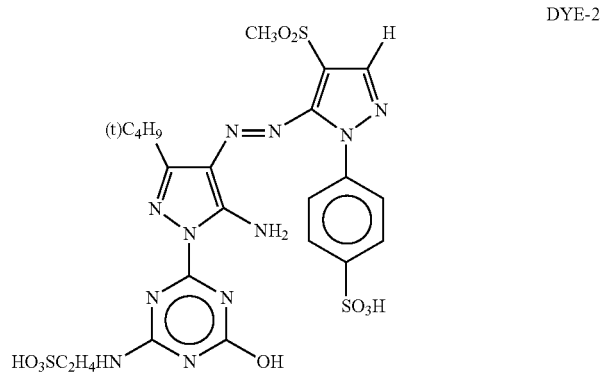

DYE-2

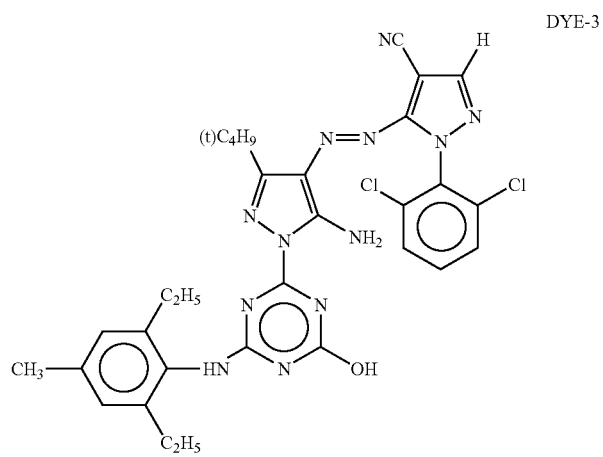

DYE-3

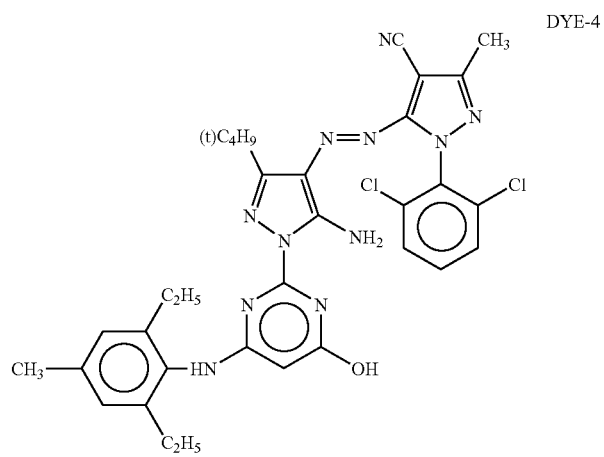

DYE-4

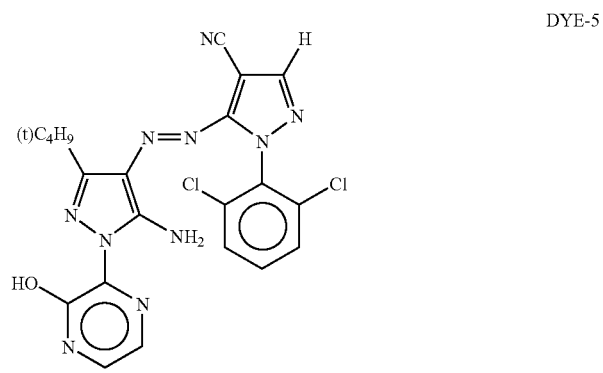

DYE-5

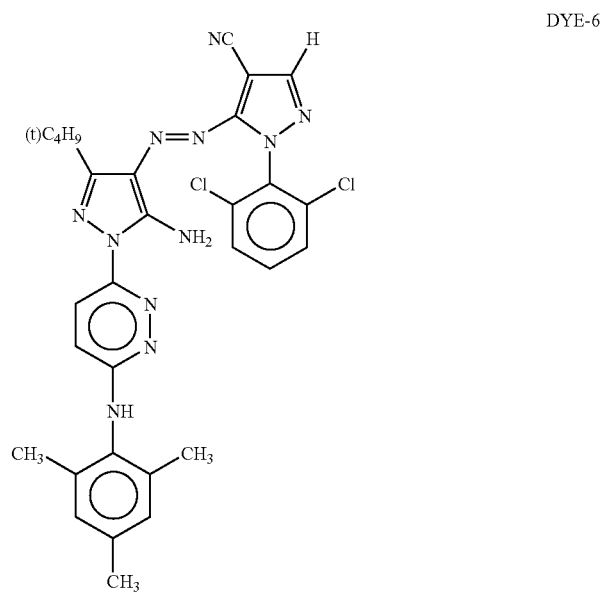

DYE-6

DYE-7
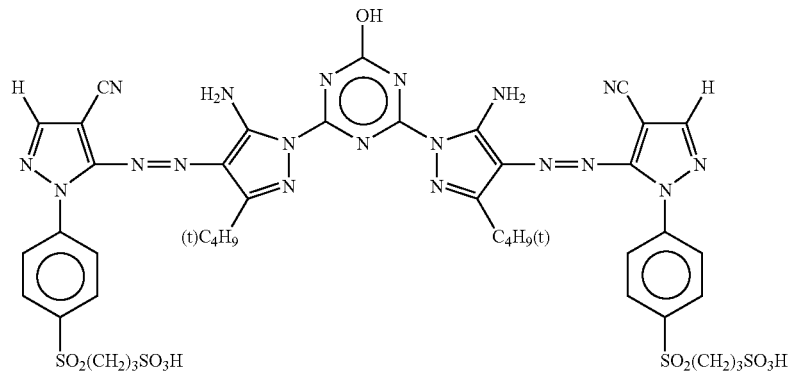
DYE-8
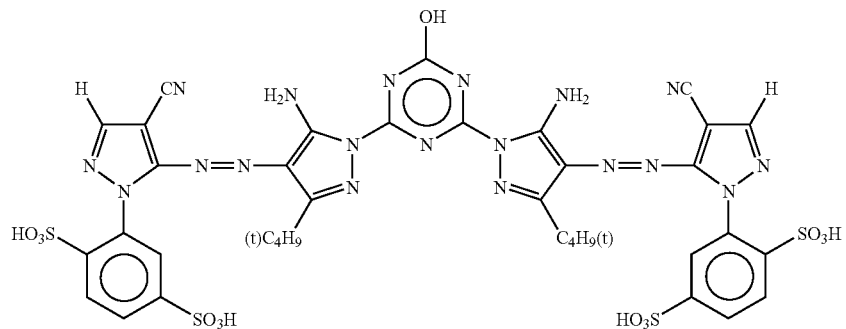
DYE-9
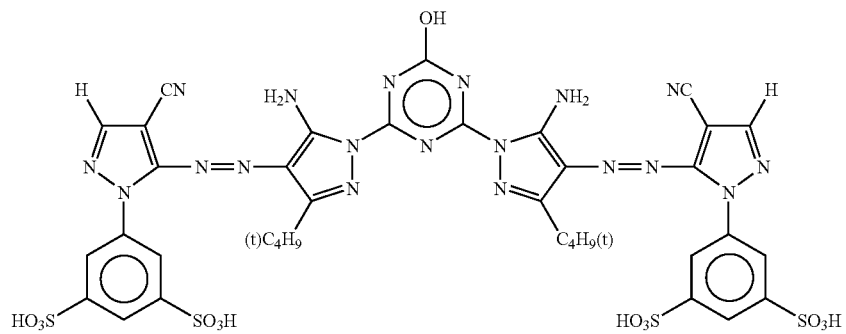
DYE-10
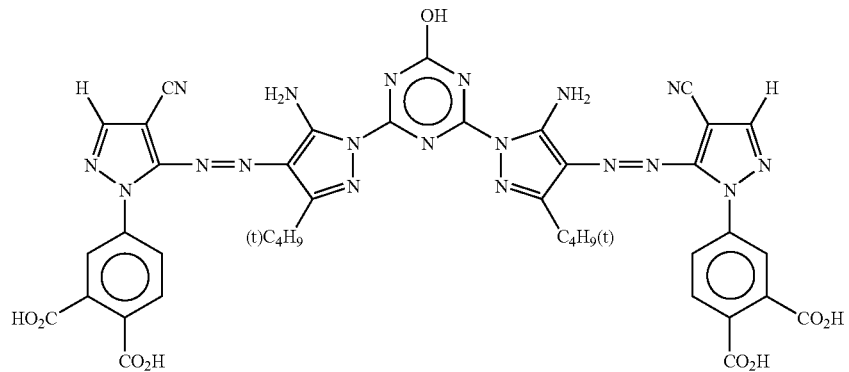

DYE-11
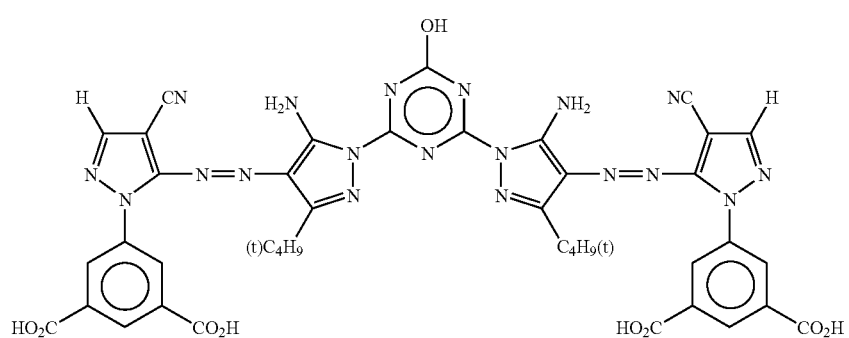
DYE-12
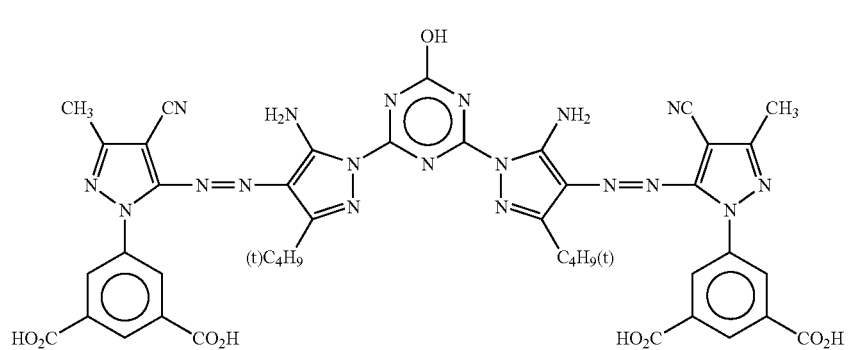
DYE-13
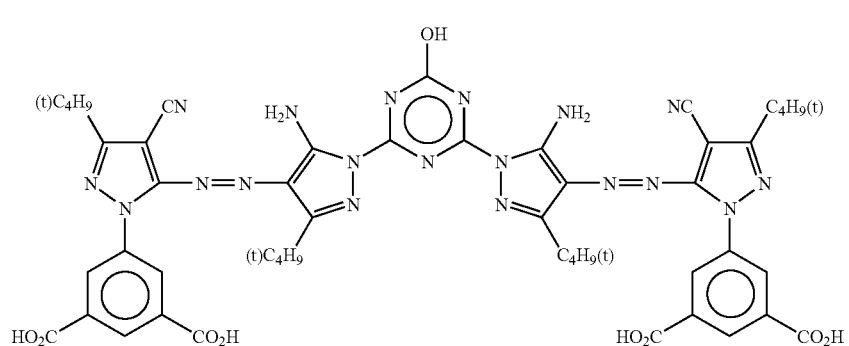
DYE-14
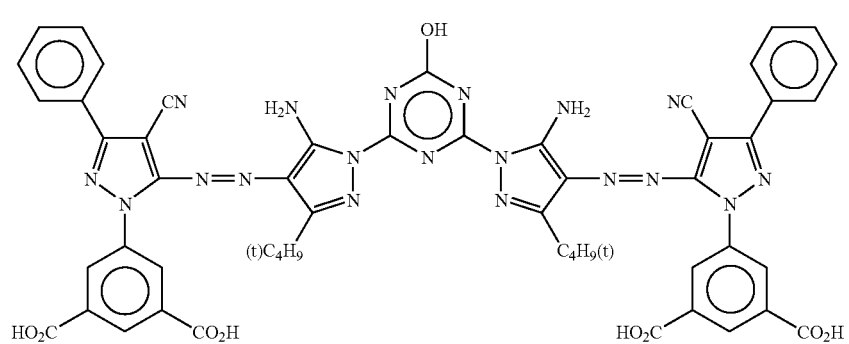

-continued
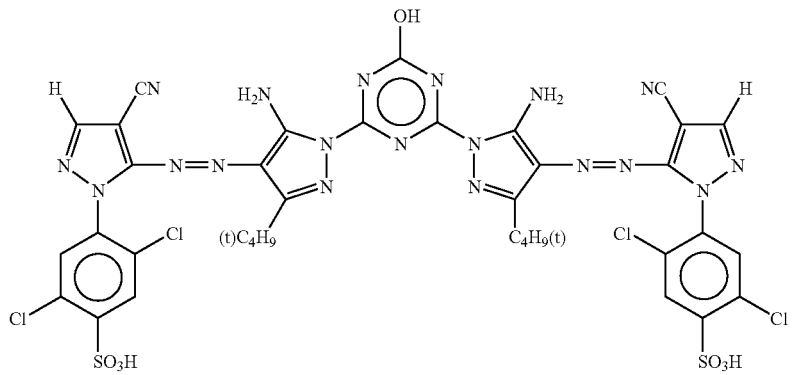
DYE-15
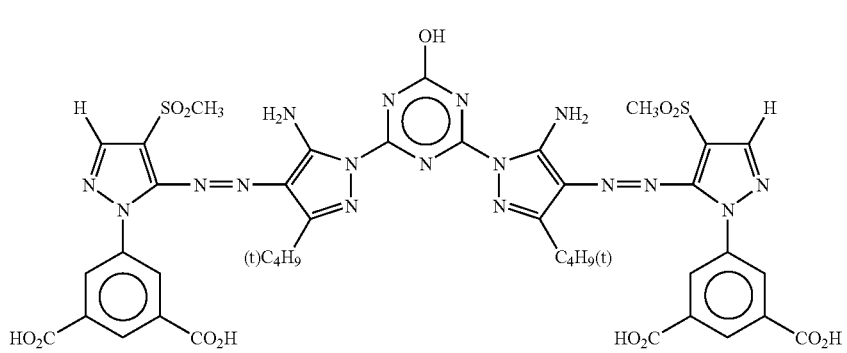
DYE-16
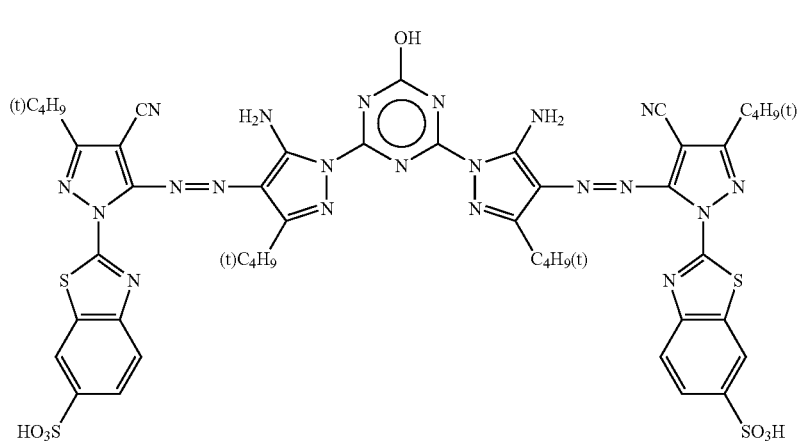
DYE-17
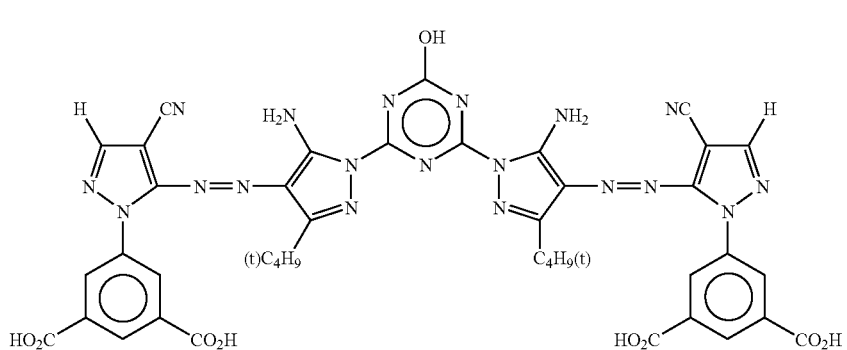
DYE-18

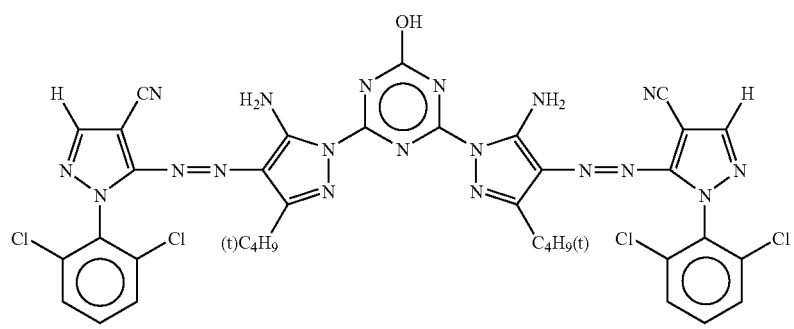
DYE-19
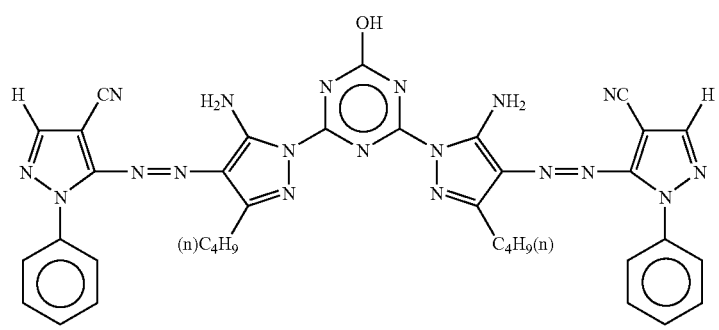
DYE-20
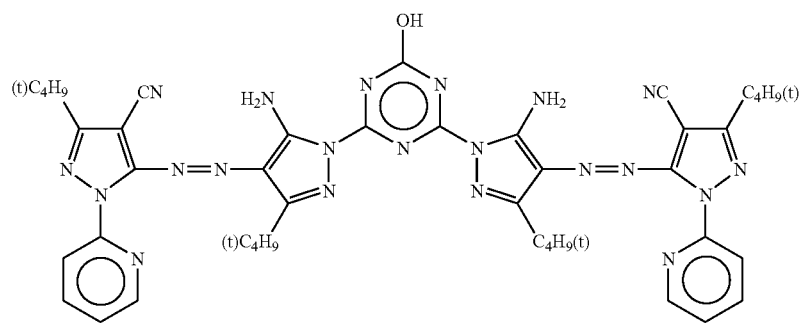
DYE-21
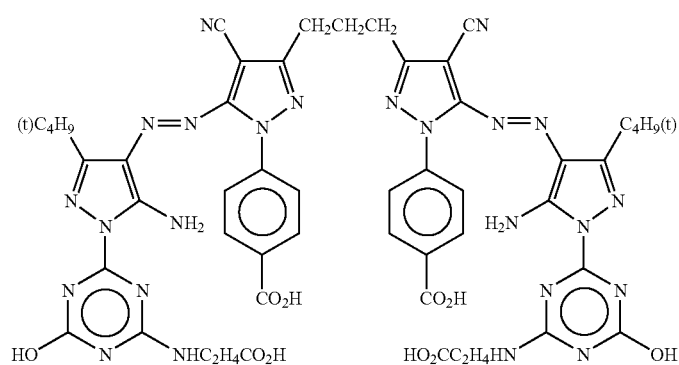
DYE-22

-continued
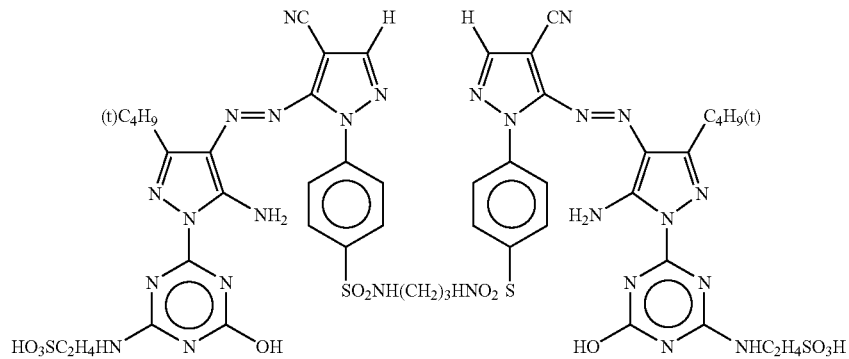
DYE-23
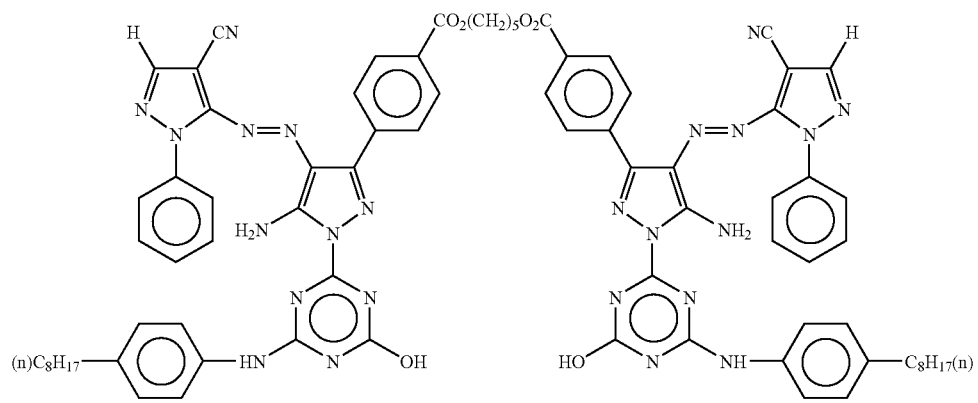
DYE-24
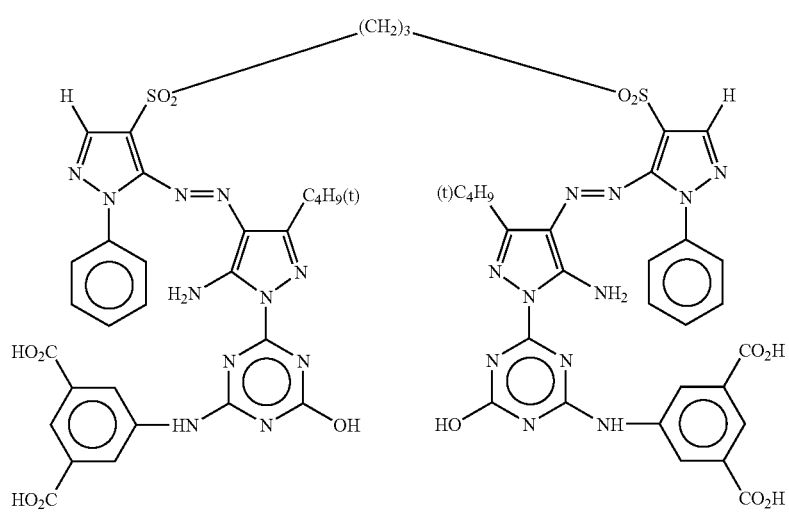
DYE-25

DYE-26

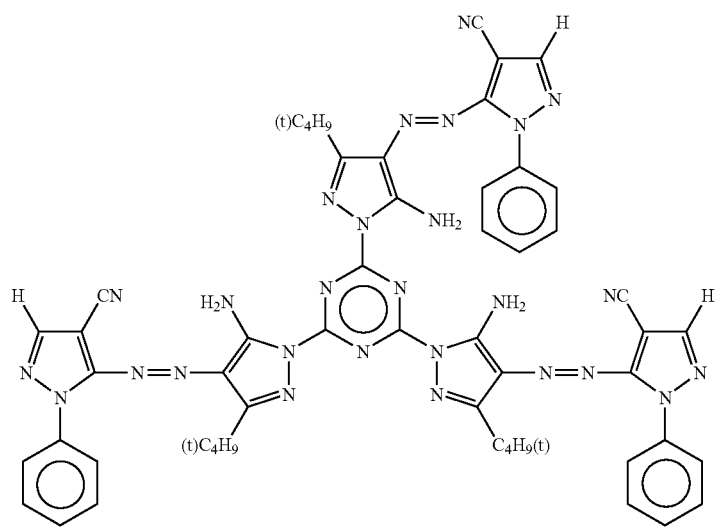

Among these compounds, as the compound represented by Formula (Y) that is contained in the yellow ink of the invention, it is preferable that the water-soluble azo dye ($y''^2$) that is a bis form and the water-soluble azo dye ($y''^1$) that is a mono form are similar to each other in their structure.

Specifically, an embodiment in which the water-soluble azo dye ($y''^2$) is represented by Formula (Y-1), and the water-soluble azo dye ($y''^1$) is a compound having a one-sided structure represented by Formula (Y-1) in which G is omitted and substituted with a monovalent group, is preferable. In a similar manner, embodiments in which the water-soluble azo dye ($y''^2$) is represented by Formula (Y-2), (Y-3), (Y-4), or (Y-5), and the water-soluble azo dye ($y''^1$) is a compound having a one-sided structure represented by Formula (Y-2) in which $L^1$ is omitted and substituted with a monovalent group, a compound having a one-sided structure represented by Formula (Y-3) in which $L^2$ is omitted and substituted with a monovalent group, a compound having a one-sided structure represented by Formula (Y-4) in which $L^3$ is omitted and substituted with a monovalent group, and a compound having a one-sided structure represented by Formula (Y-5) in which $L^4$ is omitted and substituted with a monovalent group, are preferable.

The monovalent group here has the same meaning as the monovalent groups represented by R, X, Y, Z and Q in Formula (Y), and preferable embodiments are also the same as those of R, X, Y, Z and Q. As the monovalent group, a hydrogen atom is preferable.

The compound represented by Formula (Y) or a salt thereof may be synthesized with reference to the synthetic methods described in, for example, JP-A Nos. 2001-279145, 2003-277661, 2003-2777662, and 2004-83903.

The total content of the yellow dye in the inkjet recording yellow ink of the invention is preferably in the range of 3% by mass to 7% by mass relative to the total mass of the yellow ink. If the total content of the yellow dye is 3% by mass or more, the amount of ink droplets spotted to the image receiving sheet may be controlled so as not to be excessive. As a result, an image free of bleeding may be recorded at high speed. Further, if the total content of the yellow dye is 7% by mass or less, it is possible to obtain a high quality recorded image with favorable granularity.

It is preferable that the inkjet recording yellow ink of the invention contains, as a dye, the mono form water-soluble azo dye ($y''^1$) and the bis form water-soluble azo dye ($y''^2$), each of which is represented by Formula (Y), in an amount of 80% by mass or more in terms of the sum total content of both dyes relative to the total amount of dyes in the ink. If the total amount of the water-soluble azo dye ($y''^1$) and the water-soluble azo dye ($y''^2$) is in the above-described range, deterioration of color balance owing to drastic fading may be suppressed. As a result, it is possible to obtain an image excellent in storage stability over a long period of time.

For this reason, the total amount of the water-soluble azo dye ($y''^1$) and the water-soluble azo dye ($y''^2$) is preferably 85% by mass or more, and more preferably 90% by mass or more, in terms of the sum total content of both dyes relative to the total amount of dyes in the yellow ink.

Herein, the inkjet recording yellow ink of the invention may contain other yellow dyes in combination with the compound represented by Formula (Y) or a salt thereof (the water-soluble azo dye ($y''^1$) and the water-soluble azo dye ($y''^2$) are included therein). The other yellow dye is not particularly limited, but any known dyes may be selectively used.

[Water-Soluble Organic Solvent]

The yellow ink of the invention may contain at least one water-soluble organic solvent. Herein, the term "water-soluble" of the water-soluble organic solvent means that the solubility in water (25° C.) is 1 g/100 g or more.

Examples of the water-soluble organic solvent include alcohols (for example, methanol, ethanol, propamol, isopropanol, butanol, isobutanol, sec-butanol, t-butanol, pentanol, hexanol, cyclohxanol, benzylalcohol), polyvalent alcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexane triol), glycol derivatived (for example, ethylene glycol monomethylether, ethylene glycol monoethylether, ethylene glycol monobutylether, diethylene glycol monomethylether, diethylene glycol monobutylether, propylene glycol monomethylether, propylene glycol monobutylether, dipropylene glycol monomethylether, triethyleneglycol monomethylether, ethylene glycol diacetate, ethylene glycol monomethylether acetate, triethyleneglycol monoethylether, and ethylene glycol monophenylether, amines (for example, ethanolamine, diethanolamine, triethanolamine, N-methyldiethanolamine, N-ethyldiethanolamine, morpholine, N-ethyl morpholine, ethylenediamine, diethylenetriamine, triethylenetetramine, polyethyleneimine, tetramethylpropylenediamine), urea, urea derivatives, and other polar solvents (for example, formamide, N,N-dimethylformamide, N,N-dimethylacetamide, 2-pyrolidone, N-methyl-2-pyrolidone, N-vinyl-2-pyrolidone, 2-oxazolidone, 1,3-dimethyl-2-imidazolidinone, acetonitrile, acetone).

A content of the water-soluble organic solvent in the yellow ink is preferably from 10% by mass to 80% by mass, and more preferably from 20% by mass to 60% by mass. Herein, the water-soluble organic solvent may be a liquid or solid compound at 25° C. The water-soluble organic solvent may be used in combination of two kinds or more.

[Surfactant]

It is preferable that the inkjet recording yellow ink of the invention further contains a surfactant together with the water-soluble azo dyes represented by Formula (Y) and the water-soluble organic solvent. The surfactant is contained as a surface tension adjusting agent, by which static surface tension or dynamic surface tension can be adjusted.

Examples of the surfactant include nonionic, cationic, or anionic surfactants. In the yellow ink of the invention, it is more preferable to contain a nonionic surfactant from the viewpoints of both storage stability and ejection stability of the ink, and moreover a rapid permeability of ink to a receiver paper.

Examples of the nonionic surfactant include polyoxyethylene alkylether, polyoxyethylene alkylarylether, polyoxyethylene fatty acid ester, sorbitan fatty acid ester, polyoxyethylene sorbitan fatty acid ester, polyoxyethylene alkylamine, glycerin fatty acid ester, and oxyethyleneoxypropylene blockcopolymer. Among these compounds, acetylene diol-series surfactants are preferable from the viewpoints of ejection stability of the ink and a rapid permeability of ink to a receiver paper. As the acetylene diol-series surfactant, acetylene glycol (preferably acetylene-series polyoxyethyleneoxide) surfactants are preferable. Examples of the acetylene glycol surfactants include SURFYNOLS (for example, SURFYNOL 465, manufactured by Air Product & Chemicals).

A content of the surfactant in the yellow ink is preferably from 0.001% by mass to 15% by mass, more preferably from 0.005% by mass to 10% by mass, further preferably from 0.01% by mass to 5% by mass, and still further preferably from 0,1% by mass to 5% by mass, based on the total mass of the ink.

If the content of the surfactant (especially nonionic surfactants) is within the above-described range, it is advantageous in that good ejection stability can be achieved.

The surface tension of the yellow ink at 25° C. is preferably from 20 mN/m to 50 mN/m, and more preferably from 25 mN/m to 40 mN/m, which values are common to the static surface tension and the dynamic surface tension. If the surface tension is 50 mN/m or less, ejection stability is improved. Further, image quality is also improved owing to the fact that generation of bleeding, feathering and the like when multi-colors are ejected is suppressed by the particular surface tension. Also, if the surface tension is 20 mN/m or more, adhesion of the ink to a surface of the hardware at time of ink ejection is effectively prevented by the particular surface tension.

With respect to measurement of static surface tension, a capillary rise method, a falling-drop method and a hanging ring method are known to be applicable. However, a vertical plate method is adopted as the static surface tension measurement in the invention. The principle of the vertical plate method is explained below. When hanging a thin plate of glass or platinum in a vertical direction so as to immerse a part of the thin plate into a liquid, the surface tension of the liquid acts downward along the length of the contact between the liquid and the thin plate. The surface tension can be determined by balancing this downward force with an upward force hanging the thin plate.

With respect to measurement of dynamic surface tension, on the other hand, a vibrating jet method, a meniscus dropping method and a maximum bubble pressure method are known to be applicable, as described in Shin Jikken Kagaku Koza, vol. 18 (Kaimen to Colloid), pp. 69 90, Maruzen Co., Ltd. (1977). In addition, the liquid membrane break method as disclosed in JP-A No. 3-2064 is also known to be applicable. However, the measurement of dynamic surface tension in the invention is carried out using a bubble pressure differential method. The principle of this method and the way to measure are explained below.

Air bubbles are generated in a surfactant-added solution rendered homogeneous by stirring, and thereby a new air-liquid interface is formed and the surfactant molecules in the solution are gathered on the water surface at a constant rate. When the bubble rate (the bubble generation rate) is made slower in making changes thereto, a greater number of surfactant molecules can be gathered on the bubble surface, and the maximum bubble pressure right before bubbles burst can be lowered. As a result, the maximum bubble pressure (surface tension) relative to the bubble rate can be detected. For determination of dynamic surface tension in the invention, it is possible to suitably use a method of generating air bubbles in a solution by use of two probes large and small, measuring a pressure difference between the two probes under the maximum bubble pressure conditions, and therefrom calculating the dynamic surface tension.

If necessary, the inkjet recording yellow ink of the invention may properly contain, in addition to the aforementioned components, any one or more additives such as a desiccation-preventing agent (wetting agent), a bleeding modifier, an anti-bronze agent, an association promoter, a permeation promoter, an ultrviolet absorber, an antioxidant, an antifoaming agent, a viscosity-adjusting agent, a dispersant, a dispersion stabilizer, a fungicide, an anti-rusting agent, or a pH adjusting agent.

The details of these additives are described in JP-A Nos. 2007-197491 and 2008-101173.

<Inkjet Recording Ink Set>

The inkjet recording ink set of the invention is composed of at least a yellow ink, a magenta ink and a cyan ink. Further, as aforementioned, at least one of the yellow ink is composed of at least two yellow inks containing the water-soluble azo dye $(y^{n1})$ selected from the group consisting of a compound represented by the above-described Formula (Y) in which n is 1, and a salt thereof, and the water-soluble azo dye $(y^{n2})$ selected from the group consisting of a compound represented by the above-described Formula (Y) in which n is 2, and a salt thereof.

By using the inkjet recording ink set, it is possible to record a multi-color image (for example, a full color image). A hue of each of the colorants such as a pigment that are used in the inks may be changed as desired to provide a magenta tone ink, a cyan tone ink, and a yellow tone ink for recording of a full color image. Further, a black tone ink may be used to adjust a tone. Alternatively, aside from the tones of yellow (Y), magenta (M), and cyan (C), a red (R) tone ink, a green (G) tone ink, a blue (B) tone ink, a white (W) tone ink, or a so-called specific color ink in the field of graphic arts may be used.

In the inkjet recording ink set of the invention (hereinafter, also referred to simply as "ink set of the invention"), a pyrazole azo-series yellow dye is not contained simply as a yellow coloring dye, but both mono form and bis form of the pyrazole azo-series yellow dye are contained together in the ink. Utilizing the fact that the mono form is inferior in fastness to the bis form and the mono form and the bis form has similar hue to each other, adjustment of the fading balance of a multicolor image over time is possible while maintaining a desired yellow color tone. According to the invention, it is possible to obtain an image having a good color balance and excellent storage stability for a long time.

The inkjet recording ink set of the invention contains the aforementioned inkjet recording yellow ink of the invention, a magenta ink containing a magenta dye, and an cyan ink containing a cyan dye. If necessary, the ink set of the invention may be composed of the other color inks such as a black ink in addition to these inks. The details of the inkjet recording yellow ink of the invention are described above.

Each of the cyan ink, the magenta ink, and an optionally used other color inks such as a black ink may be composed of a dye, a water-soluble organic solvent, a surfactant, or other additives in the same manner as the aforementioned yellow ink. The details and preferable embodiments of each of the water-soluble organic solvent, the surfactant, and the other additives are the same as those recited in the aforementioned yellow ink.

Dyes that are suitably used in the cyan ink, the magenta ink, and the black ink are described in detail below.

[Water-Soluble Phthalocyane Dye]

Firstly, as a dye in the cyan ink, a compound represented by the following Formula (C-1) and a salt thereof (water-soluble phthalocyane dye) are preferable. When the water-soluble phthalocyane dye is used in combination with the compound represented by Formula (Y) (water-soluble azo yellow dye) to record an image, a color balance of the image can be maintained stably over a lengthy period, and therefore such a specific combination use of these dyes is preferable to obtain an image excellent in storage stability.

Formula (C-1)

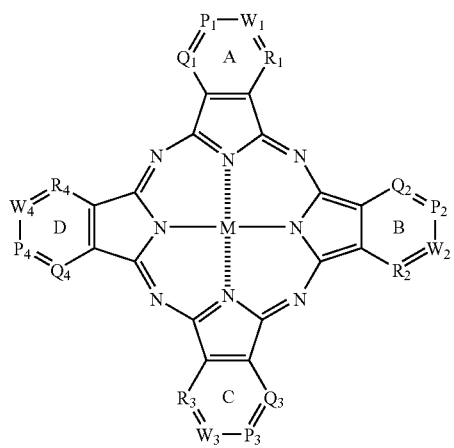

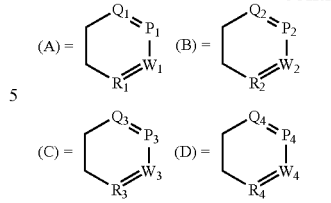

In Formula (C-1), $Q_1$ to $Q_4$, $P_1$ to $P_4$, $W_1$ to $W_4$, and $R_1$ to $R_4$ each independently represent ($=C(J_1)$- or $-N=$), ($=C(J_2)$- or $-N=$), ($=C(J_3)$- or $-N=$) or ($=C(J_4)$- or $-N=$). $J_1$ to $J_4$ each independently represent a hydrogen atom or a substituent. M represents a hydrogen atom, a metal element, a metal oxide, a metal hydroxide or a metal halide.

Four rings, namely ring A containing $Q_1$, $P_1$, $W_1$ and $R_1$, ring B containing $Q_2$, $P_2$, $W_2$ and $R_2$, ring C containing $Q_3$, $P_3$, $W_3$ and $R_3$, and ring D containing $Q_4$, $P_4$, $W_4$ and $R_4$ each independently represent an aromatic hydrocarbon ring or a hetero ring.

From a viewpoint of storage stability of the image, it is preferable that at least one of the ring A to the ring D is a hetero ring. When 1 or 2, or more of the ring A to the ring D are a hetero ring, a nitrogen-containing hetero ring is preferable as the hetero ring. As the nitrogen-containing hetero ring, a pyridine ring, a pyrazine ring, a pyrimidine or a pyridazine ring is preferable. Among these rings, a pyridine ring, or a pyrazine ring is more preferable. Especially a pyridine ring is preferable.

From a viewpoint of hue and color reproduction, it is preferable that at least one of the ring A to the ring D is an aromatic hydrocarbon ring. Further, it is more preferable that at least two of the ring A to the ring D is an aromatic hydrocarbon ring.

When $J_1$ to $J_4$ each independently represent a substituent, the substituent is preferably a electron-attractive group. Further, it is preferable that at least one of $J_1$ to $J_4$ is a substituent having an ionic hydrophilic group.

When 1 or 2, or more of the ring A to the ring D are an aromatic hydrocarbon ring, they are preferably represented by the following Formula (I).

Formula (I)

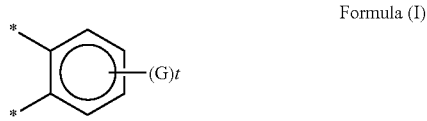

In Formula (I), "*" indicates a bond site to the phthalocyanine skeleton. G represents $-SO-Z_1$, $-SO_2-Z_1$, $-SO_2NZ_2Z_3$, $-CONZ_2Z_3$, $-CO_2Z_1$, $-COZ_1$, or a sulfo group. t represents an integer of 1 to 4.

When plural $Z_1$'s are present, they may be the same or different. $Z_1$ represents a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

In Formula (I), $Z_1$ is preferably a substituted or unsubstituted alkyl group, a substituted or unsubstituted aryl group, or a substituted or unsubstituted heterocyclic group, and more preferably a substituted alkyl group, or a substituted aryl group, and further preferably a substituted alkyl group.

$Z_2$ and $Z_3$, which may be the same or different, each independently represent a hydrogen atom, a substituted or unsubstituted alkyl group, a substituted or unsubstituted cycloalkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group.

In Formula (I), $Z_2$ and $Z_3$, which may be the same or different, are preferably a hydrogen atom, a substituted or unsubstituted alkyl group, a substituted or unsubstituted aryl group, or a substituted or unsubstituted heterocyclic group, and more preferably a hydrogen atom, a substituted alkyl group, or a substituted aryl group, and further preferably one of $Z_2$ and $Z_3$ is a hydrogen atom, and the other is a substituted alkyl group, or a substituted aryl group.

In Formula (I), G is preferably —SO-$Z_1$, —SO$_2$-$Z_1$, —SO$_2$NZ$_2$Z$_3$, —CONZ$_2$Z$_3$, —CO$_2$Z$_1$, or —COZ$_1$, more preferably —SO-$Z_1$, —SO$_2$-$Z_1$, or —SO$_2$NZ$_2$Z$_3$, and further preferably —SO-$Z_1$.

In Formula (I), t is preferably an integer of 1 to 3, more preferably an integer of 1 to 2, and further preferably 1.

In the water-soluble phthalocyanine dye represented by the following Formula (C-1), when 1 or 2, or more of the ring A to the ring D are an aromatic hydrocarbon ring, at least one aromatic hydrocarbon ring is preferably represented by the following Formula (II).

Formula (II)

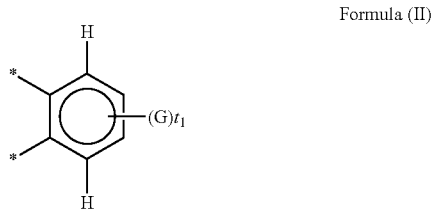

In Formula (II), "*" indicates a bond site to the phthalocyanine skeleton. G has the same meaning as that in Formula (I). Preferable embodiments of G are the same as those in Formula (I).

In Formula (II), $t_1$ represents 1 or 2. Especially, t is preferably 1.

In the cyan ink used in the invention, in addition to the water-soluble phthalocyanine dye represented by Formula (C-1), other cyan dye for adjusting a hue of the cyan ink may be used in such an amount that both light fastness and ozone resistance are not deteriorated by the other cyan dye. As the other cyan dye, for example, a dye represented by the following Formula (C-5), or a dye mixture thereof may be used.

Formula (C-5)

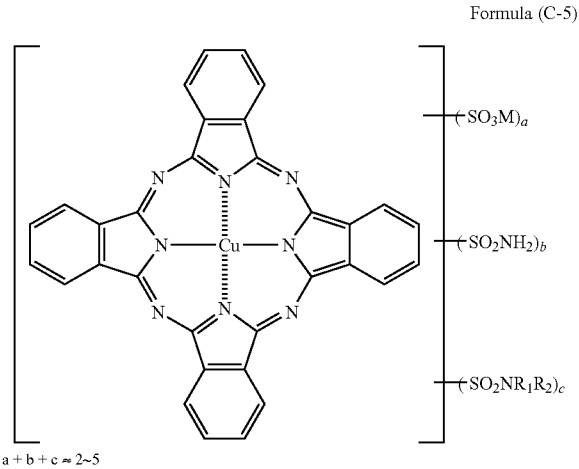

$a + b + c \approx 2\sim5$

M=Li and/or Na and/or K and/or NH$_4$

In Formula (C-5), $R_1$ and $R_2$ each independently represent a hydrogen atom or a monovalent substituent. Further, the substituent may have a substituent. a represents an integer of 0 to 5. b represents an integer of 0 to 5. c represents an integer of 0 to 5.

Further, examples of the other cyan dye include C.I. DIRECT BLUE 1, 10, 15, 22, 25, 55, 67, 68, 71, 76, 77, 78, 80, 84, 86, 87, 90, 98, 106, 108, 109, 151, 156, 158, 159, 160, 168, 189,192, 193, 194, 199, 200, 201, 202, 203, 207, 211, 213, 214, 218, 225, 229, 236, 237, 244, 248, 249, 251, 252, 264, 270, 280, 288, 289, 291, C.I. ACID BLUE 9, 25, 40, 41, 62, 72, 76, 80, 82, 92, 106, 112, 113, 120, 127:1, 129, 138, 143, 175, 181, 205, 207, 78, 220, 221, 230, 232, 247, 258, 260, 264, 271, 277, 278, 279, 280, 288, 290, 326, C.I. REACTIVE BLUE 2, 3, 5, 8, 10, 13, 14, 15, 17, 18, 19, 21, 25, 26, 27, 28, 29, 38, C.I. BASIC BLUE 1, 3, 5, 7, 9, 22, 26, 41, 45, 46, 47, 54, 57, 60, 62, 65, 66, 69, and 71. However, the invention is not limited to these dyes.

In the cyan ink used in the invention, other dyes may be used together with the compounds represented by the above-described Formula (C-1) or Formulae (C-1)/(C-5). The other dyes are not particularly limited, and may be optionally selected from known dyes.

[Water-Soluble Azo Dye (Magenta Series)]

Next, as the dye in the magenta ink, a water-soluble azo dye represented by Formula (M-1) set forth below is preferable. When the water-soluble azo dye is used together with the compound (yellow aqueous azo dye) represented by the above-described Formula (Y) to carry out image recording, a color balance of the image is maintained stably for a long time. Therefore, a combination of these dyes is preferable to obtain an image excellent in storage stability.

Formula (M-1)

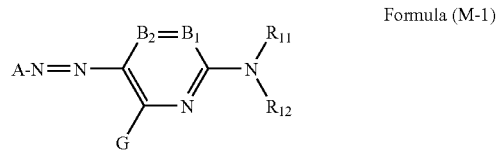

In Formula (M-1), A represents a residue of a 5-membered hetero ring diazo component A-NH$_2$. $B_1$ and $B_2$ each independently represent —CR$_{13}$= or —CR$_{14}$=, or alternatively one of $B_1$ and $B_2$ is a nitrogen atom, and the other is —CR$_{13}$=, or —CR$_{14}$=. $R_{11}$ and $R_{12}$ each independently represent a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group. Further, each of these groups may have a substituent. G, $R_{13}$, and $R_{14}$ each independently represent a hydrogen atom, a halogen atom, an alkyl group, an alkenyl group, an alkynyl group, aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, a ureido group, a sulfamoylamino group, an alkoxycarbonylamino group, an aryloxycarbonylamino group, an alkyl or arylsulfonylamino group, a nitro group, an alkyl or arylthio group, an alkyl or arylsulfonyl group, an alkyl or arylsulfinyl group, a sulfamoyl group, a heterocyclic thio group, or an ionic hydrophilic group. Further, each of the above groups may have a substituent. $R_{13}$ and $R_{11}$, or $R_{11}$ and $R_{12}$ may bond with each other to form a 5- or 6-membered ring. Herein, Formula (M-1) must have at least one ionic hydrophilic group.

In the invention, a preferable A in the Formula (M-1) is a 5-membered hetero ring. Examples of the hetero atom include N, O, and S. The 5-membered hetero ring is preferably a 5-membered nitrogen-containing hetero ring to which an aliphatic ring, an aromatic ring or other hetero ring may be condensed. Preferable examples of the hetero ring include pyrazole, imidazole, triazole, thiazole, isothiazole, thiadiazole, benzothiazole, benzoxazole, and benzoisothiazole rings. Further, each heterocyclic group may have a substituent. Among these heterocyclic groups, those represented by the following Formulae (a) to (i) are preferable.

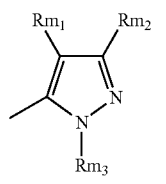
(a)

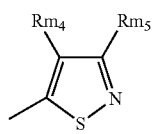
(b)

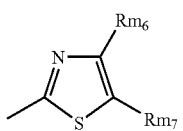
(c)

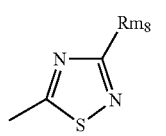
(d)

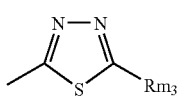
(e)

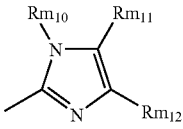
(f)

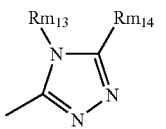
(g)

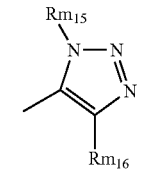
(h)

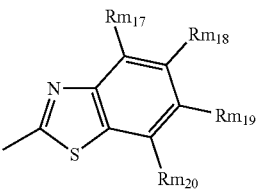
(i)

In Formulae (a) to (i), $Rm_1$ to $Rm_{20}$ have the same meanings as $R_{13}$ and $R_{14}$ in Formula (M-1).

In Formula (M-1), $B_1$ and $B_2$ each independently represent —$CR_{13}$=, or —$CR_{14}$=, or alternatively one of $B_1$ and $B_2$ is a nitrogen atom, and the other is —$CR_{13}$=, or —$CR_{14}$=. When $B_1$ and $B_2$ represent —$CR_{13}$=, or —$CR_{14}$=, more excellent properties are obtained. From this point, the above-described embodiment is preferable.

In Formula (M-1), it is preferable that $R_{11}$ and $R_{12}$ each independently represent a hydrogen atom, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group, more preferably a hydrogen atom, a substituted aryl group, or a substituted heterocyclic group, and further preferably a substituted aryl group, or a substituted heterocyclic group. $R_{11}$ and $R_{12}$ is not a hydrogen atom at the same time.

In Formula (M-1), it is preferable that G is a hydrogen atom, a halogen atom, an alkyl group, an alkenyl group, an alkynyl group, an aralkyl group, an aryl group, a hydroxyl group, an alkoxy group, an aryloxy group, an acyloxy group, a heterocyclic oxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl or arylsulfonylamino group, an alkyl or arylthio group, a heterocyclic thio group, or an ionic hydrophilic group. Further, each of the above groups may have a substituent.

Further, it is preferable that G is a hydrogen atom, a halogen atom, an alkyl group, a hydroxyl group, an alkoxy group, an aryloxy group, an acyloxy group, an amino group substituted with an alkyl group, an aryl group, or a heterocyclic group, or an acylamino group.

Among these groups, it is more preferable that G is a hydrogen atom, an amino group substituted with an aryl group, or a heterocyclic group, or an acylamino group. It is further preferable that G is an amino group substituted with an aryl group having a substituent.

In Formula (M-1), it is preferable that $R_{13}$ and $R_{14}$ are each independently a hydrogen atom, an alkyl group, a cyano group, a carboxyl group, a carbamoyl group, or an alkoxycarbonyl group. Further, each of the above groups may have a substituent.

In more detail, a hydrogen atom, an alkyl group, a cyano group, or a carboxyl group is more preferable. Further, it is more preferable that $R_{13}$ is a hydrogen atom, and $R_{14}$ is an alkyl group. It is further preferable that $R_{13}$ is a hydrogen atom, and $R_{14}$ is a methyl group.

As a preferable combination of A, $B_1$, $B_2$, $R_{11}$ to $R_{14}$, and G in the compound represented by Formula (M-1), compounds in which at least one of A, $B_1$, $B_2$, $R_{11}$ to $R_{14}$, and G is an aforementioned preferable group are preferable, and compounds in which two or more of A, $B_1$, $B_2$, $R_{11}$ to $R_{14}$, and G are each an aforementioned preferable group are more preferable. Compounds in which all of A, $B_1$, $B_2$, $R_{11}$ to $R_{14}$, and G are aforementioned preferable groups are most preferable.

In the invention, the compound represented by Formula (M-1) is preferably a compound represented by the formula (M-2).

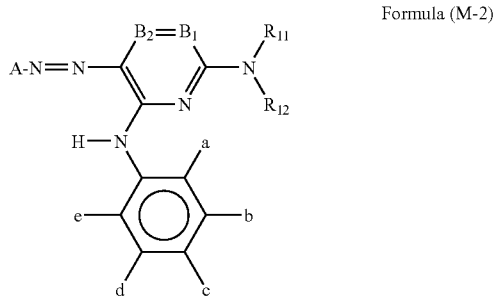

Formula (M-2)

In Formula (M-2), A, $B_1$, $B_2$, $R_{11}$ and $R_{12}$ each have the same meanings as those of the formula (M-1).

a and e each independently represent an alkyl group, an alkoxy group, a halogen atom, with the proviso that when both a and e are an alkyl group, a total number of carbon atoms that constitute the alkyl group is 3 or more. These groups may be further substituted.

b, c, and d each independently have the same meanings as $R_{13}$ and $R_{14}$ of the formula (M-1). a and b, or e and d may bond with each other to form a condensed ring. Herein, Formula (M-2) must have at least one ionic hydrophilic group.

In Formula (M-2), A has the same meanings as A of the formula (M-1). Preferable examples of A include the same as those described above. $B_1$ and $B_2$ each have the same meanings as $B_1$ and $B_2$ of Formula (M-1). Preferable examples of $B_1$ and $B_2$ include the same as those described above. $R_{11}$ and $R_{12}$ each have the same meanings as $R_{11}$ and $R_{12}$ of Formula (M-1). Preferable examples of $R_{11}$ and $R_{12}$ include the same as those described above. a and e each independently represent an alkyl group, an alkoxy group, a halogen atom, with the proviso that when both a and e are an alkyl group, a total number of carbon atoms that constitute the alkyl group is 3 or more. These groups may be further substituted.

Further, it is preferable that a and e each independently represent a methyl group, an ethyl group, or an isopropyl group with an ethyl group and an isopropyl group being more preferable. It is further preferable that both a and e are an ethyl group or an isopropyl group. Further, b, c, and d each independently have the same meanings as $R_{13}$ and $R_{14}$ of Formula (M-1). a and b, or e and d may bond with each other to form a condensed ring. Herein, Formula (M-2) must have at least one ionic hydrophilic group. Further, c is preferably a hydrogen atom, or an alkyl group, with a hydrogen atom, or a methyl group being more preferable. b and d are preferably a hydrogen atom, or an ionic hydrophilic group. Among these groups, a hydrogen atom, a sulfo group, or a carboxyl group is more preferable. Especially, it is most preferable that a combination of b and d is a hydrogen atom and a sulfo group.

As a preferable combination of A, $B_1$, $B_2$, $R_{11}$, $R_{12}$, and a to e in the compound represented by Formula (M-2), compounds in which at least one of A, $B_1$, $B_2$, $R_{11}$, $R_{12}$, and a to e is an aforementioned preferable group are preferable, and compounds in which two or more of A, $B_1$, $B_2$, $R_{11}$, $R_{12}$, and a to e are each an aforementioned preferable group are more preferable. Compounds in which all of A, $B_1$, $B_2$, $R_{11}$, $R_{12}$, and a to e are aforementioned preferable groups are most preferable.

In the invention, the compound represented by Formula (M-2) is preferably a compound represented by Formula (M-3).

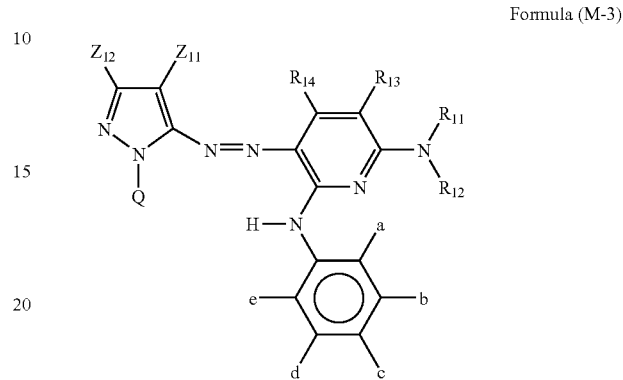

Formula (M-3)

In Formula (M-3), $Z_{11}$ represents an electron withdrawing group having a Hammett substituent constant σp of 0.20 or more. $Z_{12}$ represents a hydrogen atom, an alkyl group, a cycloalkyl group, an alkenyl group, an alkynyl group, an aralkyl group, an aryl group, a heterocyclic group, or an acyl group. $R_{11}$, $R_{12}$, $R_{13}$, $R_{14}$, a, b, c, d, and e each independently have the same meanings as those in Formula (M-2). Q represents a hydrogen atom, an alkyl group, an alkenyl group, an alkynyl group, an aralkyl group, an aryl group, or a heterocyclic group. Further, each of $Z_{11}$, $Z_{12}$, and Q may have a substituent. Herein, Formula (M-3) must have at least one ionic hydrophilic group.

$R_{13}$ and $R_{14}$ in Formula (M-3) each has the same meanings as $R_{13}$ and $R_{14}$ of Formula (M-1). Preferable examples of $R_{13}$ and $R_{14}$ include the same as those described above. $R_{11}$ and $R_{12}$ each have the same meanings as $R_{11}$ and $R_{12}$ of Formula (M-1). Preferable examples of $R_{11}$ and $R_{12}$ include the same as those described above. a, b, c, d, and e each independently have the same meanings as those in Formula (M-2). Preferable examples of a, b, c, d, and e include the same as those described above. The electron withdrawing group of $Z_{11}$ is an electron withdrawing group having a Hammett substituent constant σp of 0.20 or more, and preferably 0.30 or more. The upper limit of the σp value is preferably 1.0.

Specific examples of the electron withdrawing group having a Hammett substituent constant σp of 0.20 or more include an acyl group, an acyloxy group, a cabamoyl group, an alkoxycarbonyl group, an aryloxycarbonyl group, a cyano group, a nitro group, a dialkylphosphono group, diarylphosphono group, a diarylphosphinyl group, an alkyl sulfinyl group, arylsulfinyl group, an alkyl sulfonyl group, arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with other electron withdrawing group having the σp value of 0.20 or more.

$Z_{11}$ is preferably a cyano group, an alkyl sulfonyl group, arylsulfonyl group, a nitro group, or a halogen atom, more preferably a cyano group, an alkyl sulfonyl group, or arylsulfonyl group, and further preferably a cyano group.

$Z_{12}$ is preferably a hydrogen atom, an alkyl group, a cycloalkyl group, an aralkyl group, an aryl group, a heterocyclic group, or an acyl group, and more preferably an alkyl group. Each of these substituents may be further substituted.

More specifically, the alkyl group serving as $Z_{12}$ encompasses an alkyl group having a substituent and an unsubstituted alkyl group. The alkyl group preferably has 1 to 12 carbon atoms, and more preferably 1 to 6 carbon atoms, excluding any carbon atoms belonging to a substituent.

Examples of the substituent include a hydroxyl group, an alkoxy group, a cyano group, a halogen atom, and an ionic hydrophilic group.

Examples of the alkyl group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, and a 4-sulfobutyl group. Among these groups, a methyl group, an ethyl group, an isopropyl group, or a t-butyl group is preferable. Further, an isopropyl group or a t-butyl group is more preferable. Especially, a t-butyl group is most preferable.

The cycloalkyl group serving as $Z_{12}$ encompasses a cycloalkyl group having a substituent and an unsubstituted cycloalkyl group. The cycloalkyl group preferably has 5 to 12 carbon atoms, excluding any carbon atoms belonging to a substituent. Examples of the substituent include an ionic hydrophilic group. Examples of the cycloalkyl group include a cyclohexyl group.

The aralkyl group serving as $Z_{12}$ encompasses an aralkyl group having a substituent and an unsubstituted aralkyl group. The aralkyl group preferably has 7 to 12 carbon atoms, excluding any carbon atoms belonging to a substituent. Examples of the substituent include an ionic hydrophilic group. Examples of the aralkyl group include a benzyl group, or a 2-phenethtyl group.

The aryl group serving as $Z_{12}$ encompasses an aryl group having a substituent and an unsubstituted aryl group. The aryl group preferably has 6 to 12 carbon atoms, excluding any carbon atoms belonging to a substituent. Examples of the substituent include an alkyl group, an alkoxy group, a halogen atom, an alkylamino group, an amido group, a carbamoyl group, a sulfamoyl group, a sulfonamido group, a hydroxyl group, an ester group and an ionic hydrophilic group. Examples of the aryl group include a phenyl group, p-tolyl group, p-methoxyphenyl group, an o-chlorophenyl group, and a m-(3-sulfopropylamino) phenyl group.

The heterocyclic group serving as $Z_{12}$ encompasses a heterocyclic group having a substituent and an unsubstituted heterocyclic group. The heterocyclic group preferably has a 5- or 6-membered ring. Examples of the substituent include an amido group, a carbamoyl group, a sulfamoyl group, a sulfonamido group, a hydroxyl group, an ester group and an ionic hydrophilic group. Examples of the heterocyclic group include a 2-pyridyl group, a 2-thienyl group, a 2-thiazoly group, a 2-benzothiazoly group, and a 2-furyl group.

The acyl group serving as $Z_{12}$ encompasses an acyl group having a substituent and a unsubstituted acyl group. The acyl group preferably has 1 to 12 carbon atoms, excluding any carbon atoms belonging to a substituent. Examples of the substituent include an ionic hydrophilic group. Examples of the acyl group include an acetyl group, and a benzoyl group.

In Formula (M-3), Q represents a hydrogen atom, an alkyl group, an alkenyl group, an alkynyl group, an aralkyl group, an aryl group, or a heterocyclic group. Each of these groups may be further substituted. The details of these substituents are the same as those of the above-described $R_{13}$ and $R_{14}$.

Q is preferably an aryl group or a heterocyclic group, each of which is substituted with an electron withdrawing group. The electron withdrawing group that is a substituent of Q has a Hammett substituent constant σp of 0.20 or more, and preferably 0.30 or more. The upper limit of the σp value is preferably 1.0.

Examples of the electron withdrawing group having the σp value of 0.20 or more are the same as those recited with respective to $Z_1$ in Formula (M-3).

More specifically, Q is preferably a heterocyclic group substituted with an electron withdrawing group. Among these heterocyclic groups, benzoxazole rings or benzothiazole rings, each of which is substituted with a sulfo group, a substituted or unsubstituted carbamoyl group, or a substituted or unsubstituted sulfamoyl group, are preferable. Especially, the benzothiazole ring substituted with a sulfo group or a substituted sulfamoyl group is more preferable.

As a preferable combination of $R_{11}$ to $R_{14}$, $Z_{11}$ to $Z_{12}$, Q, and a to e in the compound represented by Formula (M-3), compounds in which at least one of $R_{11}$ to $R_{14}$, $Z_{11}$ to $Z_{12}$, Q, and a to e is an aforementioned preferable group are preferable, and compounds in which two or more of $R_{11}$ to $R_{14}$, $Z_{11}$ to $Z_{12}$, Q, and a to e are each an aforementioned preferable group are more preferable. Compounds in which all of $R_{11}$ to $R_{14}$, $Z_{11}$ to $Z_{12}$, Q, and a to e are aforementioned preferable groups are most preferable.

As an especially preferable combination of groups in the compound represented by Formula (M-1), combinations composed of the following (i) to (iv) are recited.

(i) Preferable examples of the hetero ring represented by A include pyrazole, imidazole, triazole, thiazole, isothiazole, thiadiazole, benzothiazole, benzoxazole, and benzoisothiazole rings. Among these rings, pyrazole, imidazole, triazole, thiazole, isothiazole, and thiadiazole rings are more preferable. Further, pyrazole, triazole, thiazole, isothiazole, and thiadiazole rings are more preferable. Especially, a pyrazole ring is most preferable.

(ii) $B_1$ and $B_2$ each independently represent $-CR_{13}=$ or $-CR_{14}=$, or alternatively one of $B_1$ and $B_2$ is a nitrogen atom, and the other is $-CR_{13}=$ or $-CR_{14}=$. It is preferable that $B_1$ and $B_2$ represent $-CR_{13}=$ or $-CR_{14}=$. Further, it is preferable that $R_{13}$ is a hydrogen atom ($B_1$ is an unsubstituted carbon), and $R_{14}$ is a hydrogen atom or an alkyl group ($B_2$ is an unsubstituted carbon atom or alkyl-substituted carbon atom). Especially, it is most preferable that $R_{13}$ is a hydrogen atom ($B_1$ is an unsubstituted carbon), and $R_{14}$ is a methyl group ($B_2$ is a carbon atom substituted with a methyl group).

(iii) $R_{11}$ and $R_{12}$ each independently represent a hydrogen atom, a substituted or unsubstituted cycloalkyl group, a substituted or unsubstituted aryl group, a substituted or unsubstituted heterocyclic group, a substituted or unsubstituted acyl group, a substituted or unsubstituted alkylsulfonyl group, or a substituted or unsubstituted arylsulfonyl group. Further, a hydrogen atom, a substituted aryl group or a substituted heterocyclic group is more preferable. Furthermore, a substituted aryl group or a substituted heterocyclic group is more preferable. Especially, a sulfo-substituted aryl group or a sulfo-substituted heterocyclic group is most preferable.

(iv) G is preferably a hydrogen atom, a halogen atom, an alkyl group, an alkenyl group, an alkynyl group, an aralkyl group, an aryl group, a hydroxyl group, an alkoxy group, an aryloxy group, an acyloxy group, a heterocyclic oxy group, an amino group substituted with an alkyl group, an aryl group, or a heterocyclic group, an acylamino group, an ureido group, a sulfamoylamino group, an alkoxycarbonylamino group, an aryloxycarbonylamino group, an alkyl or arylsulfonylamino group, an alkyl or arylthio group, a heterocyclic thio group, or an ionic hydrophilic group. Further, a hydrogen atom, a halogen atom, an alkyl group, a hydroxyl group, an alkoxy group, an aryloxy group, an acyloxy group, an amino group substituted with an alkyl group, an aryl group, or a heterocyclic group, or an acylamino group is more preferable. Among these groups, a hydrogen atom, an amino group substituted with an aryl or heterocyclic group, or an acylamino group is further preferable. Further, an amino group substituted with an aryl group having a substituent is most preferable.

Among the compound represented by Formula (M-1), compounds represented by Formula (M-2) are preferable. As an especially preferable combination of groups in the compound represented by Formula (M-2), combinations composed of the following (i) to (iv) are recited.

(i) The examples of the heterocyclic ring represented by A include the same as A in Formula (M-1) [(i) in Formula (M-1)]. Preferable examples are also the same as those of A in Formula (M-1).

(ii) $B_1$ and $B_2$ each have the same meanings as $B_1$ and $B_2$ in Formula (M-1) [(ii) in Formula (M-1)]. Preferable examples are also the same as those of $B_1$ and $B_2$ in Formula (M-1).

(iii) $R_{11}$ and $R_{12}$ each have the same meanings as $R_{11}$ and $R_{12}$ in Formula (M-1) [(iii) in Formula (M-1)]. Preferable examples also include the same as those of $R_{11}$ and $R_{12}$ in Formula (M-1).

(iv) a and e are preferably an alkyl group or a halogen atom. When both a and e are an alkyl group, they are an unsubstituted alkyl group, and a total number of carbon atoms of a and e is 3 or more (preferably 5 or less). It is preferable that a, b, c, and d each represent a hydrogen atom, a halogen atom, an alkyl group or an ionic hydrophilic group (it is more preferable that they are independently a hydrogen atom, an alkyl group having 1 to 4 carbon atoms, or an ionic hydrophilic group). It is furthermore preferable that a and e each independently represent a methyl group, an ethyl group, or an isopropyl group. Especially, it is most preferable that both a and e are equally an ethyl group or an isopropyl group. Further, c is preferably a hydrogen atom, or an alkyl group, and especially preferably a hydrogen atom or a methyl group. Further, it is preferable that b and d each independently represent a hydrogen atom or an ionic hydrophilic group. It is more preferable that b and d each independently represent a hydrogen atom, a sulfo group or a carboxyl group. Especially, it is most preferable that a combination of b and d is a hydrogen atom and a sulfo group.

Among the compound represented by Formula (M-2), compounds represented by Formula (M-3) are especially preferable. As an especially preferable combination of groups in the compound represented by Formula (M-3), combinations composed of the following (i) to (vi) are recited (combination embodiment M).

(i) $Z_{11}$ is an electron withdrawing group having a Hammett substituent constant σp of 0.20 or more, and preferably 0.3 or more. The upper limit of the σp value is preferably 1.0. $Z_{11}$ is more preferably a cyano group, an alkyl sulfonyl group, arylsulfonyl group, a nitro group or a halogen atom, more preferably a cyano group, an alkyl sulfonyl group or an arylsulfonyl group, and further preferably a cyano group, an alkyl sulfonyl group or an arylsulfonyl group. Especially, a cyano group is most preferable.

(ii) $Z_{12}$ is preferably a hydrogen atom, an alkyl group, a cycloalkyl group, an aralkyl group, an aryl group, a heterocyclic group or an acyl group, and more preferably an alkyl group. Each of these substituents may be further substituted. More specifically, the alkyl group serving as $Z_{12}$ encompasses an alkyl group having a substituent and an unsubstituted alkyl group. The alkyl group preferably has 1 to 12 carbon atoms, and more preferably 1 to 6 carbon atoms, excluding any carbon atoms belonging to a substituent. Examples of the substituent include a hydroxyl group, an alkoxy group, a cyano group, a halogen atom, and an ionic hydrophilic group. Among these groups, a methyl group, an ethyl group, a butyl group, an isopropyl group, a t-butyl group, a hydroxyethyl group, a methoxyethyl group, a cyanoethyl group, a trifluoromethyl group, a 3-sulfopropyl group or a 4-sulfobutyl group is preferable. Further, an isopropyl group or a t-butyl group is more preferable. Especially, a t-butyl group is most preferable.

(iii) Q represents a hydrogen atom, an alkyl group, an alkenyl group, an alkynyl group, an aralkyl group, an aryl group or a heterocyclic group. Each of these groups may be further substituted. Q is preferably an aryl group or a heterocyclic group, each of which is substituted with an electron withdrawing group. The electron withdrawing group that is a substituent of Q has a Hammett substituent constant σp of 0.20 or more, and preferably 0.30 or more. The upper limit of the σp value is preferably 1.0. More specifically, Q is preferably a heterocyclic group substituted with an electron withdrawing group. Among these heterocyclic groups, benzoxazole rings or benzothiazole rings, each of which is substituted with a sulfo group, a substituted or unsubstituted carbamoyl group, or a substituted or unsubstituted sulfamoyl group, are preferable. Especially, the benzothiazole ring substituted with a sulfo group or a substituted sulfamoyl group is more preferable.

(iv) a, b, c, d, and e each independently have the same meanings as those in the formula (M-2)[(iv) in Formula (M-2)]. Preferable examples of a, b, c, d, and e are also the same as those in Formula (M-2).

(v) $R_{13}$ and $R_{14}$ each independently have the same meanings as $R_{13}$ and $R_{14}$ in Formula (M-1). Preferable examples of $R_{13}$ and $R_{14}$ also include the same as those in Formula (M-1).

(vi) $R_{11}$ and $R_{12}$ each independently have the same meanings as $R_{11}$ and $R_{12}$ in Formula (M-2) [(iii) in Formula (M-2)]. Preferable examples of $R_{11}$ and $R_{12}$ also include the same as those in Formula (M-2).

The compound (azo dye) represented by Formula (M-1), (M-2), or (M-3) has at least one (preferably from 3 to 6) ionic hydrophilic group in its molecule. Examples of the ionic hydrophilic group include a sulfo group, a carboxyl group, a phosphono group, and a quaternary ammonium group. As the ionic hydrophilic group, a carboxyl group, a phosphono group or a sulfo group are preferable, and a carboxyl group or a sulfo group are more preferable. Especially, it is most preferable that at least one of the ionic hydrophilic groups is a sulfo group. Each of the carboxyl group, the phosphono group, and the sulfo group may be a salt thereof. Examples of the counter ion for forming a salt include ammonium ion, alkali metal ions (for example, lithium, sodium, potassium), and organic cations (for example, tetramethylammonium ion, tetramethylguanidium ion, tetramethylphosphonium ion). Among these counter ions, alkali metal ions are preferable. Among these alkali metal ions, potassium ion, sodium ion or lithium ion is preferable. Especially, lithium ion is most preferable. In consideration of both enhancement of solubility and suppression of bronze in the ink jet printing, the combination composed of a sulfo group as the ionic hydrophilic group and a lithium ion as a counter ion is most preferable.

The azo dye has, in its molecule, preferably from 3 to 6 ionic hydrophilic groups, more preferably from 3 to 6 sulfo groups, and further preferably from 3 to 5 sulfo groups.

Herein, the magenta ink of the invention may contain other magenta dyes in combination with the compound represented by the above-described formula. The other magenta dye is not particularly limited, but any known dyes may be selectively used.

A preferable embodiment of the inkjet recording ink set of the invention is an embodiment that contains: a yellow ink containing a mono form $y^{n1}$ and a bis form $y^{n2}$ of the water-soluble azo dye represented by the aforementioned Formula (Y) in which G is an S-triazine ring, R is a secondary or tertiary alkyl group, X is a cyano group, Y is a hydrogen atom, Z is a substituted aryl group, and Q is a hydrogen atom; a cyan ink containing a water-soluble phtharocyanine dye represented by the aforementioned Formula (C-1) in which each of ring A, ring B, ring C, and ring D is a ring represented by the aforementioned Formula (I) or (II) in which G is —$SO_2$-$Z_1$, in which $Z_1$ is a substituted alkyl group, and t is 1 or 2; and a magenta ink containing a water-soluble magenta dye represented by the aforementioned Formula (M-3) that is defined by the aforementioned combination embodiment M.

In addition, an embodiment in which the mono form $y^{n1}$ has the same skeleton as that of the bis form $y^{n2}$ is preferable. For example, an embodiment in which the bis form $y^{n2}$ is a compound represented by the aforementioned Formula (Y-1) and the mono form $y^{n1}$ is a compound having a one-sided structure represented by Formula (Y-1) in which G is omitted and substituted with a monovalent group, is preferable.

[Water-Soluble Azo Dye (Black-Series)]

Next, as a dye in the black ink, a water-soluble azo dye represented by the following Formula (B-I) is preferable. When the water-soluble azo dye is used to record an image together with the compound (yellow aqueous azo dye) represented by the above-described Formula (Y), a color balance of the image is maintained stably over a lengthy period. Therefore, a combination of these dyes is preferable to obtain an image excellent in storage stability.

Formula (B-1)

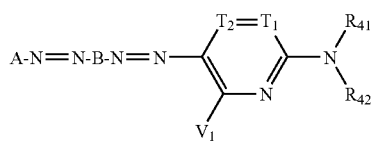

In the formula (B-1), A represents a monovalent aromatic group or heterocyclic group, which may be substituted. B represents a divalent aromatic group or heterocyclic group, which may be substituted. $T_1$ and $T_2$ each independently represent =$CR_{43}$— or —$CR_{44}$=. Alternatively, one of $T_1$ and $T_2$ is a nitrogen atom, and the other is =$CR_{43}$— or —$CR_{44}$=. $V_1$, $R_{43}$ and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group which may include an alkylamino group, an arylamino group, and a heterocyclic amino group, an acylamino group, a ureido group, a sulfamoylamino group, an alkoxycarbonylamino group, an aryloxycarbonylamino group, an alkyl or arylsulfonylamino group, a heterocyclic sulfonylamino group, a nitro group, an alkyl or arylthio group, a heterocyclic thio group, an alkyl or arylsulfonyl group, a heterocyclic sulfonyl group, an alkyl or arylsulfinyl group, a heterocyclic sulfinyl group, a sulfamoyl group, or a sulfo group. Further, each of the above groups may have a substituent. $R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkyl or arylsulfonyl group, or a sulfamoyl group, with the proviso that both $R_{41}$ and $R_{42}$ are not a hydrogen atom at the same time. Further, each of the above groups may have a substituent.

$R_{43}$ and $R_{41}$, or $R_{41}$ and $R_{42}$ may bond with each other to form a 5- or 6-membered ring.

Formula (B-1) is explained in detail.

In Formula (B-1), A preferably represents a monovalent aromatic or heterocyclic group, which may be substituted. More specifically, A is preferably a substituted phenyl group, a substituted naphthyl group, or a substituted or unsubstituted heterocyclic group. Among these groups, a phenyl or naphthyl group substituted with an ionic hydrophilic group, and a substituted 5- or 6-membered nitrogen-containing heterocyclic ring are preferable. Especially, a phenyl or naphthyl group each substituted with a sulfo group which may be a salt thereof, or a carboxyl group which may be a salt thereof is preferable. Further, a phenyl or naphthyl group each substituted with two or more sulfo groups or carboxyl groups, each of which may be a salt thereof is preferable. Further, a naphthyl group substituted with two or three sulfo groups which may be a salt thereof is most preferable.

In Formula (B-1), B represents a divalent aromatic or heterocyclic group, which may be substituted. More specifically, B is preferably a substituted 5- or 6-membered heterocyclic group, and more preferably a substituted 5-membered heterocyclic group. The 5- or 6-membered hetero ring means a 5- or 6-membered ring containing a hetero atom. Examples of the hetero atom include N, S, and O.

In the hetero ring represented by B, an alicyclic ring, an aromatic ring, or another hetero ring may be condensed. Further, the condensed ring may have a substituent. The hetero ring represented by B may be a saturated or unsaturated hetero ring, but is preferably an unsaturated hetero ring. When the hetero ring is a nitrogen-containing hetero ring, the nitrogen may be quaternized. Further, with respect to a hetero ring capable of forming a tautomer, even where only one form of the tautomer is described, the hetero ring may also include other forms of the tautomer.

Among the hetero ring represented by B, especially preferable hetero rings are pyridine, pyrazine, pyrimidine, pyridazine, thiophene, thiazole, imidazole, benzothiazole, and thienothiazole rings.

In Formula (B-1), $T_1$ and $T_2$ each independently represent =$CR_{43}$— or —$CR_{44}$=. Alternatively, one of $T_1$ and $T_2$ is a nitrogen atom, and the other is =$CR_{43}$— or —$CR_{44}$=. However, when $T_1$ and $T_2$ each independently represent =$CR_{43}$— or —$CR_{44}$=, it is advantageous in that more excellent properties are obtained.

In Formula (B-1), $R_{41}$ and $R_{42}$ each independently represent a hydrogen atom, an alkyl group, an aryl group, a heterocyclic group, an acyl group, or an alkyl or arylsulfonyl group is preferable, and a hydrogen atom, an alkyl group, an aryl group, or a heterocyclic group is more preferable. Further, a hydrogen atom, a substituted aryl group, or a substituted heterocyclic group is more preferable. Still further, a hydrogen atom, or a substituted aryl group is most preferable. However, both $R_{41}$ and $R_{42}$ are not a hydrogen atom at the same time. $R_{43}$ and $R_{41}$, or $R_{41}$ and $R_{42}$ may bond with each other to form a 5-or 6-membered ring.

In Formula (B-1), $V_1$ is preferably a hydrogen atom, a halogen atom, an alkyl group, an alkenyl group, an alkynyl group, an aralkyl group, an aryl group, a heterocyclic group, a hydroxyl group, an alkoxy group, an aryloxy group, a heterocyclic oxy group, a silyloxy group, an acyloxy group, an amino group which may include an alkylamino group, an arylamino group, and a heterocyclic amino group, an acylamino group, a ureido group, a sulfamoylamino group, an alkoxycarbonylamino group, an aryloxycarbonylamino group, an alkyl or arylthio group, or a heterocyclic thio group. Further, each of the above groups may have a substituent.

Further, $V_1$ is more preferably a hydrogen atom, a halogen atom, an alkyl group, a hydroxyl group, an alkoxy group, an aryloxy group, a heterocyclic oxy group, a silyloxy group, an acyloxy group, an amino group which may include an alkylamino group, an arylamino group, and a heterocyclic amino group, or an acylamino group, more preferably a hydrogen atom, an amino group which may include an alkylamino group, an arylamino group, and a heterocyclic amino group, or an acylamino group, further preferably an amino group having a substituent, and still further preferably an amino group substituted with an aryl group having an ionic hydrophilic group as the substituent. Namely, such the substituted anilino group is most preferable.

As an especially preferable combination of groups in the compound represented by Formula (B-1), combinations composed of the following (i) to (v) are recited.

(i) A is preferably a substituted phenyl or a substituted naphthyl group, or a substituted or unsubstituted heterocyclic group, and more preferably a phenyl or naphthyl group, each of which is substituted with an ionic hydrophilic group, or a 5-or 6-membered heterocyclic group having a substituent, and more preferably a phenyl or naphthyl group substituted with a sulfo group which may be a salt thereof, or a carboxyl group which may be a salt thereof, and further preferably a phenyl or naphthyl group substituted with two or more sulfo groups or carboxyl groups, each of which may be a salt thereof, and still further preferably a naphthyl group substituted with two or three sulfo groups which may be a salt thereof.

(ii) B is preferably a substituted 5- or 6-membered heterocyclic group, and more preferably a substituted 5-membered heterocyclic group. Among the hetero ring represented by B, especially preferable rings are pyridine, pyrazine, pyrimidine, pyridazine, thiophene, thiazole, imidazole, benzothiazole, and thienothiazole rings.

(iii) $T_1$ and $T_2$ each independently represent $=CR_{43}$— or —$CR_{44}=$. Alternatively, one of $T_1$ and $T_2$ is a nitrogen atom, and the other is $=CR_{43}$— or —$CR_{44}=$. When $T_1$ and $T_2$ each independently represents $=CR_{43}$— or —$CR_{44}=$, it is advantageous in that more excellent properties are obtained.

(iv) $R_{41}$ and $R_{42}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{41}$ and $R_{42}$ are not a hydrogen atom at the same time. $R_{43}$ and $R_{41}$, or $R_{41}$ and $R_{42}$ may bond with each other to form a 5- or 6-membered ring.

(v) $V_1$ is preferably a hydrogen atom, a halogen atom, an alkyl group, a hydroxyl group, an alkoxy group, an aryloxy group, a heterocyclic oxy group, a silyloxy group, an acyloxy group, an amino group which may include an alkylamino group, an arylamino group, and a heterocyclic amino group, or an acylamino group, more preferably a hydrogen atom, an amino group which may include an alkylamino group, an arylamino group, and a heterocyclic amino group, or an acylamino group, further preferably an amino group having a substituent, and still further preferably an amino group substituted with an aryl group having an ionic hydrophilic group as the substituent. Namely, such the substituted anilino group is most preferable.

As a preferable combination of A, B, $T_1$, $T_2$, $R_{41}$, $R_{42}$, and $V_1$ in the dye represented by Formula (B-1), compounds in which at least one of A, B, $T_1$, $T_2$, $R_{41}$, $R_{42}$, and $V_1$ is an aforementioned preferable group are preferable, and compounds in which two or more of A, B, $T_1$, $T_2$, $R_{41}$, $R_{42}$, and $V_1$ are each an aforementioned preferable group are more preferable. Compounds in which all of A, B, $T_1$, $T_2$, $R_{41}$, $R_{42}$, and $V_1$ are aforementioned preferable groups are most preferable.

Among the compound represented by Formula (B-1), compounds represented by the following Formula (B-2) are preferable.

Formula (B-2)

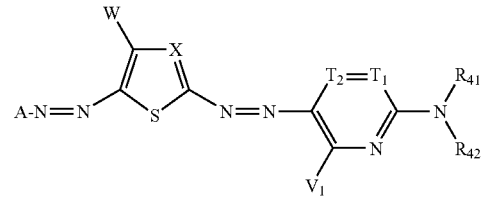

In Formula (B-2), X represents a nitrogen atom or $=CW_1$—, wherein $W_1$ represents an electron withdrawing group having a Hammett substituent constant σp of 0.20 or more. A, $V_1$, $T_1$, $T_2$, $R_{41}$, and $R_{42}$ each has the same meanings as A, $V_1$, $T_1$, $T_2$, $R_{41}$, and $R_{42}$ of Formula (B-1). W has the same meaning as $V_1$ of Formula (B-1).

Formula (B-2) is explained in detail below.

In Formula (B-2), W is preferably a substituted phenyl group, a substituted or unsubstituted naphthyl group, or a substituted or unsubstituted heterocyclic group. As the hetero ring serving as the heterocyclic group, pyrrole, thiophene, imidazole, thiazole, benzothiazole, pyridine, and pyridazine rings are exemplified. A substituted phenyl group (especially p-substituted phenyl group), a substituted or unsubstituted β-naphthyl group, or a group derived from a pyridine ring or a thiazole ring is especially preferable.

In Formula (B-2), X represents a nitrogen atom or $=CW_1$—, wherein $W_1$ represents an electron withdrawing group having a Hammett substituent constant σp of 0.20 or more, preferably 0.30 or more, and more preferably 0.45 or more, and further preferably 0.60 or more. The upper limit of the σp value is preferably 1.0. In more detail, $W_1$ is preferably an acyl group having 2 to 20 carbon atoms, an alkoxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, or a halogenated alkyl group having 1 to 20 carbon atoms. Among these groups, a cyano group, an alkylsulfonyl group having 1 to 20 carbon atoms, or an arylsulfonyl group having 6 to 20 carbon atoms is more preferable. Especially, a cyano group is most preferable.

In Formula (B-2), A has the same meaning as A in Formula (B-1). Preferable examples of A are also the same as those of A. $T_1$ and $T_2$ each have the same meanings as those in Formula (B-1). Preferable examples of $T_1$ and $T_2$ are also the same as those of $T_1$ and $T_2$. $R_{41}$ and $R_{42}$ each have the same meanings as those of Formula (B-1). Preferable examples of $R_{41}$ and $R_{42}$ are also the same as those of $R_{41}$ and $R_{42}$. $V_1$ has the same meaning as $V_1$ in Formula (B-1). Preferable examples of $V_1$ are also the same as those of $V_1$.

As an especially preferable combination of groups in the compound represented by Formula (B-2), combinations composed of the following (i) to (vi) are recited.

(i) W is preferably a substituted phenyl group, a substituted or unsubstituted naphthyl group, or a substituted or unsubstituted heterocyclic group. As the hetero ring serving as the heterocyclic group, pyrrole, thiophene, imidazole, thiazole, benzothiazole, pyridine, and pyridazine rings are exemplified. A substituted phenyl group (especially p-substituted phenyl group), a substituted or unsubstituted β-naphthyl group, or a group derived from a pyridine ring or a thiazole ring is especially preferable.

(ii) X represents a nitrogen atom or $=CW_1-$, wherein $W_1$ represents an electron withdrawing group having a Hammett substituent constant σp of 0.20 or more. In more detail, $W_1$ is preferably an acyl group having 2 to 20 carbon atoms, an alkoxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, or a halogenated alkyl group having 1 to 20 carbon atoms. Among these groups, a cyano group, an alkylsulfonyl group having 1 to 20 carbon atoms, or an arylsulfonyl group having 6 to 20 carbon atoms is more preferable. Especially, a cyano group is most preferable.

(iii) A is preferably a substituted phenyl group, a substituted naphthyl group, or a substituted or unsubstituted heterocyclic group. Among these groups, a phenyl or naphthyl group substituted with an ionic hydrophilic group, and a substituted 5- or 6-membered nitrogen-containing heterocyclic ring are preferable. Especially, a phenyl or naphthyl group each substituted with a sulfo group which may be a salt thereof, or a carboxyl group which may be a salt thereof is preferable. Further, a naphthyl group substituted with two or three sulfo groups which may be a salt thereof is most preferable.

(iv) $T_1$ and $T_2$ each independently represents $=CR_{43}-$ or $-CR_{44}=$. Alternatively, one of $T_1$ and $T_2$ is a nitrogen atom, and the other is $=CR_{43}-$ or $-CR_{44}=$. When $T_1$ and $T_2$ each independently represent $=CR_{43}-$ or $-CR_{44}=$, it is advantageous in that more excellent properties are obtained.

(v) $R_{41}$ and $R_{42}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom or a substituted aryl group. However, both $R_{41}$ and $R_{42}$ is not a hydrogen atom at the same time. $R_{43}$ and $R_{41}$, or $R_{41}$ and $R_{42}$ may bond with each other to form a 5- or 6-membered ring.

(vi) $V_1$ is preferably a hydrogen atom, a halogen atom, an alkyl group, a hydroxyl group, an alkoxy group, an aryloxy group, a heterocyclic oxy group, a silyloxy group, an acyloxy group, an amino group which may include an alkylamino group, an arylamino group, and a heterocyclic amino group, or an acylamino group, more preferably a hydrogen atom, an amino group which may include an alkylamino group, an arylamino group, and a heterocyclic amino group, or an acylamino group, further preferably an amino group having a substituent, and still further preferably an amino group substituted with an aryl group having an ionic hydrophilic group as the substituent. Namely, such the substituted anilino group is most preferable.

As a preferable combination of W, X, A, $T_1$, $T_2$, $R_{41}$, $R_{42}$, and $V_1$ in the dye represented by Formula (B-2), compounds in which at least one of W, X, A, $T_1$, $T_2$, $R_{41}$, $R_{42}$, and $V_1$ is an aforementioned preferable group are preferable, and compounds in which two or more of W, X, A, $T_1$, $T_2$, $R_{41}$, $R_{42}$, and $V_1$ are each an aforementioned preferable group are more preferable. Compounds in which all of W, X, A, $T_1$, $T_2$, $R_{41}$, $R_{42}$, and $V_1$ are aforementioned preferable groups are most preferable.

Among the compound represented by Formula (B-2), compounds represented by the following Formula (B-3) are preferable.

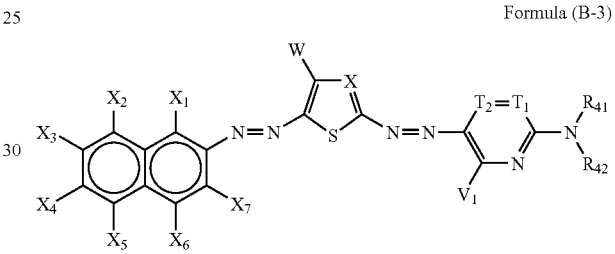

Formula (B-3)

In Formula (B-3), $V_1$, W, X, A, $T_1$, $T_2$, $R_{41}$, and $R_{42}$ each have the same meanings as $V_1$, W, X, A, $T_1$, $T_2$, $R_{41}$, and $R_{42}$ of Formula (B-2), and $X_1$, $X_2$, $X_3$, $X_4$, $X_5$, $X_6$, and $X_7$ each have the same meanings as $V_1$ of Formula (B-1).

Formula (B-3) is explained in detail below.

In Formula (B-3), a monovalent group represented by each of $X_1$, $X_2$, $X_3$, $X_4$, $X_5$, $X_6$, and $X_7$ is a hydrogen atom, or a monovalent substituent. The monovalent substituent is explained in detail below. Examples of the monovalent substituent include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group which may be an alkylamino group or an arylamino group, an acylamino group (amido group), an an aminocarbonylamino group (ureido group), an alkoxycarbonylamino group, an aryloxycarbonylamino group, a sulfamoylamino group, an alkyksulfonylamino group, an arylsulfonylamino group, an alkylthio group, arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a sulfo group which may be a salt thereof, a carboxyl group which may be a salt thereof, a phosphono group which may be a salt thereof, a quaternary ammonium group, a phosphino group, a phosphinyl group, a phosphinyloxy group, a phosphinylamino group, a silyl group, an azo group, or an imido group. Further, each of the above groups may have a substituent.

$X_1$, $X_2$, $X_3$, $X_4$, $X_5$, $X_6$, and $X_7$ is preferably a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group which may be a salt thereof, a carboxyl group which may be a salt thereof, a hydroxyl group which may be a salt thereof, a phosphono group which may be a salt thereof, or a quaternary ammonium group. Further, a hydrogen atom, a halogen atom, an alkyl group, a sulfo group including a salt thereof, a carboxyl group which may be a salt thereof, or a hydroxyl group which may be a salt thereof is more preferable. Among these groups, a hydrogen atom, a sulfo group which may be a salt thereof, or a carboxyl group which may be a salt thereof is further preferable. It is especially preferable that at least one of $X_1$, $X_2$, $X_3$, $X_4$, $X_5$, $X_6$, and $X_7$ is a sulfo group which may be a salt thereof, or a carboxyl group which may be a salt thereof.

In Formula (B-3), W has the same meaning as W of the formula (B-2). Preferable examples of W are also the same as those of W. X has the same meaning as X of Formula (B-2). Preferable examples of X are also the same as those of X. $T_1$ and $T_2$ each have the same meanings as $T_1$ and $T_2$ of Formula (B-2). Preferable examples of $T_1$ and $T_2$ are also the same as those of $T_1$ and $T_2$. $R_{41}$ and $R_{42}$ each have the same meanings as $R_{41}$ and $R_{42}$ of Formula (B-2). Preferable examples of $R_{41}$ and $R_{42}$ are also the same as those of $R_{41}$ and $R_{42}$. $V_1$ has the same meaning as $V_1$ of Formula (B-2). Preferable examples of $V_1$ are also the same as those of $V_1$.

As an especially preferable combination of groups in the compound represented by Formula (B-3), combinations composed of the following (i) to (vi) are recited.

(i) $X_1$, $X_2$, $X_3$, $X_4$, $X_5$, $X_6$, and $X_7$ is preferably a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, or an alkoxycarbonyl group, a sulfo group which may be a salt thereof, a carboxyl group which may be a salt thereof, a hydroxyl group which may be a salt thereof, a phosphono group which may be a salt thereof, or a quaternary ammonium group. Further, a hydrogen atom, a halogen atom, an alkyl group, a sulfo group which may be a salt thereof, a carboxyl group which may be a salt thereof, or a hydroxyl group which may be a salt thereof is more preferable. Among these groups, a hydrogen atom, a sulfo group which may be a salt thereof, or a carboxyl group which may be a salt thereof is further preferable. It is especially preferable that at least one of $X_1$, $X_2$, $X_3$, $X_4$, $X_5$, $X_6$, and $X_7$ is a sulfo group which may be a salt thereof, or a carboxyl group which may be a salt thereof, (ii) W is preferably a substituted phenyl group, a substituted or unsubstituted naphthyl group, or a substituted or unsubstituted heterocyclic group. As the hetero ring serving as the heterocyclic group, pyrrole, thiophene, imidazole, thiazole, benzothiazole, pyridine, and pyridazine rings are exemplified. A substituted phenyl group (especially p-substituted phenyl group), a substituted or unsubstituted β-naphthyl group, or a group derived from a pyridine ring or a thiazole ring is especially preferable.

(iii) X represents a nitrogen atom or $=CW_1-$, wherein $W_1$ represents an electron withdrawing group having a Hammett substituent constant σp of 0.20 or more. In more detail, $W_1$ is preferably an acyl group having 2 to 20 carbon atoms, an alkoxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, or a halogenated alkyl group having 1 to 20 carbon atoms. Among these groups, a cyano group, an alkylsulfonyl group having 1 to 20 carbon atoms, or an arylsulfonyl group having 6 to 20 carbon atoms is more preferable. Especially, a cyano group is most preferable.

(iv) $T_1$ and $T_2$ each independently represents $=CR_{43}-$ or $-CR_{44}=$. Alternatively, one of $T_1$ and $T_2$ is a nitrogen atom, and the other is $=CR_{43}-$ or $-CR_{44}=$. When $T_1$ and $T_2$ each independently represent $=CR_{43}-$ or $-CR_{44}=$, it is advantageous in that more excellent properties are obtained.

(v) $R_{41}$ and $R_{42}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{41}$ and $R_{42}$ is not a hydrogen atom at the same time. $R_{43}$ and $R_{41}$, or $R_{42}$ and $R_{42}$ may bond with each other to form a 5- or 6-membered ring.

(vi) $V_1$ is preferably a hydrogen atom, a halogen atom, an alkyl group, a hydroxyl group, an alkoxy group, an aryloxy group, a heterocyclic oxy group, a silyloxy group, an acyloxy group, an amino group which may be an alkylamino group, an arylamino group, or a heterocyclic amino group, or an acylamino group, more preferably a hydrogen atom, an amino group which may be an alkylamino group, an arylamino group, or a heterocyclic amino group; or an acylamino group, further preferably an amino group having a substituent, and still further preferably an amino group substituted with an aryl group having an ionic hydrophilic group as the substituent. Namely, such the substituted anilino group is most preferable.

As a preferable combination of $X_1-X_7$, W, X, $T_1$, $T_2$, $V_1$, $R_{41}$, and $R_{42}$ in the dye represented by Formula (B-3), compounds in which at least one of $X_1-X_7$, W, X, $T_1$, $T_2$, $V_1$, $R_{41}$, and $R_{42}$ is an aforementioned preferable group are preferable, and compounds in which two or more of $X_1-X_7$, W, X, $T_1$, $T_2$, $V_1$, $R_{41}$, and $R_{42}$ are each an aforementioned preferable group are more preferable. Compounds in which all of $X_1-X_7$, W, X, $T_1$, $T_2$, $V_1$ $R_{41}$, and $R_{42}$ are aforementioned preferable groups are most preferable.

Among the compound represented by Formula (B-3), compounds represented by the following Formula (B-4), or Formula (B-5) are preferable.

Formula (B-4)

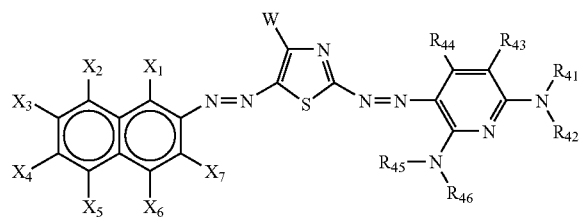

In Formula (B-4), $R_{41}$, $R_{42}$ and $R_{43}$ each have the same meanings as $R_{41}$, $R_{42}$ and $R_{43}$ of Formula (B-1). $R_{44}$ has the same meaning as $R_{44}$ of Formula (B-1). $R_{45}$ and $R_{46}$ each have the same meanings as $R_{41}$ and $R_{42}$ of Formula (B-3). W has the same meaning as W of Formula (B-3). $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-3).

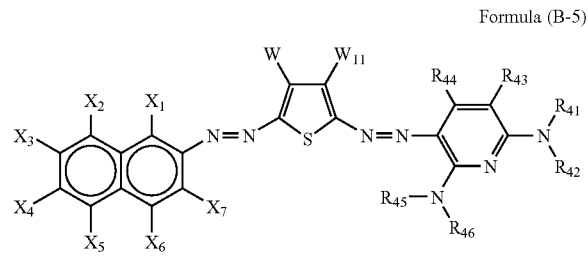

Formula (B-5)

In Formula (B-5), $R_{41}$, $R_{42}$, and $R_{43}$ each have the same meanings as $R_{41}$, $R_{42}$, and $R_{43}$ of Formula (B-1). $R_{44}$ has the same meaning as $R_{44}$ of Formula (B-1). $R_{45}$ and $R_{46}$ each have the same meanings as $R_{41}$ and $R_{42}$ of Formula (B-3). W has the same meaning as W of Formula (B-3). $W_{11}$ has the same meaning as $W_1$ of Formula (B-2). $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-3).

Formula (B-4) is explained in detail below.

In Formula (B-4), $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-3). Preferable examples of $X_1$, $X_2$, $X_3$, $X_4$, $X_5$, $X_6$, and $X_7$ are also the same as those of $X_1$, $X_2$, $X_3$, $X_4$, $X_5$, $X_6$, and $X_7$ of the formula (B-3). W has the same meaning as W of the formula (B-3). Preferable examples of W are also the same as those of W of Formula (B-3). $R_{41}$ and $R_{42}$ each have the same meanings as $R_{41}$ and $R_{42}$ of Formula (B-1). Preferable examples of $R_{41}$ and $R_{42}$ are also the same as those of $R_{41}$ and $R_{42}$ of Formula (B-1). $R_{43}$ and $R_{44}$ each have the same meanings as those of Formula (B-1). Preferable examples of $R_{43}$ and $R_{44}$ are also the same as those of $R_{43}$ and $R_{44}$ of Formula (B-1). $R_{45}$ and $R_{46}$ each have the same meanings as $R_{41}$ and $R_{42}$ of Formula (B-3). Preferable examples of $R_{45}$ and $R_{46}$ are also the same as those of $R_{41}$ and $R_{42}$ of Formula (B-3).

As an especially preferable combination of groups in the compound represented by Formula (B-4), combinations composed of the following (i) to (v) are recited.

(i) $X_1$, $X_2$, $X_3$, $X_4$, $X_5$, $X_6$, and $X_7$ is a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group which may be a salt thereof, a carboxyl group which may be a salt thereof, a hydroxyl group which may be a salt thereof, a phosphono group which may be a salt thereof, or a quaternary ammonium group. Further, a hydrogen atom, a halogen atom, an alkyl group, a sulfo group which may be a salt thereof, a carboxyl group which may be a salt thereof, or a hydroxyl group which may be a salt thereof is more preferable. Among these groups, a hydrogen atom, a sulfo group which may be a salt thereof, or a carboxyl group which may be a salt thereof is further preferable. It is especially preferable that at least one of $X_1$, $X_2$, $X_3$, $X_4$, $X_5$, $X_6$, and $X_7$ is a sulfo group which may be a salt thereof, or a carboxyl group which may be a salt thereof.

(ii) W is preferably a substituted phenyl group, a substituted or unsubstituted naphthyl group, or a substituted or unsubstituted heterocyclic group. As the hetero ring serving as the heterocyclic group, pyrrole, thiophene, imidazole, thiazole, benzothiazole, pyridine, and pyridazine rings are exemplified. A substituted phenyl group (especially p-substituted phenyl group), a substituted or unsubstituted β-naphthyl group, or a group derived from a pyridine ring or a thiazole ring is especially preferable.

(iii) $R_{41}$ and $R_{42}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{41}$ and $R_{42}$ is not a hydrogen atom at the same time. $R_{43}$ and $R_{41}$, or $R_{41}$ and $R_{42}$ may bond with each other to form a 5- or 6-membered ring.

(iv) it is preferable that $R_{43}$ and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, a hydroxyl group, an amino group which may be an alkylamino group, an arylamino group, or a heterocyclic amino group, an acylamino group, an ureido group, a sulfamoylamino group, an alkoxycarbonylamino group, an aryloxycarbonylamino group, an alkyl or arylsulfonylamino group, a heterocyclic sulfonylamino group. Further, each of the above groups may have a substituent.

$R_{43}$ is more preferably a hydrogen atom, a halogen atom, an aryl group, a heterocyclic group, a cyano group, a carboxyl group, a carbamoyl group, an alkoxycarbonyl group, an aryloxycarbonyl group, or a heterocyclic oxycarbonyl group, and further preferably a cyano group, a carboxyl group, a carbamoyl group, or an alkoxycarbonyl group, and still further preferably a cyano group. $R_{44}$ is more preferably a hydrogen atom, a halogen atom, an alkyl group, an alkenyl group, an alkynyl group, an aralkyl group, an aryl group, a heterocyclic group, hydroxyl group, an amino group which may be an alkylamino group, an arylamino group, or a heterocyclic amino group, an acylamino group, an ureido group, a sulfamoylamino group, an alkoxycarbonylamino group, an aryloxycarbonylamino group, an alkyl or arylsulfonylamino group, or a heterocyclic sulfonylamino group, further preferably a hydrogen atom, a halogen atom, an alkyl group, an alkenyl group, an alkynyl group, an aralkyl group, or an aryl group, and still further preferably a methyl group.

(v) $R_{45}$ and $R_{46}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{45}$ and $R_{46}$ is not a hydrogen atom at the same time. $R_{45}$ and $R_{46}$ may bond with each other to form a 5- or 6-membered ring.

As a preferable combination of $X_1$—$X_7$, W, and $R_{41}$—$R_{46}$ in the dye represented by Formula (B-4), compounds in which at least one of $X_1$—$X_7$, W, and $R_{41}$—$R_{46}$ is an aforementioned preferable group are preferable, and compounds in which two or more of $X_1$—$X_7$, W, and $R_{41}$—$R_{46}$ are each an aforementioned preferable group are more preferable. Compounds in which all of $X_1$—$X_7$, W, and $R_{41}$—$R_{46}$ are aforementioned preferable groups are most preferable.

Formula (B-5) is explained in detail below.

In Formula (B-5), $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-3). Preferable examples of $X_1$, $X_2$, $X_3$, $X_4$, $X_5$, $X_6$, and $X_7$ are also the same as those of $X_1$, $X_2$, $X_3$, $X_4$, $X_5$, $X_6$, and $X_7$ of Formula (B-3).

In Formula (B-5), W has the same meaning as W of Formula (B-3). Preferable examples of W are also the same as those of W of Formula (B-3). $W_{11}$ has the same meaning as $W_1$ of Formula (B-2). Preferable examples of $W_{11}$ are also the same as those of $W_1$ of the formula (B-2). $R_{41}$ and $R_{42}$ each have the same meanings as $R_{41}$ and $R_{42}$ of Formula (B-1). Preferable examples of $R_{41}$ and $R_{42}$ are also the same as those of $R_{41}$ and $R_{42}$ of Formula (B-1). $R_{43}$ and $R_{44}$ each have the same meanings as $R_{43}$ and $R_{44}$ of Formula (B-1). Preferable examples of $R_{43}$ and $R_{44}$ are also the same as those of $R_{43}$ and $R_{44}$ of Formula (B-1). $R_{45}$ and $R_{46}$ each have the same meanings as $R_{41}$ and $R_{42}$ of Formula (B-3). Preferable examples of $R_{45}$ and $R_{46}$ are also the same as those of $R_{41}$ and $R_{42}$ of Formula (B-3).

As an especially preferable combination of groups in the compound represented by Formula (B-5), combinations composed of the following (i) to (vi) are recited.

(i) $X_1$, $X_2$, $X_3$, $X_4$, $X_5$, $X_6$, and $X_7$ is a hydrogen atom, a halogen atom, an alkyl group, an aryl group, a heterocyclic group, a cyano group, an alkoxy group, an amido group, an ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group which may be a salt thereof, a carboxyl group which may be a salt thereof, a hydroxyl group which may be a salt thereof, a phosphono group which may be a salt thereof, or a quaternary ammonium group. Further, a hydrogen atom, a halogen atom, an alkyl group, a sulfo group which may be a salt thereof, a carboxyl group which may be a salt thereof, or a hydroxyl group which may be a salt thereof is more preferable. Among these groups, a hydrogen atom, a sulfo group which may be a salt thereof, or a carboxyl group which may be a salt thereof is further preferable. It is especially preferable that at least one of $X_1$, $X_2$, $X_3$, $X_4$, $X_5$, $X_6$, and $X_7$ is a sulfo group which may be a salt thereof, or a carboxyl group which may be a salt thereof.

(ii) W is preferably a substituted phenyl group, a substituted or unsubstituted naphthyl group, or a substituted or unsubstituted heterocyclic group. As the hetero ring serving as the heterocyclic group, pyrrole, thiophene, imidazole, thiazole, benzothiazole, pyridine, and pyridazine rings are exemplified. A substituted phenyl group (especially p-substituted phenyl group), a substituted or unsubstituted β-naphthyl group, or a group derived from a pyridine ring or a thiazole ring is especially preferable.

(iii) $W_{11}$ preferably represents an electron withdrawing group having a Hammett substituent constant σp of 0.20 or more, and more preferably 0.30 or more, and further preferably 0.45 or more, and still further preferably 0.60 or more. The upper limit of the σp value is preferably 1.0. In more detail, $W_{11}$ is preferably an acyl group having 2 to 20 carbon atoms, an alkoxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms, or a halogenated alkyl group having 1 to 20 carbon atoms. Among these groups, a cyano group, an alkylsulfonyl group having 1 to 20 carbon atoms, or an arylsulfonyl group having 6 to 20 carbon atoms is more preferable. Especially, a cyano group is most preferable.

(iv) $R_{41}$ and $R_{42}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{41}$ and $R_{42}$ is not a hydrogen atom at the same time. $R_{43}$ and $R_{41}$, or $R_{41}$ and $R_{42}$ may bond with each other to form a 5- or 6-membered ring.

(v) it is preferable that $R_{43}$ and $R_{44}$ each independently represent a hydrogen atom; a halogen atom; an alkyl group; an alkenyl group; an alkynyl group; an aralkyl group; an aryl group; a heterocyclic group; a cyano group; a carboxyl group; a carbamoyl group; an alkoxycarbonyl group; an aryloxycarbonyl group; a heterocyclic oxycarbonyl group; a hydroxyl group; an amino group which may be an alkylamino group, an arylamino group, or a heterocyclic amino group; an acylamino group; an ureido group; a sulfamoylamino group; an alkoxycarbonylamino group; an aryloxycarbonylamino group; an alkyl or arylsulfonylamino group; or a heterocyclic sulfonylamino group. Further, each of the above groups may have a substituent.

$R_{43}$ is more preferably a hydrogen atom, a halogen atom, an aryl group, a heterocyclic group, a cyano group, a carboxyl group, a carbamoyl group, an alkoxycarbonyl group, an aryloxycarbonyl group, or a heterocyclic oxycarbonyl group, further preferably a cyano group, a carboxyl group, a carbamoyl group, or an alkoxycarbonyl group, and still further preferably a cyano group. $R_{44}$ is more preferably a hydrogen atom; a halogen atom; an alkyl group; an alkenyl group; an alkynyl group; an aralkyl group; an aryl group; a heterocyclic group; hydroxyl group; an amino group which may be an alkylamino group, an arylamino group, or a heterocyclic amino group; an acylamino group; an ureido group; a sulfamoylamino group; an alkoxycarbonylamino group; an aryloxycarbonylamino group; an alkyl or arylsulfonylamino group; or a heterocyclic sulfonylamino group; further preferably a hydrogen atom, a halogen atom, an alkyl group, an alkenyl group, an alkynyl group, an aralkyl group, or an aryl group, and still further preferably a methyl group.

(vi) $R_{45}$ and $R_{46}$ are preferably a hydrogen atom, an alkyl group, an aryl group, a heterocyclic group, an acyl group, or an alkyl or arylsulfonyl group, more preferably a hydrogen atom, an alkyl group, an aryl group, or a heterocyclic group, further preferably a hydrogen atom, a substituted aryl group, or a substituted heterocyclic group, and still further preferably a hydrogen atom, or a substituted aryl group. However, both $R_{45}$ and $R_{46}$ is not a hydrogen atom at the same time. $R_{45}$ and $R_{46}$ may bond with each other to form a 5- or 6-membered ring.

As a preferable combination of $X_1$—$X_7$, W, $W_1$, and $R_{41}$—$R_{46}$ in the dye represented by Formula (B-5), compounds in which at least one of $X_1$—$X_7$, W, $W_1$, and $R_{41}$—$R_{46}$ is an aforementioned preferable group are preferable, and compounds in which two or more of $X_1$—$X_7$, W, $W_1$, and $R_{41}$—$R_{46}$ are each an aforementioned preferable group are more preferable. Compounds in which all of $X_1$—$X_7$, W, $W_1$, and $R_{41}$—$R_{46}$ are aforementioned preferable groups are most preferable.

Among the compound represented by Formula (B-4), or Formula (B-5), compounds represented by the following Formula (B-4-1), or Formula (B-5-1) are more preferable in that more excellent properties are given by these compounds in the invention.

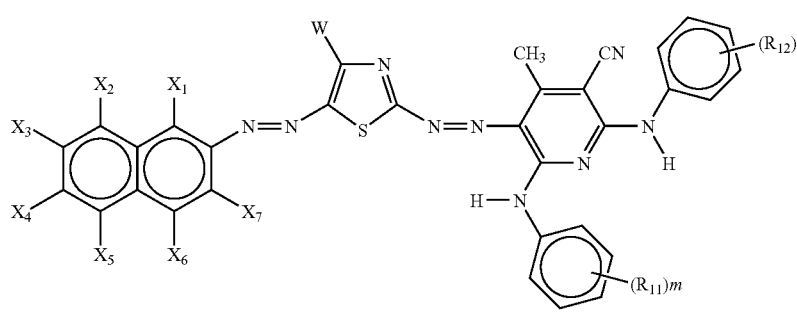

Formula (B-4-1)

In Formula (B-4-1), $R_{11}$ and $R_{12}$ each independently represent an ionic hydrophilic group. As the ionic hydrophilic group, a sulfo group which may be a salt thereof, and a carboxyl group which may be a salt thereof are especially preferable. Among these groups, a sulfo group is preferable. m and n each independently represent an integer of 1 to 3, preferably an integer of 1 to 2. It is most preferable that m is 1 and/or n is 1. W has the same meaning as W of Formula (B-4). Preferable examples of W are also the same as those of W of Formula (B-4). $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-4). Preferable examples of $X_1$, $X_2$, $X_3$, $X_4$, $X_5$, $X_6$, and $X_7$ are also the same as those of $X_1$, $X_2$, $X_3$, $X_4$, $X_5$, $X_6$, and $X_7$ of Formula (B-4).

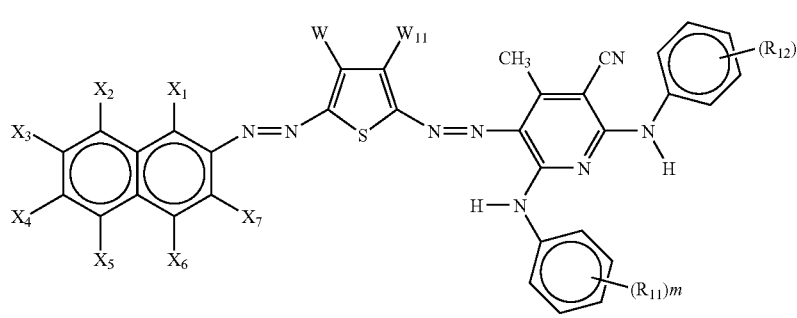

Formula (B-5-1)

In Formula (B-5-1), $R_{11}$ and $R_{12}$ each independently represent an ionic hydrophilic group. As the ionic hydrophilic group, a sulfo group which may be a salt thereof and a carboxyl group which may be a salt thereof are especially preferable. Among these groups, a sulfo group is preferable. m and n each independently represent an integer of 1 to 3, preferably an integer of 1 to 2. It is most preferable that m is 1 and/or n is 1. W has the same meaning as W of Formula (B-5). Preferable examples of W are also the same as those of W of Formula (B-5). $W_{11}$ has the same meaning as $W_{11}$ of Formula (B-5). Preferable examples of $W_{11}$ are also the same as those of $W_{11}$ of Formula (B-5). $X_1$, $X_2$, $X_3$, $X_4$, $X_5$, $X_6$, and $X_7$ each have the same meanings as $X_1$, $X_2$, $X_3$, $X_4$, $X_5$, $X_6$, and $X_7$ of Formula (B-5). Preferable examples of $X_1$, $X_2$, $X_3$, $X_4$, $X_5$, $X_6$, and $X_7$ are also the same as those of $X_1$, $X_2$, $X_3$, $X_4$, $X_5$, $X_6$, and $X_7$ of Formula (B-5).

In the black ink used in the invention, other black dyes may be used in combination with the compound represented by any one of the above-described Formulae (B-1) to (B-5-1). The other black dye is not particularly limited, but known dyes may be optionally and selectively used.

Preparation methods of various kinds of inks are minutely described in JP-A-Nos. 5-148436, 5-295312, 7-97541, 7-82515, and 7-118584, and they may be applied to the preparation of inkjet recording inks used in the invention.

<Inkjet Recording Method>

The inkjet recording method of the invention includes a process of recording an image on an inkjet recording medium having an ink-receiving layer containing inorganic fine particles on a support, using the above-described inkjet recording yellow ink of the invention, or the above-described inkjet recording ink set of the invention.

In the inkjet recording method of the invention, an image is recorded with the inkjet recording yellow ink of the invention as a yellow ink. Therefore, when the recorded image is stored for a long period of time, a substantial change of color balance of the image can be supressed. As a result, it is possible to obtain an image in which stability of color tone has been maintained over a long period of time.

As the material to be recorded by using the ink set of the invention, it is possible to use materials known to be applied for recording, such as a recording paper, a resin coat paper, an inkjet exclusive paper as described in, for example, JP-A-Nos. 8-169172, 8-27693, 2-276670, 7-276789, 9-323475, 62-238783, 10-153989, 10-217473, 10-235995, 10-337947, 10-217597, and 10-337947, a film, a paper for common use in inkjet recording and electrophotographic transfer, a textile, a glass, a metal, or ceramics.

An example of the support is a paper manufactured from chemical pulp such as LBKP or NBKP, mechanical pulp such as GP, PGW, RMP, TMP, CTMP, CMP or CGP, or waste paper pulp such as DIP, wherein known additives including a dye, a binder, a sizing agent, a fixing agent, a cationic agent and a paper strength increasing agent are mixed as needed, by use of a paper machine such as a Fourdrinier machine or a vat machine. Other examples of the support are synthetic paper and plastic film sheets. The suitable thickness of the support is from 10 to 250 μm, and the suitable basis weight of the support is from 10 to 250 g/m².

As the support, a paper laminated with polyolefin (e.g., polyethylene, polystyrene, polybutene, and copolymers thereof) or polyethylene terephthalate on both sides, or plastic film is more preferably used. To the polyolefin, a white pigment (e.g., titanium dioxide, zinc oxide) or a tinting dye (e.g., cobalt blue, ultramarine blue, neodymium oxide) is preferably added.

In the invention, it is preferable that an inkjet recording medium has an ink-receiving layer containing inorganic fine particles on the support. The ink-receiving layer provided on the support is explained below.

In the image-receiving layer, a porous material and an aqueous binder may be incorporated as a component. Further, as the inorganic fine particles, a pigment is preferably contained in the image-receiving layer. A white pigment is suitable as the pigment. Examples of a white pigment include inorganic white pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments, such as styrene pigment, acrylic pigment, urethane resin and melamine resin. Among these pigments, porous white inorganic pigments are preferred over the others. Particularly, synthetic amorphous silica having a great pore area is preferably used. As the synthetic amorphous silica, silicic acid anhydride synthesized in dry process (vapor-phase process), or hydrated silicic acid synthesized in a wet process is usable.

Examples of the inkjet recording medium containing the foregoing pigments in its image-receiving layer include those disclosed in JP-A- Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

Examples of an aqueous binder contained in the image-receiving layer include water-soluble polymers, such as polyvinyl alcohol or polyvinyl alcohol derivatives, for example, polyvinyl alcohol and silanol-modified polyvinyl alcohol; starch, cationic starch, casein, gelatin, carboxymethyl cellulose, hydroxyethyl cellulsode, polyvinyl pyrrolidone, polyalkylene oxides and polyalkylene oxide derivatives; and water-dispersible polymers, such as styrene-butadiene latex and an acrylic emulsion. These aqueous binders can be used alone or as combinations of two or more thereof. Among those aqueous binders, polyvinyl alcohol or polyvinyl alcohol derivatives such as polyvinyl alcohol and silanol-modified polyvinyl alcohol are especially favorable from the viewpoints of adhesion to pigments and delamination resistance of the ink-receiving layer.

In addition to pigments and aqueous binders, the image-receiving layer may further contain other additives, such as a mordant, a waterproofing agent, a light resistance improver, a gas resistance improver, a surfactant and a hardener. To the image-receiving layer, an immobilized mordant is preferably added. Therefore, it is appropriate to use a polymeric mordant from a viewpoint of bleeding prevention.

The method of jetting ink that is used in the inkjet recording ink set of the invention is not particularly restricted, but any known methods may be used. More specifically, methods usable in the invention include a charge control method in which ink is jetted by utilizing an induced electrostatic force, a drop-on-demand method (a pressure pulse method) utilizing piezo element vibration pressure, an acoustic inkjet method in which radiation pressure created by irradiating ink with acoustic beams converted from electric signals is utilized for jetting ink, and a thermal inkjet (bubble jet, Registered Trademark) method in which bubbles are formed by heating ink and the pressure created thereby is utilized for jetting ink. The inkjet recording methods included a method of jetting a great number of minute-volume droplets of ink low in density referred to as the photo ink, a method of improving image quality by the use of two or more kinds of ink substantially the same in hue but different in density, and a method of using colorless invisible ink.

EXAMPLES

The invention will be described below in more detail with reference to examples therefor. The invention is not limited to below-described examples, provided that no departure is made from the essence thereof. Further, the term "part" is based on a weight standard, unless stated otherwise.

Example 1

<Preparation of Ink Set>
(Preparation of Yellow Ink Y-101)

To the following ingredients, ion-exchange water was added in an amount to make the total weight 1000 g, and stirred for 1 hour while heating at a temperature of 30° C. to 40° C. The resulting solution was passed through a vacuum microfilter 0.2 μm in average pore diameter, thereby preparing a yellow ink Y-101. A concentration of the dye in the yellow ink Y-101 was 6.0% by mass.

<Formula of Yellow ink Y-101>

| -Solid Components- | |
|---|---|
| Potassium salt of Yellow dye Y-1 (bis form) set forth below | 45.0 g |
| Potassium salt of Yellow dye Y-2 (mono form) set forth below | 15.0 g |
| PROXEL XL-2 manufactured by Arch Chemicals Japan, Inc. | 1.0 g |
| -Liquid Components- | |
| Glycerin | 81 g |
| Triethylene glycol | 96 g |
| Triethylene glycol mono butyl ether | 91 g |
| Propylene glycol | 3 g |
| OLFINE E1010 (Ethylene oxide (10 mol) adduct of | 20 g |

| | |
|---|---|
| acetylene diol (nonionic surfactant) manufactured by Nissin Chemical Industry Co, Ltd.) | |

Yellow Dye Y-1

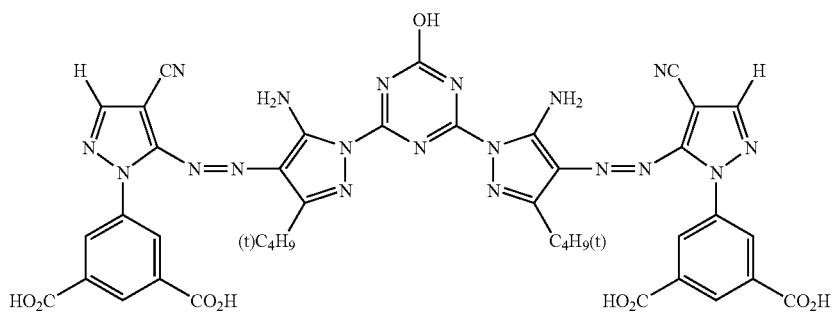

Yellow dye -2

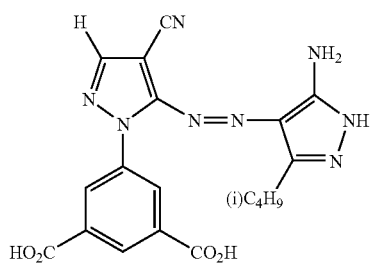

(Preparation of Magenta Ink M-101)

To the following ingredients, ion-exchange water was added in an amount to make the total weight 1000 g, and stirred for 1 hour while heating at a temperature of 30° C. to 40° C. The resulting solution was passed through a vacuum microfilter 0.2 μm in average pore diameter, thereby preparing magenta ink M-101. A concentration of the dye in the magenta ink M-101 was 3.0% by mass.

<Formula of Magenta Ink M-101>

| -Solid Components- | |
|---|---|
| Magenta dye M-1 set forth below | 30.0 g |
| Urea | 48.0 g |
| PROXEL XL-2 | 1.0 g |
| (Product manufactured by Arch Chemicals Japan, Inc.) | |
| -Liquid Components- | |
| Glycerin | 84.0 g |
| Triethylene glycol | 20.0 g |
| Triethylene glycol mono butyl ether | 99.0 g |
| Propylene glycol | 3.0 g |
| Ion exchange water | 715 g |

Magenta Dye M-1

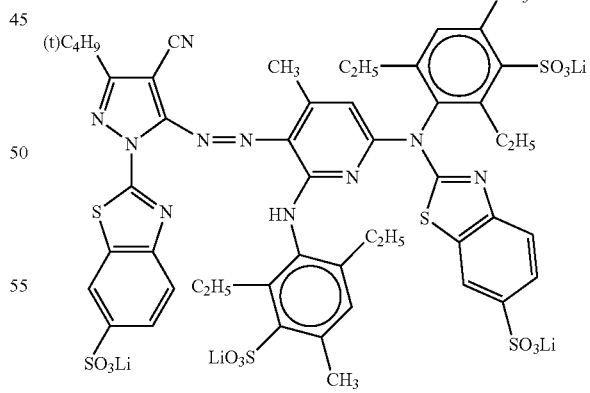

(Preparation of Cyan Ink C-101)

To the following ingredients, ion-exchange water was added in an amount to make the total weight 1000 g, and stirred for 1 hour while heating at a temperature of 30 to 40° C. The resulting solution was passed through a vacuum microfilter 0.2 μm in average pore diameter, thereby prepar ing a cyan ink C-101. A concentration of the dye in the cyan ink C-101 was 5.4% by mass.

<Formula of Cyan ink C-101>

| -Solid Components- | |
|---|---|
| Cyan dye C-1 set forth below | 54.0 g |
| Urea | 41.0 g |
| PROXEL XL-2 | 1.0 g |
| (Product manufactured by Arch Chemicals Japan, Inc.) | |
| -Liquid Components- | |
| Glycerin | 91 g |
| Triethylene glycol | 18 g |
| Triethylene glycol mono butyl ether | 94 g |
| Propylene glycol | 3 g |
| 1,2-Hexanediol | 12 g |
| 2-Pyrrolidone | 27 g |
| OLFINE E1010 | 10 g |
| (Ethylene oxide (10 mol) adduct of acetylene diol (nonionic surfactant) manufactured by Nissin Chemical Industry Co, Ltd.) | |
| Ion exchange water | 649 g |

Cyan dye C-1

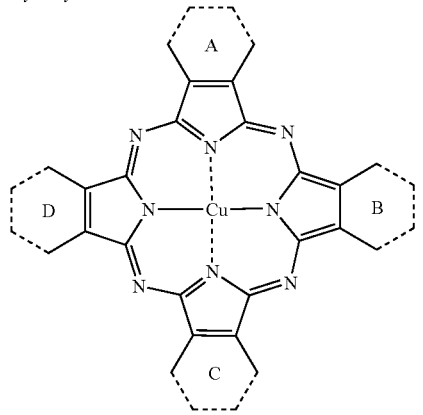

One of Rings A to D

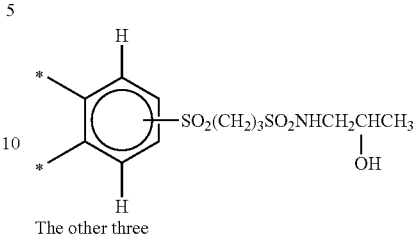

The other three

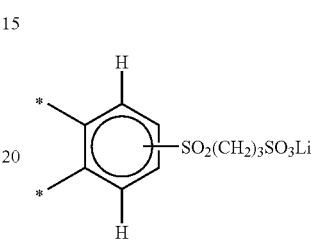

The mark * indicates a bond site of the phthalocyanine ring.

(Preparation of Black Ink Bk-101)

To the following ingredients, ion-exchange water was added in an amount to make the total weight 1000 g, and stirred for 1 hour while heating at a temperature of 30° C. to 40° C. The resulting solution was passed through a vacuum microfilter 0.2 μm in average pore diameter, thereby preparing a black ink Bk-101. A concentration of the dye in the black ink Bk-101 was 7.2% by mass.

<Formula of Black ink Bk-101>

| -Solid Components- | |
|---|---|
| Black dye 1 (primary black dye Bk-1 set forth below) | 62.0 g |
| Black dye 2 (complementary black dye Bk-2 set forth below) | 10.0 g |
| PROXEL XL-2 | 1.0 g |
| (Product manufactured by Arch Chemicals Japan, Inc.) | |
| -Liquid Components- | |
| Glycerin | 83 g |
| Triethylene glycol | 8 g |
| Triethylene glycol mono butyl ether | 84 g |
| Propylene glycol | 3 g |
| 1,2-Hexanediol | 16 g |
| OLFINE E1010 | 10 g |
| (Ethylene oxide (10 mol) adduct of acetylene diol (nonionic surfactant) manufactured by Nissin Chemical Industry Co, Ltd.) | |
| Ion exchange water | 723 g |

Primary black dye Bk-1

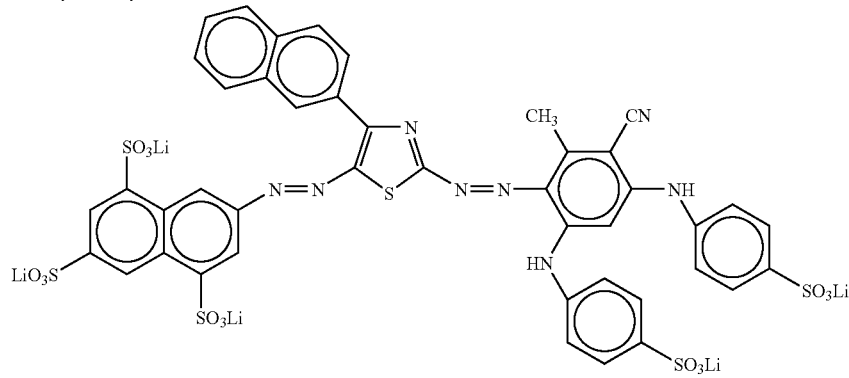

Complementary black dye Bk-2

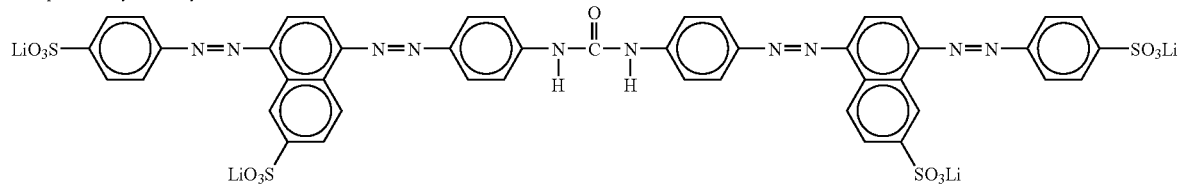

(Preparation of Ink Set 1)

The ink set 1 composed of the above-obtained Yellow ink Y-101, Magenta ink M-101, Cyan ink C-101, and Black ink Bk-101 was prepared.

<Image Recording and Evaluation>

The thus-obtained ink set 1 was loaded in a Dry Minilab 400 ink cartridge manufactured by FUJIFILM Corporation. Recording was performed on an ink jet image-receiving paper "KASSAI" roll paper manufactured by FUJIFILM Corporation under the conditions of 23° C. and 50% RH. Samples of each of yellow, magenta and cyan having a monochromatic density different from each other were prepared. Further, samples each having a different image density of three color composite gray consisting of yellow, magenta and cyan were also prepared. Then, the following image evaluation was performed.

Ozone Resistance

The image density Ci of each of yellow, magenta and cyan was measured using an X-rite 310 in accordance with "Digital Color Photo Print Stability Evaluation" as defined by JEITA CP-3901 (Japan Electronics and Information Technology Industries Association standard established in November, 2007). With respect to the composite neutral patch, the monochrome patch and the background, patches corresponding to the following density ranges were selected.

Background
Density 0.5 Patch 0.5±10%
Density 1.0 Patch 1.0±10%
Density 1.5 Patch 1.5±10%

Next, these patches were allowed to stand in a box having a fixed ozone gas density of 5 p p m. Image densities of the patches before and after standing under the ozone gas atmosphere were measured using a reflection densitometer (X-rite 310 TR) to obtain a residual ratio of the dye (%, =Cf/Ci× 100). The lifetime of each image was evaluated on the basis of numerical data obtained by both individual color monochromatic patches and composite neutral patches in terms of the residual ratio of the dye according to JEITA CP-3901. The evaluation results are shown in Table 1 set forth below. Herein, the number of lifetime years is determined on the basis of color variation, color balance variation and reflection density of the background with respect to each of the colorants in the image.

Comparative Example 1

<Preparation of Ink Set 2>

(Preparation of Yellow ink Y-102 and Ink Set 2)

Yellow ink Y-102 was prepared in the same manner as Yellow ink Y-101 of Ink Set 1 in Example 1, except that the potassium salt of yellow dye Y-2 (mono form) of the Yellow ink Y-101 was substituted with the potassium salt of yellow dye Y-1 (bis form).

Ink Set 2 was prepared using the thus-obtained Yellow ink Y-102, and Magenta ink M-101, Cyan ink C-101, and Black ink Bk-101 prepared in Example 1. Recording was performed using Ink Set 2 under the conditions of 23° C. and 50% RH in the similar manner to Example 1. Further, evaluation was conducted in the similar manner to Example 1. The results of the evaluation are shown in the following Table 1.

TABLE 1

| | Ink Set | Lifetime acerding to JEITA CP-3901 (years) |
|---|---|---|
| Example 1 | 1 | 11.5 |
| Comp. Ex. 1* | 2 | 8.3 |

*Comparative Example 1

As shown in the above Table 1, in Example 1 according to the invention, a deterioration of color balance owing to ozone fading over time after recording of an image is reduced, thereby improving a lifetime of the recorded image, which results in improvement of the storage stability over a long period of time, as compared to Comparative Example 1 in which only Y-2 (bis form) is used as a yellow dye.

All publications, patent applications, and technical standards mentioned in this specification are herein incorporated by reference to the same extent as if each individual publication, patent applications, or technical standards was specifically and individually indicated to be incorporated by reference.

What is claimed is:

1. An inkjet recording yellow ink comprising a water-soluble azo dye ($y^{n1}$) selected from the group consisting of a compound represented by the following Formula (Y) in which n is 1, and a salt thereof, and a water-soluble azo dye ($y^{n2}$) selected from the group consisting of a compound represented by the following Formula (Y) in which n is 2, and a salt thereof:

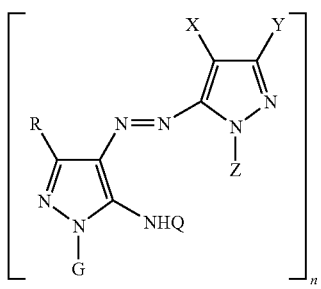

Formula (Y)

wherein, in Formula (Y), G represents a heterocyclic group; R, X, Y, Z, and Q each independently represent a monovalent or divalent group; n represents 1 or 2; when n is 1, R, X, Y, Z, Q and G each independently represent a monovalent group; and when n is 2, R, X, Y, Z, Q and G each independently represent a monovalent or divalent group and at least one of R, X, Y, Z, Q and G represents a divalent substituent.

2. The inkjet recording yellow ink described in claim 1, wherein a ratio of the water-soluble azo dye ($y^{n1}$) to the water-soluble azo dye ($y^{n2}$) [$y^{n1}$:$y^{n2}$] is in the range of 1:20 to 1:1.

3. The inkjet recording yellow ink described in claim 1, wherein a total amount of the water-soluble azo dye ($y^{n1}$) and the water-soluble azo dye ($y^{n2}$) is 80% by mass or more with respect to the total content of the yellow dye.

4. The inkjet recording yellow ink described in claim 1, wherein the water-soluble azo dye ($y^{n2}$) is at least one compound selected from the group consisting of a compound represented by the following Formula (Y-1), a compound represented by the following Formula (Y-2), a compound represented by the following Formula (Y-3), a compound represented by the following Formula (Y-4), a compound represented by the following Formula (Y-5), and a salt of any one of these compounds:

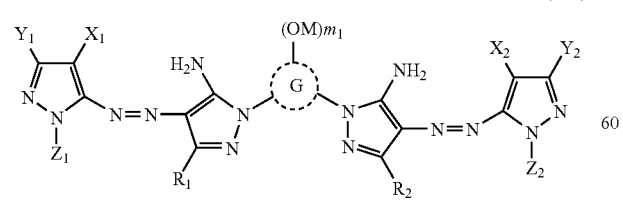

Formula (Y-1)

wherein, in Formula (Y-1), $R_1$, $R_2$, $X_i$, $X_2$, $Y_1$, $Y_2$, $Z_1$, and $Z_2$ each independently represent a monovalent group; G represents an atomic group necessary to form a 5- to 8-membered nitrogen-containing hetero ring; M represents a hydrogen atom or a cation; and $m_1$ represents an integer of 0 to 3,

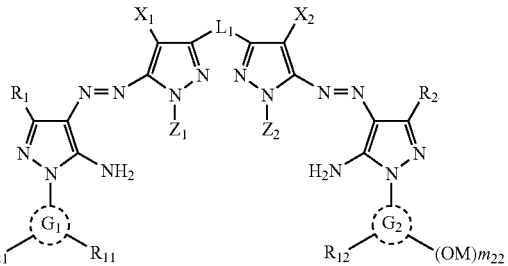

Formula (Y-2)

wherein, in Formula (Y-2), $R_1$, $R_2$, $R_{11}$, $R_{12}$, $X_1$, $X_2$, $Z_1$ and $Z_2$ each independently represent a monovalent group; $L_1$ represents a divalent connecting group; $G_1$ and $G_2$ each independently represent an atomic group necessary to form a 5- to 8-membered nitrogen-containing hetero ring; M represents a hydrogen atom or a cation, and $m_{21}$ and $m_{22}$ each independently represent an integer of 0 to 3,

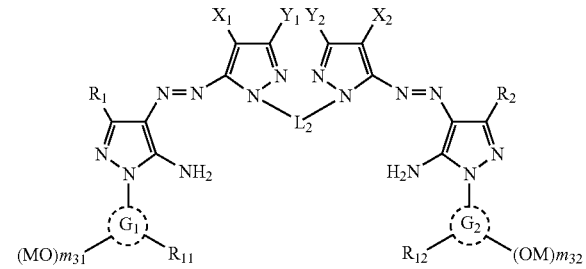

Formula (Y-3)

wherein, in Formula (Y-3), $R_1$, $R_2$, $R_{11}$, $R_{12}$, $X_1$, $X_2$, $Y_1$, and $Y_2$ each independently represent a monovalent group; $L_2$ represents a divalent connecting group; $G_1$ and $G_2$ each independently represent an atomic group necessary to form a 5- to 8-membered nitrogen-containing hetero ring; M represents a hydrogen atom or a cation; and $m_{31}$ and $m_{32}$ each independently represent an integer of 0 to 3,

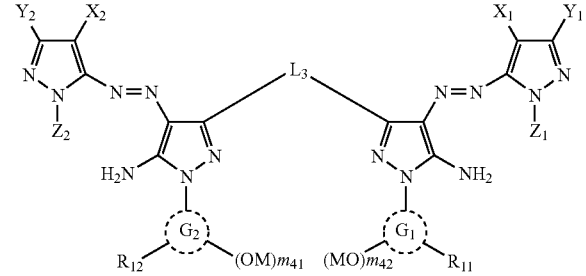

Formula (Y-4)

wherein, in Formula (Y-4), $R_{11}$, $R_{12}$, $X_1$, $X_2$, $Y_1$, $Y_2$, $Z_1$, and $Z_2$ each independently represent a monovalent group; $L_3$ represents a divalent connecting group; $G_1$ and $G_2$ each independently represent an atomic group necessary to form a 5- to 8-membered nitrogen-containing hetero ring; M represents a hydrogen atom or a cation; and $m_{41}$ and $m_{42}$ each independently represent an integer of 0 to 3, and Formula (Y-5)

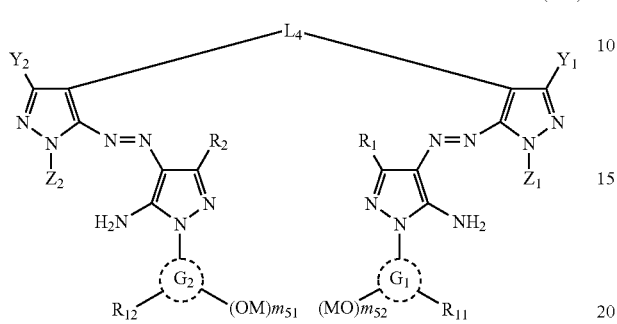

wherein, in Formula (Y-5), $R_1$, $R_2$, $R_{11}$, $R_{12}$, $Y_1$, $Y_2$, $Z_1$, and $Z_2$ each independently represent a monovalent group; $L_4$ represents a divalent connecting group; $G_1$ and $G_2$ each independently represent an atomic group necessary to form a 5- to 8-membered nitrogen-containing hetero ring; M represents a hydrogen atom or a cation; and $m_{51}$ and $m_{52}$ each independently represent an integer of 0 to 3.

5. The inkjet recording yellow ink described in claim 1, further comprising a yellow dye in a total amount in the range of 3% by mass to 7% by mass.

6. The inkjet recording yellow ink described in claim 1, further comprising a nonionic surfactant.

7. The inkjet recording yellow ink described in claim 6, wherein the nonionic surfactant is an acetylenediol surfactant.

8. An inkjet recording ink set comprising the inkjet recording yellow ink described in claim 1, a magenta ink containing a magenta dye, and a cyan ink containing a cyan dye.

9. The inkjet recording ink set described in claim 8, wherein the cyan dye is a water-soluble phthalocyanine dye selected from the group consisting of a compound represented by the following Formula (C-1) and a salt thereof:

Formula (C-1)

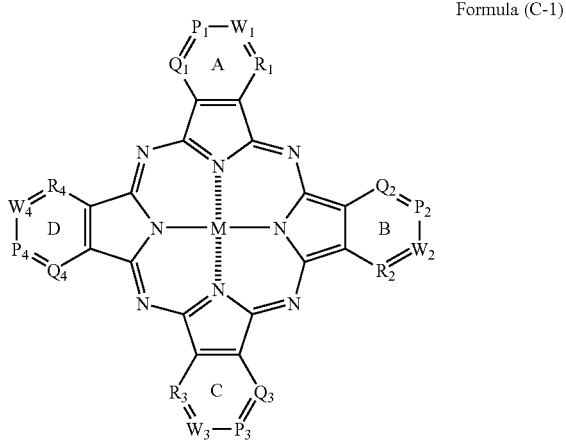

-continued

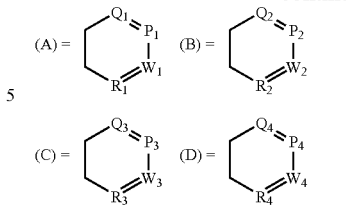

wherein, in Formula (C-1), $Q_1$ to $Q_4$, $P_1$ to $P_4$, $W_1$ to $W_4$, and $R_1$ to $R_4$ each independently represent (=C($J_1$)- or —N=), (=C($J_2$)- or —N=), (=C($J_3$)- or —N=) or (=C($J_4$)- or —N=); $J_1$ to $J_4$ each independently represent a hydrogen atom or a substituent; ring A comprising $Q_1$, $P_1$, $W_1$ and $R_1$, ring B comprising $Q_2$, $P_2$, $W_2$ and $R_2$, ring C comprising $Q_3$, $P_3$, $W_3$ and $R_3$, and ring D comprising $Q_4$, $P_4$, $W_4$ and $R_4$ each independently represent an aromatic hydrocarbon ring or a hetero ring; and M represents a hydrogen atom, a metal element, a metal oxide, a metal hydroxide or a metal halide.

10. The inkjet recording ink set described in claim 8, wherein the magenta ink contains a water-soluble azo dye represented by the following Formula (M-1):

Formula (M-1)

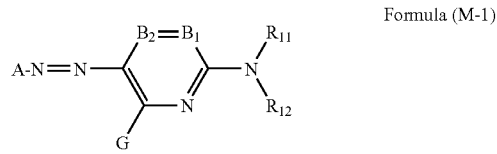

wherein, in Formula (M-1), A represents a residue of a 5-membered hetero ring diazo component A-NH$_2$; $B_1$ and $B_2$ each independently represent —CR$_{13}$= or —CR$_{14}$=, or one of $B_1$ and $B_2$ is a nitrogen atom, and the other is —CR$_{13}$=, or —CR$_{14}$=;

$R_{11}$ and $R_{12}$ each independently represent a hydrogen atom, an alkyl group, a cycloalkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group; G, $R_{13}$, and $R_{14}$ each independently represent a hydrogen atom, a halogen atom, an alkyl group, an alkenyl group, an alkynyl group, aralkyl group, an aryl group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted with an alkyl group, an aryl group, or a heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a heterocyclic thio group, or an ionic hydrophilic group; and $R_{13}$ and $R_{11}$, or $R_{11}$ and $R_{12}$ may bond with each other to form a 5- or 6-membered ring, with the proviso that Formula (M-1) must have at least one ionic hydrophilic group.

11. The inkjet recording ink set described in claim 8, further comprising a black ink.

12. The inkjet recording ink set described in claim 11, wherein the black ink contains a water-soluble azo dye represented by the following Formula (B-1):

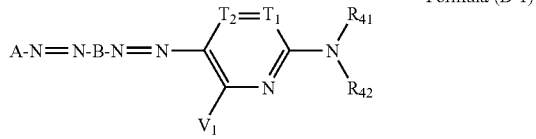

Formula (B-1)

wherein, in Formula (B-1), A represents a monovalent aromatic group or heterocyclic group; B represents a divalent aromatic group or heterocyclic group; $T_1$ and $T_2$ each independently represent $=CR_{43}-$ or $-CR_{44}=$, or, one of $T_1$ and $T_2$ is a nitrogen atom, and the other is $=CR_{43}-$ or $-CR_{44}=$; $V_1$, $R_{43}$ and $R_{44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group which may include an alkylamino group, an arylamino group, and a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkyl sulfinyl group, an arylsulfinyl group, a heterocyclic sulfinyl group, a sulfamoyl group, or a sulfo group; $R_{41}$ and $R_{42}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, with the proviso that both $R_{41}$ and $R_{42}$ are not a hydrogen atom at the same time; and $R_{43}$ and $R_{41}$, or $R_{41}$ and $R_{42}$ may bond with each other to form a 5- or 6-membered ring.

13. An inkjet recording method for recording an image on an inkjet recording medium having an ink-receiving layer containing inorganic particles on a support, the method comprising: utilizing the inkjet recording yellow ink described in claim 1.

14. An inkjet recording method for recording an image on an inkjet recording medium having an ink-receiving layer containing inorganic particles on a support, the method comprising: utilizing the inkjet recording ink set described in claim 8.

* * * * *